US012782525B2

(12) United States Patent
Yang et al.

(10) Patent No.: US 12,782,525 B2
(45) Date of Patent: Nov. 3, 2026

(54) TIME-OF-FLIGHT MEASUREMENT METHOD, APPARATUS, AND SYSTEM

(71) Applicant: SUTENG INNOVATION TECHNOLOGY CO., LTD., Shenzhen (CN)

(72) Inventors: Jincheng Yang, Shenzhen (CN); Yalin Ren, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 986 days.

(21) Appl. No.: 18/087,806

(22) Filed: Dec. 22, 2022

(65) Prior Publication Data

US 2023/0204733 A1 Jun. 29, 2023

(30) Foreign Application Priority Data

Dec. 24, 2021 (CN) ......................... 202111600767.4
Dec. 24, 2021 (CN) ......................... 202111602316.4
Dec. 24, 2021 (CN) ......................... 202111602321.5
Dec. 24, 2021 (CN) ......................... 202111603562.1

(51) Int. Cl.
*G01S 7/4865* (2020.01)
*G01S 17/10* (2020.01)

(52) U.S. Cl.
CPC ............. *G01S 7/4866* (2013.01); *G01S 17/10* (2013.01)

(58) Field of Classification Search
CPC ...... G01S 7/4866; G01S 17/10; G01S 7/4865; G01S 7/487; G01S 17/894
See application file for complete search history.

(56) References Cited

U.S. PATENT DOCUMENTS

2015/0323654 A1* 11/2015 Jachmann ............. G01S 7/4865 356/5.01
2019/0250257 A1* 8/2019 Finkelstein .......... H04N 25/773
2020/0158836 A1* 5/2020 Henderson .............. G01S 17/10

FOREIGN PATENT DOCUMENTS

CN 112099033 A 12/2020
CN 112255636 A 1/2021
CN 112731425 A 4/2021

OTHER PUBLICATIONS

First Office Action issued in corresponding Chinese Application No. 202111603562.1, dated Mar. 19, 2025, 10 pages.
First Office Action of the Chinese application No. 202111602316.4, issued on Aug. 26, 2025.

* cited by examiner

*Primary Examiner* — Tung S Lau
(74) *Attorney, Agent, or Firm* — BAYES PLLC

(57) ABSTRACT

This application discloses a time-of-flight measurement method, apparatus, and system. The method includes obtaining histogram data of a target object. The histogram data includes m counts, m is an integer greater than 1, and each of the m counts is associated with a time. The method also includes performing digital filtering on the m counts to obtain m filtered values respectively corresponding to the m counts, and determining a time of flight of the target object based on a time corresponding to a peak value in the m filtered values.

10 Claims, 54 Drawing Sheets

TIME-OF-FLIGHT MEASUREMENT METHOD, APPARATUS, AND SYSTEM

CROSS-REFERENCE TO RELATED APPLICATION

The present application claims the benefit of priority to China Patent Application No. CN 202111602316.4, filed on Dec. 24, 2021, China Patent Application No. CN 202111602321.5, filed on Dec. 24, 2021, China Patent Application No. CN 202111600767.4, filed on Dec. 24, 2021, and China Patent Application No. CN 202111603562.1, filed on Dec. 24, 2021, the contents of which are incorporated herein by reference in their entireties.

TECHNICAL FIELD

This application relates to the measurement field, and in particular, to a time-of-flight measurement method, apparatus, and system.

BACKGROUND

Time-of-flight (TOF) measurement technologies play a critical role in fields such as automated driving, face recognition, and 3D gesture recognition. Single photon avalanche diodes (SPAD) and time-to-digital converters (TDC) are essential TOF measurement technologies in direct time-of-flight (DTOF) measurement technologies. In the DTOF measurement technologies, an emitter emits a pulse signal, the SPAD receives an echo signal to perform photoelectric conversion and an avalanche effect to generate a pulse electrical signal, the SPAD transmits the pulse electrical signal to the TDC, and the TDC records a time of the pulse electrical signal, and compares the time of the pulse electrical signal with a time of emitting the pulse signal by the emitter, to obtain the time of flight, and then a distance between a laser and an object is calculated based on the time of flight.

With high sensitivity, the SPAD is capable of detecting single photons, and therefore, can measure a distance between the laser and a farther object with limited laser power. Affected by incident ambient light or noise of the SPAD itself, a measurement system generates a lot of noise signals, and because the SPAD cannot distinguish the noise signal from the echo signal, the SPAD may use the noise signal as the echo signal to calculate the time of flight, which causes an inaccurate measurement result of the time of flight.

SUMMARY

To solve a technical problem, embodiments of this application provide a time-of-flight measurement method, apparatus, and system, to reduce impact of a noise optical signal on measurement, thereby improving measurement accuracy of a time of flight.

According to one aspect, this application provides a time-of-flight measurement method, including:

- obtaining histogram data of a target object, where the histogram data includes m counts, m is an integer greater than 1, and each of the m counts is associated with a time;
- performing digital filtering on the m counts to obtain m filtered values respectively corresponding to the m counts; and
- determining a time of flight of the object based on a time corresponding to a peak value in the m filtered values.

According to another aspect, this application further provides a time-of-flight measurement apparatus, including:

- an obtaining unit, configured to obtain histogram data of a target object, where the histogram data includes m counts, m is an integer greater than 1, and each of the m counts is associated with a time;
- a filtering unit, configured to perform digital filtering on the m counts to obtain m filtered values respectively corresponding to the m counts; and
- a determining unit, configured to determine a time of flight of the target object based on a time corresponding to a peak value in the m filtered values.

According to another aspect of this application, a computer-readable storage medium is provided, where the computer-readable storage medium stores an instruction, and when executed on the computer, the instruction enables the computer to perform the method according to the foregoing aspects.

According to another aspect of this application, a computer program product including an instruction is provided, and when executed on the computer, the instruction enables the computer to perform the method according to the foregoing aspects.

According to another aspect, this application provides a time-of-flight measurement method, including:

- obtaining N timestamp sets, where N is an integer greater than 1, each timestamp set represents a photon event corresponding to an integration period, each timestamp set includes multiple timestamps, and integration periods corresponding to the timestamp sets are equal;
- dividing the N timestamp sets into K1 groups, where K1 is an integer greater than 1, and each group includes one or more timestamp sets;
- accumulating the timestamp sets included in each group to obtain K1 slices, where each slice includes multiple timestamps;
- performing coherent processing on the K1 slices to obtain coherent timestamp sets;
- generating the histogram data based on the coherent timestamp sets; and
- determining a time of flight based on the histogram data.

In one or more embodiments, the groups include the same number of timestamp sets, where K1=N/M, M is the number of timestamp sets in each group, and M is an integer greater than or equal to 1.

In one or more embodiments, performing coherent processing on the K1 slices to obtain coherent timestamp sets includes:

- performing coherent processing on the L slices to obtain coherent timestamp sets.

In one or more embodiments,

- the L slices are even-numbered slices in the K1 slices;
- the L slices are odd-numbered slices in the K1 slices; or
- the L slices are last L slices in the K1 slices, where the K1 slices are arranged in a descending order based on the number of timestamps.

In one or more embodiments, performing coherent processing on the L slices to obtain coherent timestamp sets includes:

- dividing time length of each of the L slices into P1 consecutive time windows, where time windows corresponding to a first slice are $W_{11}$, $W_{12}$, . . . , $W_{1P1}$, time windows corresponding to a second slice are $W_{21}$, $W_{22}$, . . . , $W_{2P1}$, . . . , and time windows corresponding to an $L^{th}$ slice are $W_{L1}$, $W_{L2}$, . . . , $W_{LP1}$; and obtaining coherent timestamp sets based on time windows of the L slices, where integration periods of the coherent timestamp sets are equal to integration periods of the L slices, and the integration period of the coherent timestamp set is divided into P1 consecutively distributed time windows; and for an $i^{th}$ time window in the coherent timestamp set, $1 \le i \le P1$, and if at least one of the time windows $W_{1i}, W_{2i}, \ldots, W_{Li}$ does not cover the timestamp, no timestamp is set in the $i^{th}$ time window in the coherent timestamp set; or if the time windows $W_{1i}, W_{2i}, \ldots, W_{Li}$ all cover timestamps, the timestamps in the time windows $W_{1i}, W_{2i}, \ldots, W_{Li}$ are accumulated to obtain a timestamp in the $i^{th}$ time window in the coherent timestamp set.

In one or more embodiments, performing coherent processing on the K1 slices to obtain coherent timestamp sets includes:

setting a time window for each timestamp in an $X^{th}$ slice, where the $X^{th}$ slice is in the K1 slices, X=L+1, L+2, . . . , K1, and X and L are integers greater than 1;

setting time windows for L slices before the $X^{th}$ slice based on a time window position of the $X^{th}$ slice, where the $X^{th}$ slice is corresponding to $P_X$ time windows, the time windows corresponding to the $X^{th}$ slice are respectively $W_{X1}, W_{X2}, \ldots, W_{XP_X}$, time windows corresponding to an $(X-1)^{th}$ slice are respectively $W_{(X-1)1}, W_{(X-1)2}, \ldots, W_{(X-1)P_X}, \ldots$, and time windows corresponding to an $(X-L)^{th}$ slice are $W_{(X-L)1}, W_{(X-L)2}, \ldots, W_{(X-L)P_X}$;

obtaining intermediate coherent timestamp sets based on the $X^{th}$ slice and the previous L slices, where integration periods of the intermediate coherent timestamp sets are equal to an integration period of the $X^{th}$ slice, and the integration period of the intermediate coherent timestamp set is divided into $P_X$ time windows; and for an $i^{th}$ time window in the intermediate coherent timestamp set, $1 \le i \le P_X$, and if at least one of time windows $W_{Xi}, W_{(X-1)i}, \ldots, W_{(X-L)i}$ does not cover the timestamp, no timestamp is set in the $i^{th}$ time window; or if the time windows $W_{Xi}, W_{(X-1)i}, \ldots, W_{(X-L)i}$ all cover timestamps, the timestamps in the time windows $W_{Xi}, W_{(X-1)i}, \ldots, W_{(X-L)i}$ are accumulated to obtain a timestamp in the $i^{th}$ time window;

determining intermediate coherent timestamp sets corresponding to K−X+1 slices from the $X^{th}$ slice to the $K^{th}$ slice; and accumulating K−X+1 intermediate coherent timestamp sets to obtain coherent timestamp sets.

In one or more embodiments, a time window is set in the integration period of the $X^{th}$ slice centered on each timestamp.

In one or more embodiments, the histogram data includes multiple timestamps and counts corresponding to the timestamps.

In one or more embodiments, determining a time of flight based on the histogram data includes:

using a timestamp with the maximum count in the histogram data as a signal receiving moment; and calculating the time of flight based on a preset signal emission moment and the signal receiving moment.

Another aspect of this application provides a time-of-flight measurement apparatus, including:

an obtaining unit, configured to obtain N timestamp sets, where N is an integer greater than 1, each timestamp set includes multiple timestamps, and integration periods of the timestamp sets are equal;

a dividing unit, configured to divide the N timestamp sets into K1 groups, where K1 is an integer greater than 1, and each group includes one or more timestamp sets;

an accumulating unit, configured to accumulate the timestamp set included in each group to obtain K1 slices, where each slice includes multiple timestamps;

a coherence unit, configured to perform coherent processing on the K1 slices to obtain coherent timestamp sets;

a generating unit, configured to generate the histogram data based on the coherent timestamp sets; and a determining unit, configured to determine a time of flight based on the histogram data.

According to another aspect of this application, a computer-readable storage medium is provided, where the computer-readable storage medium stores an instruction, and when executed on the computer, the instruction enables the computer to perform the method according to the foregoing aspects.

According to another aspect of this application, a computer program product including an instruction is provided, and when executed on the computer, the instruction enables the computer to perform the method according to the foregoing aspects.

According to another aspect, this application provides a time-of-flight measurement method, including:

obtaining N timestamp sets, where N is an integer greater than 1, each timestamp set includes multiple timestamps, and one timestamp set is corresponding to one integration period;

obtaining P2 groups based on the N timestamp sets, where P2<N, P2 is a positive integer, and each group includes at least two timestamp sets;

accumulating the timestamp set included in each group to obtain P2 first intermediate timestamp sets;

screening each first intermediate timestamp set to obtain P2 second intermediate timestamp sets, where a screening process includes: moving, by a sliding window with preset width, on time length to implement screening; and if the number of timestamps covered by the sliding window is less than a number threshold, filtering out the timestamp in the sliding window; or if the number of timestamps covered by the sliding window is greater than or equal to the number threshold, retaining the timestamp in the sliding window;

accumulating the P2 second intermediate timestamp sets to obtain coherent timestamp sets;

obtaining the histogram data based on the coherent timestamp sets; and determining a time of flight based on the histogram data.

In one or more embodiments, each group includes the same number of timestamp sets, and a number threshold corresponding to each group is related to the number of timestamp sets.

In one or more embodiments, obtaining P2 groups based on the N timestamp sets includes:

selecting K2 timestamp sets from N timestamp sets P2 times randomly, to obtain P2 groups, where each group includes K2 timestamp sets, K2<N, and each group includes K2 different timestamp sets.

In one or more embodiments, the P2 groups are a group 1, a group 2, . . . , a group P2, and the N timestamp sets are a timestamp set 1, a timestamp set 2, . . . , a timestamp set N, where P2=N−K2+1; and the group 1 includes a timestamp set 1, a timestamp set 2, . . . , a timestamp set K, the group 2 includes a timestamp set 2, a timestamp set 3, . . . , a timestamp set K2+1, . . . , and a group N−K2+1 includes a timestamp set N−K2+1, a timestamp set N−K2+2, . . . , a timestamp set N.

In one or more embodiments, length of a sliding window is greater than or equal to an integer multiple of minimum time resolution of a TDC.

In one or more embodiments, numbers of timestamps in the groups are equal or close.

In one or more embodiments, accumulating the timestamp set included in each group to obtain P2 first intermediate timestamp sets includes:

starting P2 accumulation processing threads and invoking the P2 accumulation processing threads, to accumulate the timestamp sets included in each group to obtain the P2 first intermediate timestamp sets.

Screening each first intermediate timestamp set to obtain P2 second intermediate timestamp sets includes:

starting P2 screening processing threads and invoking the P2 screening processing threads, to screen each first intermediate timestamp set to obtain the P2 second intermediate timestamp sets.

In one or more embodiments, before obtaining P2 groups based on the N timestamp sets, the method further includes:

counting the number of timestamps corresponding to each of the N timestamp sets respectively; and sorting the N timestamp sets in descending order or ascending order based on the number of timestamps.

In one or more embodiments, the histogram data includes multiple timestamps and counts corresponding to the timestamps.

In one or more embodiments, determining a time of flight based on the histogram data includes:

using a timestamp with the maximum count in the histogram data as a receiving moment of an echo signal; and calculating the time of flight based on an emission moment of a pulse signal and the receiving moment of the echo signal.

Another aspect of this application provides a time-of-flight measurement apparatus, including:

an obtaining unit, configured to obtain N timestamp sets, where N is an integer greater than 1, each timestamp set includes multiple timestamps, and one timestamp set is corresponding to one integration period;

a grouping unit, configured to obtain P2 groups based on the N timestamp sets, where P2<N, P2 is a positive integer, and each group includes at least two timestamp sets;

an accumulating unit, configured to accumulate the timestamp set included in each group to obtain P2 first intermediate timestamp sets;

a screening unit, configured to screen each first intermediate timestamp set to obtain P2 second intermediate timestamp sets, where a screening process includes: moving, by a sliding window with preset width, on time length to implement screening; and if the number of timestamps covered by the sliding window is less than a number threshold, filtering out the timestamp in the sliding window; or if the number of timestamps covered by the sliding window is greater than or equal to the number threshold, retaining the timestamp in the sliding window, where the accumulating unit is further configured to accumulate the P2 second intermediate timestamp sets to obtain coherent timestamp sets;

a generating unit, configured to obtain the histogram data based on the coherent timestamp sets; and a calculation unit, configured to determine a time of flight based on the histogram data.

According to another aspect of this application, a computer-readable storage medium is provided, where the computer-readable storage medium stores an instruction, and when executed on the computer, the instruction enables the computer to perform the method according to the foregoing aspects.

According to another aspect of this application, a computer program product including an instruction is provided, and when executed on the computer, the instruction enables the computer to perform the method according to the foregoing aspects.

According to another aspect, this application provides a time-of-flight measurement method, including:

obtaining N timestamp sets, where N is an integer greater than 1, each timestamp set includes multiple timestamps, and integration periods of the timestamp sets are equal;

obtaining a histogram based on the N timestamp sets, where an abscissa of the histogram includes multiple timestamps, and an ordinate of the histogram includes counts corresponding to the timestamps;

obtaining the multiple total numbers of timestamps based on a preset time window and the histogram;

using a position with the maximum total number of timestamps as a target position; and determining a time of flight based on the target position.

In one or more embodiments, obtaining the multiple total numbers of timestamps based on a preset time window and the histogram includes:

setting multiple consecutive time windows of the same width from a start moment to an end moment in the histogram based on the preset time window; and summing timestamp counts of all the timestamps covered by each time window to obtain the multiple total numbers of timestamps.

Using a position with the maximum total number of timestamps as a target position includes using a time window position with the maximum total number of timestamps as the target position.

In one or more embodiments, obtaining the multiple total numbers of timestamps based on a preset time window and the histogram includes:

controlling the time window to slide between the start moment and the end moment in the histogram with a preset sliding step; and summing counts of all the timestamps covered by the time window at each sliding position to obtain the multiple total numbers of timestamps.

Using a position with the maximum total number of timestamps as a target position includes using a sliding position with the maximum total number of timestamps as the target position.

In one or more embodiments, determining a time of flight based on the target position includes:

obtaining a count of each timestamp covered by the time window at the target position;

using a timestamp with the maximum count as a peak timestamp; and calculating the time of flight based on the peak timestamp.

In one or more embodiments, determining a time of flight based on the target position includes:

obtaining a count of each timestamp covered by the time window at the target position;

sorting the timestamps in ascending order based on the count;

averaging following M timestamps to obtain a peak timestamp, where M is an integer greater than 1, and M<N;
using the peak timestamp as a signal receiving moment; and
calculating the time of flight based on an emission moment of a pulse signal and the receiving moment of the echo signal.

In one or more embodiments, determining a time of flight based on the target position includes:
obtaining a count of each timestamp covered by the time window at the target position;
sorting the timestamps in descending order based on the count;
averaging previous M timestamps to obtain a peak timestamp, where M is an integer greater than 1, and M<N;
using the peak timestamp as a signal receiving moment; and
calculating the time of flight based on an emission moment of a pulse signal and the receiving moment of the echo signal.

In one or more embodiments, obtaining a histogram based on the N timestamp sets includes:
selecting K3 timestamp sets from the N timestamp sets, where K3<N and K3 is an integer greater than 2; and accumulating the selected K3 timestamp sets to obtain a histogram.

In one or more embodiments, selecting K3 timestamp sets from the N timestamp sets includes one of the following:
selecting K3 timestamp sets from the N timestamp sets randomly;
selecting K3 timestamp sets with the minimum number of timestamps from the N timestamp sets;
selecting K3 timestamp sets with odd sequence numbers from the N timestamp sets; or selecting K3 timestamp sets with even sequence numbers from the N timestamp sets.

In one or more embodiments, obtaining a histogram based on the N timestamp sets includes:
smoothing the N timestamp sets to obtain N processed timestamp sets; and accumulating the N processed timestamp sets to obtain a final histogram.

In one or more embodiments, length of the time window is greater than or equal to an integer multiple of minimum time resolution of a TDC.

In one or more embodiments, length of the time window is equal to width of laser pulse.

Another aspect of this application provides a time-of-flight measurement apparatus, including:
an obtaining unit, configured to obtain N timestamp sets, where N is an integer greater than 1, each timestamp set includes multiple timestamps, and integration periods of the timestamp sets are equal;
a generating unit, configured to obtain a histogram based on the N timestamp sets, where an abscissa of the histogram includes multiple timestamps, and an ordinate of the histogram includes counts corresponding to the timestamps;
an acquiring unit, configured to obtain the multiple total numbers of timestamps based on a preset time window and the histogram;
a first determining unit, configured to use a position with the maximum total number of timestamps as a target position; and
a second determining unit, configured to determine a time of flight based on the target position.

According to another aspect of this application, a computer-readable storage medium is provided, where the computer-readable storage medium stores an instruction, and when executed on the computer, the instruction enables the computer to perform the method according to the foregoing aspects.

According to another aspect of this application, a computer program product including an instruction is provided, and when executed on the computer, the instruction enables the computer to perform the method according to the foregoing aspects.

In some embodiments of this application, the histogram data are obtained based on the DTOF measurement method. The count representing the number of signals in the histogram data is subject to digital filtering to obtain multiple filtered values, and then the correct time of flight of the target object is determined based on the time corresponding to the peak position in the filtered value, so that the count of the echo signal in the histogram data can basically remain unchanged and the count of the noise signal is attenuated, thereby improving a signal-to-background noise ratio (SBNR) of a distance detector and effectively improving measurement accuracy of time of flight of the distance detector.

In some embodiments of this application, multiple timestamp sets collected by the TDC in the integration period are obtained, the multiple timestamp sets are divided by slices, the multiple divided slices are subject to mutual coherent operation to obtain coherent timestamp sets, then the coherent timestamp sets are used to generate the histogram data. Thus, the echo signal and the noise signal can be determined based on magnitude of the timestamp count in the histogram data, and the timestamp corresponding to the time of flight and the noise signal is determined based on the timestamp in the histogram data, which not only improves the SBNR of the distance detector, but also effectively improves the measurement accuracy of the time of flight of the distance detector.

In some embodiments of this application, the TDC can be used to collect multiple timestamp sets, the multiple timestamp sets are divided into multiple groups, timestamp sets in each group are accumulated to obtain the first intermediate timestamp sets, the sliding window of the preset width is further used to screen each first intermediate timestamp set to obtain second intermediate timestamp sets, the histogram data is generated by accumulating the multiple second intermediate timestamp sets, and in this way, the time of flight can be determined based on the peak position of the count in the histogram data, so that the count of the timestamps corresponding to the echo signal in the histogram data basically remains unchanged and the count of the timestamps corresponding to the noise signal is suppressed, which not only improves the SBNR of the distance detector, but also effectively improves the measurement accuracy of the time of flight of the distance detector.

In some embodiments of this application, the multiple timestamp sets collected by the TDC in the integration period are obtained, the histogram is obtained based on the multiple timestamp sets, the time window is used to slide between the start moment and the end moment of the histogram, and the count of all the timestamps covered by the time window is collected at each sliding position. The position with the maximum total number of timestamps is the target position, that is, the time of receiving the echo signal is within a range of the time window at the target position, and the time of flight is calculated accordingly. Because the pulse of the emitted pulse signal has specific pulse width, that is, the pulse of the emitted pulse signal lasts for specific duration, the echo signal returned after the emitted pulse signal is reflected by the object has the same pulse width characteristic as the emitted pulse signal. However, the noise signal does not have such a pulse width characteristic. Therefore, the echo signals are enhanced after being accumulated in the time window, and correspondingly, the noise signal does not have such a characteristic.

In some embodiments of this application, the time window is slid on the histogram, the timestamp of the echo signal can be incorporated at a specific sliding position, so that the total number of timestamps after the summation in the time window is significant and the timestamp of the echo signal is easier to determine accurately, thereby improving the SBNR of the distance detector and effectively improving measurement accuracy of the time of flight of the distance detector.

BRIEF DESCRIPTION OF DRAWINGS

In order to more clearly describe the technical solutions in embodiments of this application, the following describes the drawings that need to be used in the embodiments of this application.

DETAILED DESCRIPTION

In order to make objectives, features, and advantages of embodiments of this application more obvious and understandable, the technical solutions in the embodiments of this application are described clearly in conjunction with the drawings in the embodiments of this application. The described embodiments are only a part of the embodiments of this application, but not all the embodiments. Based on the embodiments of this application, all other embodiments obtained by the person skilled in the art without inventive labor shall fall within the protection scope of this application.

When the following description refers to the drawings, unless otherwise indicated, the same numbers in different drawings indicate the same or similar elements. The implementation described in the following exemplary embodiments do not represent all implementations encompassed by this application. On the contrary, the implementations are merely examples of devices and methods consistent with some aspects of this application, as detailed in the appended claims.

In the description of this application, it shall be understood that the terms such "s "fi"st" a"d "second" are merely intended for a purpose of description, and shall not be understood as an indication or implication of relative importance. The person skilled in the art can understand specific meanings of the foregoing terms in this application according to contexts.

Embodiment 1

Figure 1A:
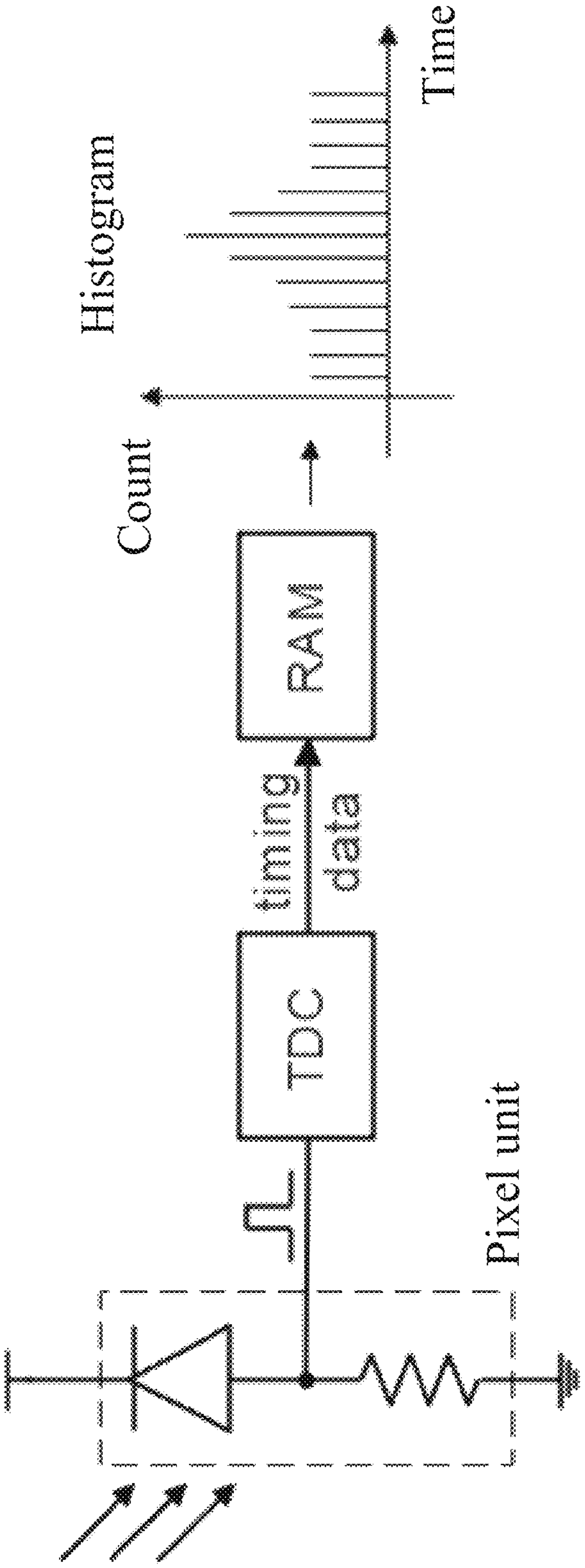
FIG. 1A is a schematic structural diagram of a detector in a time-of-flight measurement system according to embodiments of this application.

FIG. 1A is schematic structural diagram of a detector in a time-of-flight measurement system according to embodiments of this application. In some embodiments, the measurement system includes an emitter and a detector. The emitter is configured to emit a laser pulse, and the detector includes a pixel unit, a TDC, and a random access memory (RAM).

A basic measurement process of DTOF is as follows. The emitter emits a pulse signal to the target object, the pulse signal reaches the target object and is reflected, a pixel unit or a pixel array receives an echo signal reflected by the target object, and converts the echo signal into an electrical signal, a TDC records a generating time (or referred to as a timestamp) of the electrical signal, the generating time is used as an arrival time of the echo signal, a RAM stores the arrival time of the echo signal, a time of flight (TOF) can be obtained based on an emission time of the pulse signal and the arrival time of the echo signal, and therefore, a distance between the emitter and the target object can be calculated based on the constant speed of light and the time of flight.

However, in an actual measurement process, due to high sensitivity of the detector, signals received by the detector may further include a noise signal in addition to the echo signal. A source of the noise signal includes a component inside the detector or incident ambient light, but the detector cannot effectively identify the noise signal or the echo signal in the received signals. To reduce impact of the noise signal on a DTOF measurement result, time-correlated single photon counting (TCSPC) in related technologies is used to measure the time of flight. A main principle is that the emitter emits multiple laser pulses in a time frame; and because a moving speed of the target object is much lower than the speed of light, the distance from the emitter to the target object in the same time frame can be considered to be unchanged, that is, the time of flight remains unchanged, arrival times of the echo signals are coherent or consistent, the arrival time of the noise signal is random, and after multiple integration periods, the echo signals can outstrip the noise signal.

Figure 1B:
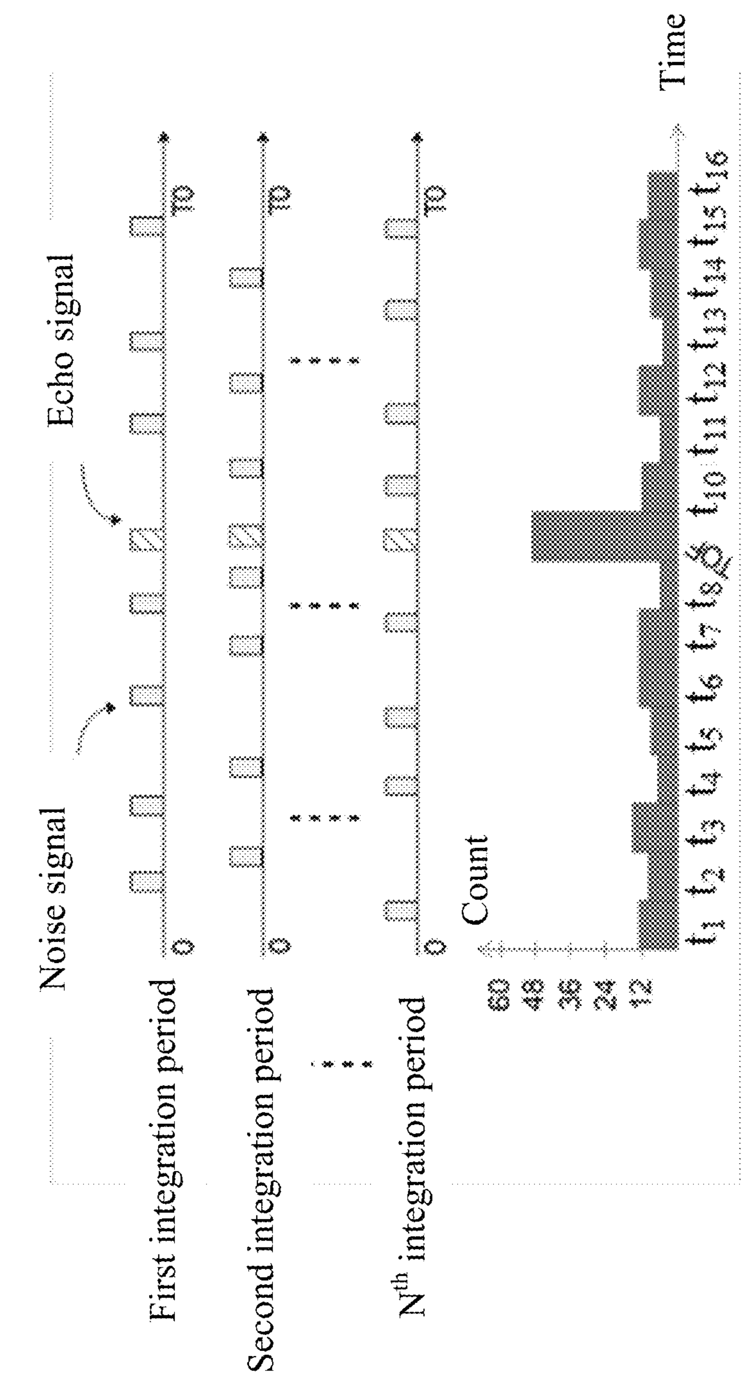
FIG. 1B is a schematic diagram of a principle of generating histogram data according to embodiments of this application.

For example, referring to FIG. 1B, the time frame consists of N integration periods, N is an integer greater than 1, the echo signal received by the detector in each integration period is denoted by a rectangle filled with diagonal lines, and the received noise signal is denoted by a gray colored rectangle. The emitter emits laser pulse signals at start times of a first integration period to an $N^{th}$ integration period. It can be learned from the figure that the detector receives multiple noise signals in addition to the echo signal in each integration period, a position of the echo signal basically remains unchanged, and a position of each noise signal is more disordered. A position of a signal (the noise signal or the echo signal) on a horizontal axis represents an arrival time, and the time of flight (TOF) can be calculated based on the emission time of the pulse signal and the arrival time of the echo signal, and then a count (the number of accumulations) of echo signals corresponding to the same time of flight can be collected. The histogram (histogram) is generated at the bottom of FIG. 1B based on the number of accumulations. A horizontal axis of the histogram represents the time of flight, and a vertical axis represents the count. A time corresponding to the maximum count in the histogram is the time of flight.

Figure 1C:
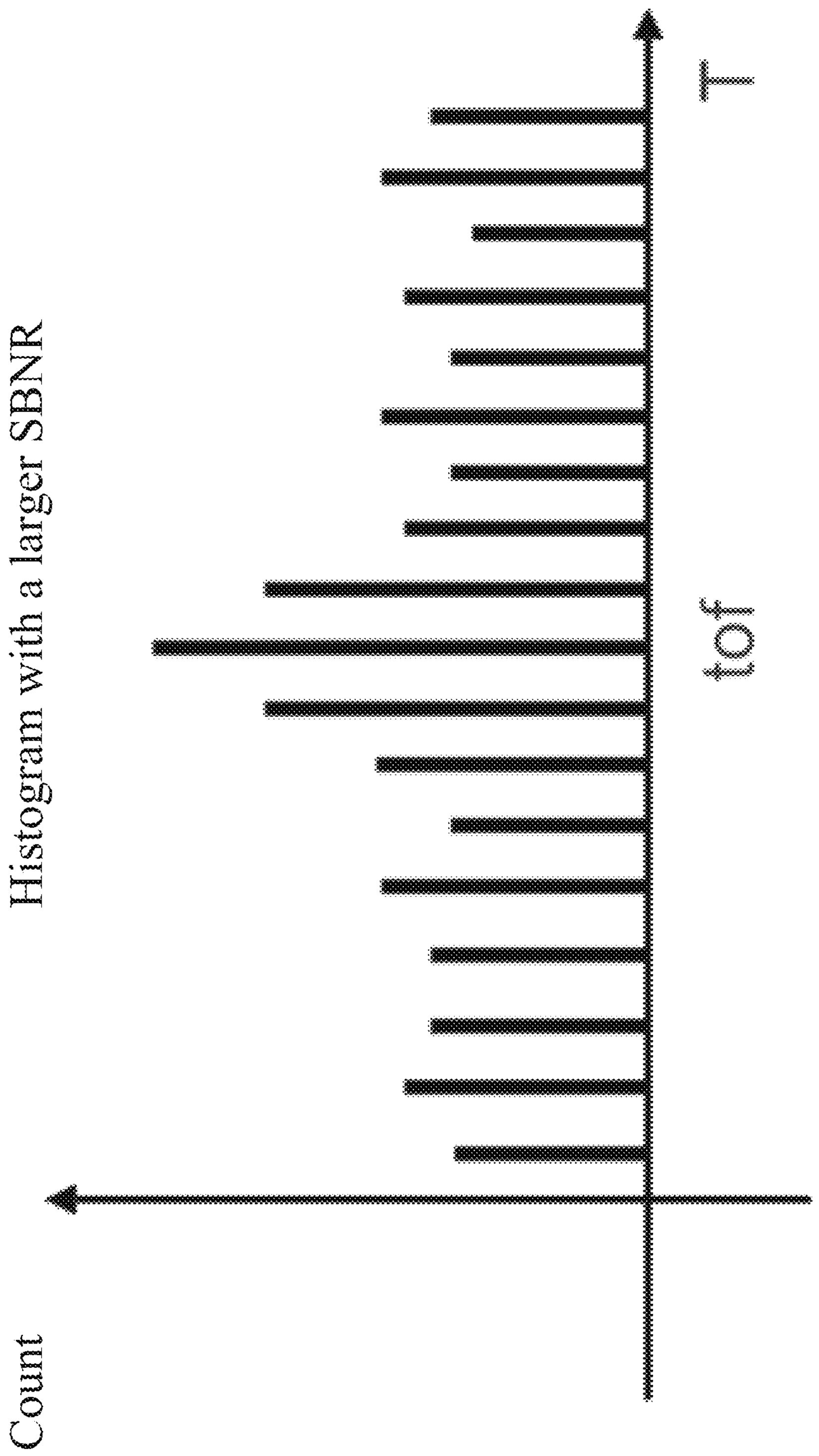
FIG. 1C and FIG. 1D are schematic diagrams of histogram data according to embodiments of this application.

It can be learned that, in the current time-of-flight measurement method based on the DTOF, to detect a correct time of flight, it is critical to correctly identify a peak position of counts in the histogram and further identify the correct time of flight of the echo signal. As shown in FIG. 1C below, when the ambient light is weak and there is a small distance between the emitter and the target, the SBNR is large, and a peak value of the histogram corresponding to the echo signal is easy to obtain after multiple integration periods.

Figure 1D:
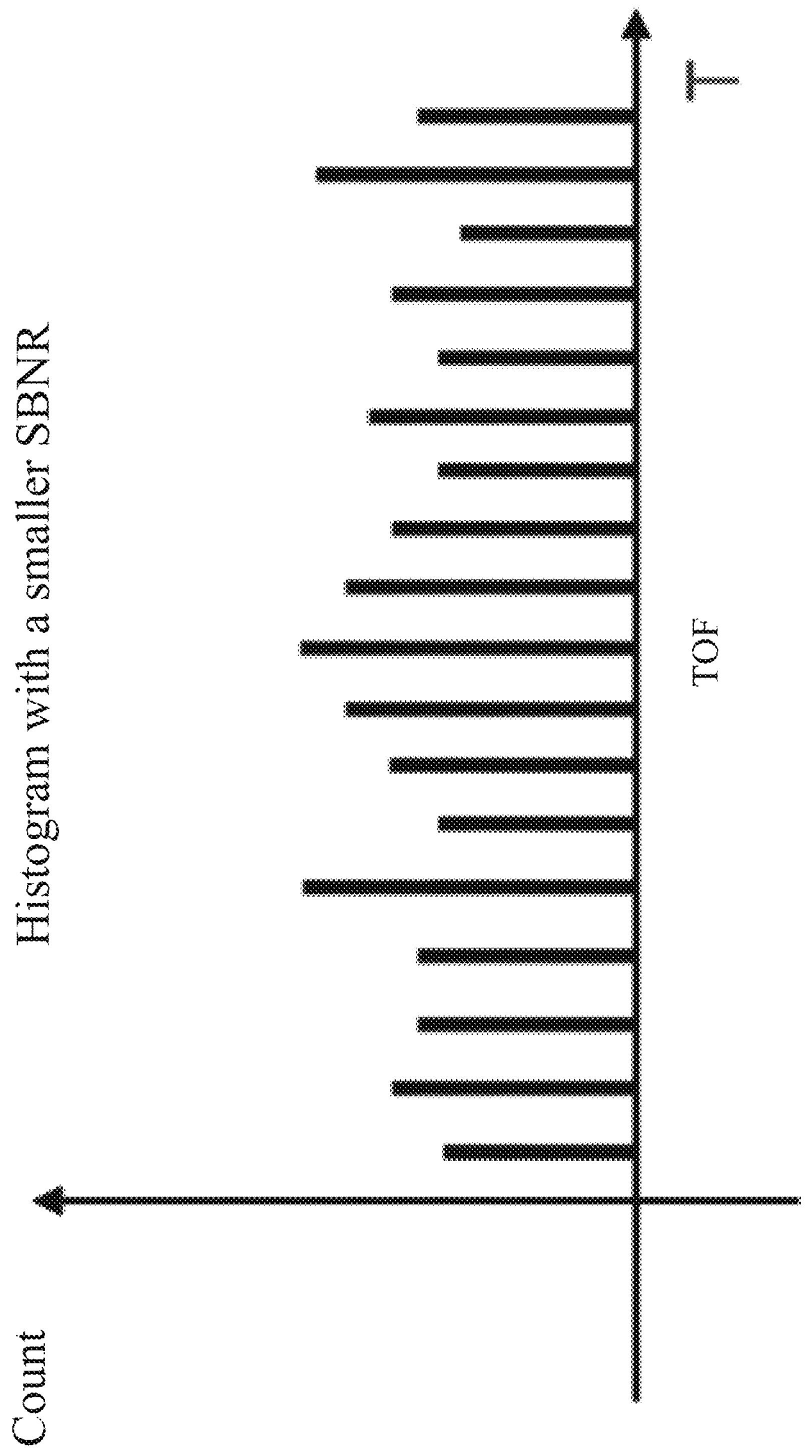

However, when the ambient light has strong light intensity or there is a large distance between the emitter and the target object, the number of signal photons received by the detector decreases as the distance increases, received ambient photons remain unchanged as the distance changes, and the SBNR is reduced. As shown in FIG. 1D below, due to a random effect of the ambient light, some peak values of the ambient light on the histogram may fluctuate to be greater than a corresponding peak value of the echo signal, and as a result, a rear-end circuit incorrectly recognizes the peak value, thereby causing a detection error. In addition, the stronger the ambient light and the larger the distance between the emitter and the detected target, the greater the probability that the peak value of the noise signal covers the peak value of the echo signal and the lower the detection accuracy.

Figure 2:
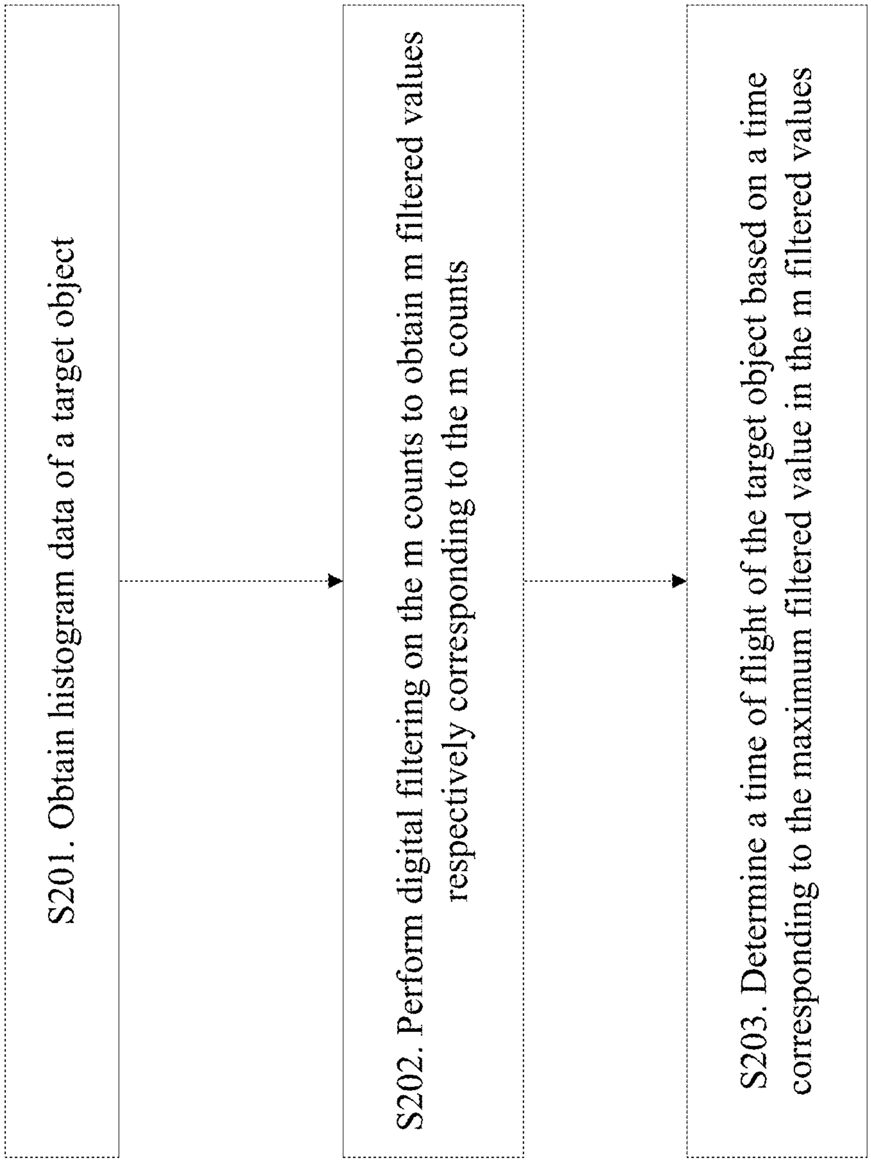
FIG. 2 is a schematic flowchart of a time-of-flight measurement method according to embodiments of this application.

FIG. 2 is a schematic flowchart of a time-of-flight measurement method according to embodiments of this application. The method includes, but is not limited to, the following steps.

S201. Obtain histogram data of a target object.

The histogram data is generated based on the N laser pulses emitted by the emitter. Because one echo signal is reflected back each time the laser pulse reaches the target object, N pulses correspond to N echo signals. Each pulse corresponds to one integration period, and the N pulses correspond to the N integration periods. Further, in some embodiments, N echo signals and noise signals may be accumulated to generate the histogram, and each echo signal corresponds to m counts. Specifically, N is an integer greater than 1, m is an integer greater than 1, the histogram data is used to characterize the histogram of the time of flight, each of the m counts is associated with one time, and the histogram data is generated based on the DTOF measurement method in FIG. 1A and FIG. 1B. For the specific process, refer to description of FIG. 1A and FIG. 1B. Details are not described herein again.

Figure 3:
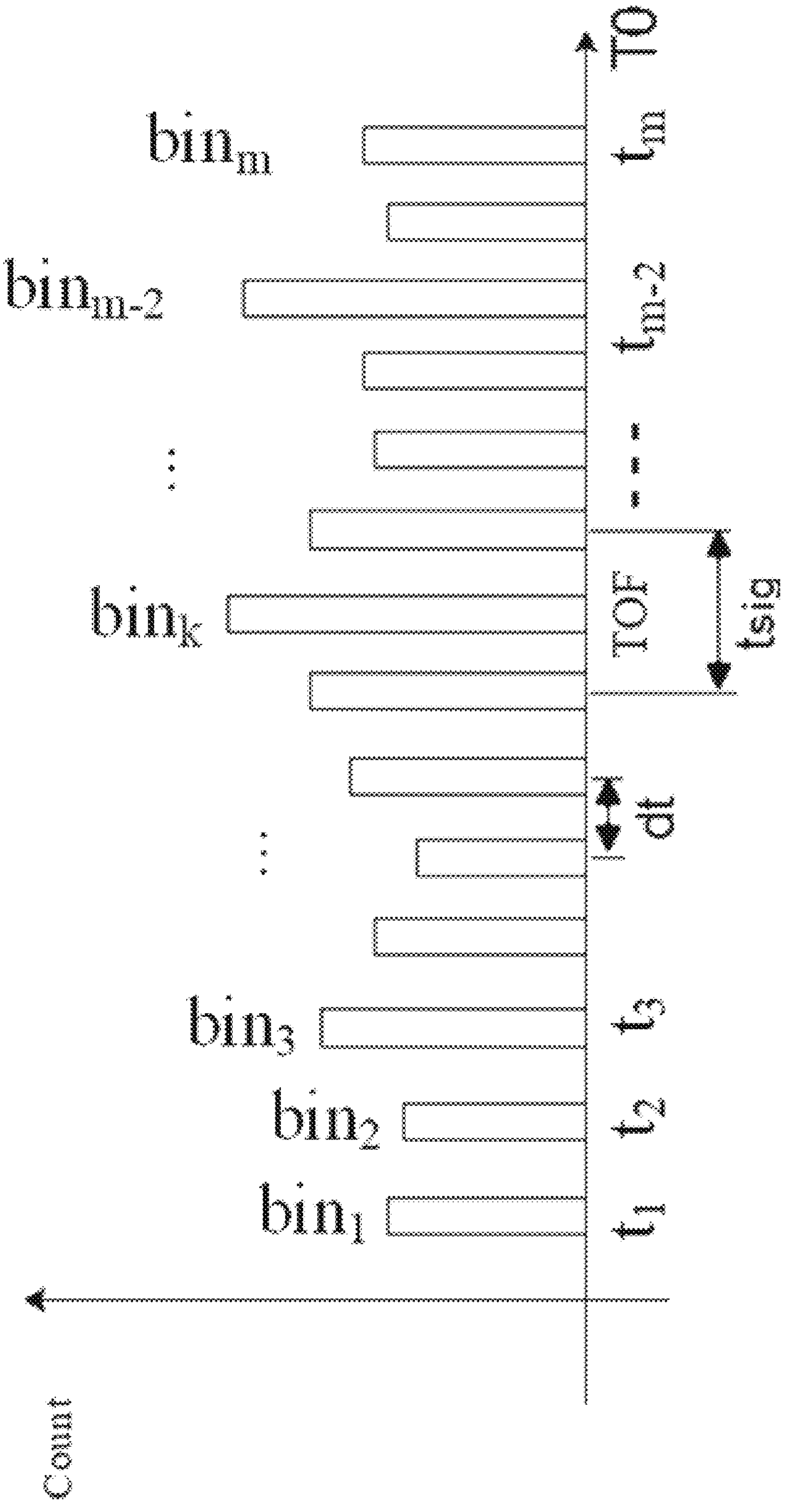
FIG. 3 to FIG. 6 are schematic diagrams of a principle of performing digital filtering on histogram data according to embodiments of this application.
Figure 4:
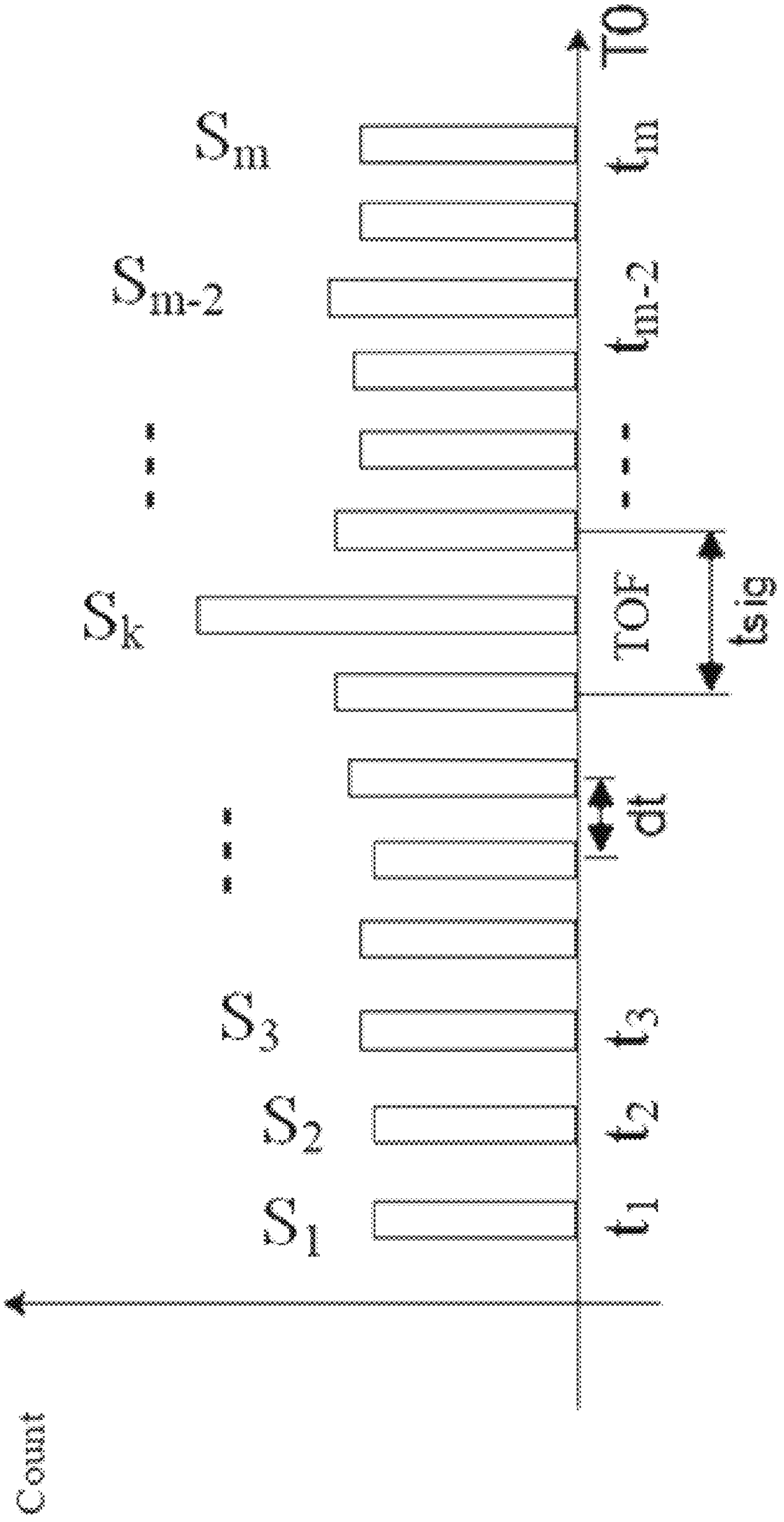

FIG. 3 shows a histogram generated based on the DTOF method in FIG. 1A and FIG. 1B. Histogram data corresponding to the histogram includes a count and a time associated with the count, an abscissa in the histogram represents the time, and an ordinate represents the count. The m counts are $bin_1, bin_2, \ldots, bin_k, \ldots, bin_m$, and times corresponding to the m counts are $t_1, t_2, \ldots, t_m$. A time interval between the two adjacent counts in the histogram is greater than the minimum time resolution of the TDC.

In one or more embodiments, obtaining histogram data of a target object includes: reading the m counts included in the histogram data and the time associated with the m counts from a first RAM based on a preset clock period.

The histogram data is stored in the first RAM, the histogram data includes the count and time, the histogram data is used to characterize the histogram of the time of flight, and a time interval between the two adjacent counts in the histogram is greater than or equal to the minimum time resolution of the TDC, which depends on a hardware capacity of the TDC. For example, referring to FIG. 3, the time interval between two adjacent counts is dt, and m counts and times associated with the m counts are read from the first RAM with dt as the clock period.

S202. Perform digital filtering on the m counts to obtain m filtered values respectively corresponding to the m counts.

The m counts are discrete data, the m counts can be subject to digital filtering through a digital filter to obtain the m filtered values, and the digital filter is configured to suppress or reduce an interference parameter caused by the noise signal in the m counts. Based on a band characteristic of the digital filter, the digital filter can be a low-pass filter, a high-pass filter, a band-pass filter, or a band-stop filter; or based on an impulse response type of the digital filter, the digital filter can be an finite impulse response (FIR) filter or an infinite impulse response (IIR) filter. An order of the digital filter is related to filtering precision. The higher the order of the digital filter, the higher the filtering precision, but the slower the convergence speed of the digital filter. The lower the order of the digital filter, the lower the filtering precision, but the greater the convergence speed of the digital filter. In some embodiments, an appropriate order can be selected based on the ranging precision. For higher ranging precision, a higher-order digital filter can be selected; or for lower ranging precision, a lower-order digital filter can be selected.

In one or more embodiments, performing digital filtering on the m counts to obtain m filtered values respectively corresponding to the m counts includes:

allocating storage addresses based on the m filtered values and times respectively corresponding to the m filtered values; and storing the m filtered values and the times respectively corresponding to the m filtered values in a second RAM based on the storage addresses.

The m filtered values and the corresponding times are periodically stored in the second RAM, a reading period of the counts and a storage period of the filtered values are kept different, and in this way, the m filtered values and the corresponding times are stored in the second RAM in m clock periods. For example, referring to FIG. 3, in a first clock period, a count $bin_1$ and a time $t_1$ are read from the first RAM, then the count $bin_1$ is subject to digital filtering to obtain a filtered value $S_1$, a storage address 1 is assigned to the filtered value $S_1$ and the time $t_1$, and the filtered value $S_1$ and the time $t_1$ are stored in a storage unit indicated by the storage address 1 in the second RAM; in a second clock period, a count $bin_2$ and a time $t_2$ are read from the first RAM, then the count $bin_2$ is subject to digital filtering to obtain a filtered value $S_2$, a storage address 2 is assigned to the filtered value $S_2$ and the time $t_2$, and the filtered value $S_2$ and the time $t_2$ are stored in a storage unit indicated by the storage address 2 in the second RAM, and so on; and in an $m^{th}$ clock period, a count $bin_m$ and a time $t_m$ are read from the first RAM, then the count $bin_m$ is subject to digital filtering to obtain a filtered value $S_m$, a storage address m is assigned to the filtered value $S_m$ and the time $t_m$, and the filtered value $S_m$ and the time $t_m$ are stored in a storage unit indicated by the storage address m in the second RAM.

In a possible embodiment, a method for performing frequency-domain digital filtering includes:

when the digital filter is the FIR filter, an order of the FIR filter is n−1, the m counts are $bin_1, bin_2, \ldots, bin_m$, the m filtered values are $S_1, S_2, \ldots, S_m$, and coefficients of the FIR filter are $\alpha_1, \alpha_2, \ldots, \alpha_n$, where n is an integer greater than or equal to 1, and m>n; and $S_m=\alpha_1\times bin_m+\alpha_2\times bin_{m-1}+\alpha_3\times bin_{m-2}+\ldots+\alpha_n\times bin_{m-n}$.

Herein, $S_1=\alpha_1\times bin_1$, $S_2=\alpha_1\times bin_2+\alpha_2\times bin_1$, $S_3=\alpha_1\times bin_3+\alpha_2\times bin_2+\alpha_3\times bin_1$, and so on, where $S_m=\alpha_1\times bin_m+\alpha_2\times bin_{m-1}+\alpha_3\times bin_{m-2}+\ldots+\alpha_n\times bin_{m-n}$. The digital filter performs digital filtering on m counts based on an equivalent sampling clock period, performs digital filtering once per clock period, and completes digital filtering of the m counts in the m clock periods.

In one or more embodiments, one or more of a configured order, equivalent sampling clock frequency, window function, and equivalent signal frequency are obtained.

In one or more embodiments, a coefficient of an FIR filter is obtained based on the order, the equivalent sampling clock frequency, the window function, and the equivalent signal frequency by using a MATLAB toolbox.

When the digital filter is the FIR filter, a coefficient of the FIR filter is determined based on the equivalent sampling clock frequency, the equivalent signal frequency, the order, and the window function. The equivalent sampling clock frequency represents sampling frequency of discrete digital signals input by the FIR filter, and the equivalent signal frequency represents signal frequency of the discrete digital signals input by the FIR filter; and the window function includes, but is not limited to, a rectangular window function, a Hanning window function, a Hamming window function, or a triangular window function. The window function can be selected based on an actual need. In some embodiments, the MATLAB toolbox can be invoked to input the equivalent sampling clock frequency, the equivalent signal frequency, the order, and the window function to generate the coefficient of the FIR filter. In some embodiments, the equivalent sampling clock frequency can be calculated based on the resolution of the TDC, that is, based on the time interval between two adjacent counts in the histogram. Referring to FIG. 3, a time interval between two adjacent counts is dt, $$T_{sample} = dt,\ f_{sample} = \frac{1}{T_{sample}},$$

and $f_{sample}$ is the equivalent sampling clock frequency; and the equivalent signal period is equal to half-peak width in the histogram. Referring to FIG. 3, the half-peak width in the histogram is $t_{sig}$, $$T_{si} = t_{sig},\ f_{si} = \frac{1}{t_{sig}},$$

and $f_{si}$ is the equivalent signal period.

For example, the FIR filter is 32-order, the equivalent sampling clock period is 2 ns, the equivalent signal period is 10 ns, the window function is the rectangular window function, and the foregoing parameters are input into the MATLAB toolbox, to obtain coefficients of the FIR filter: $\alpha_1$=0.018, $\alpha_2$=0.014, $\alpha_3$=0.007, $\alpha_4$=−0.004, $\alpha_5$=−0.015, $\alpha_6$=−0.025, $\alpha_7$=−0.032, $\alpha_8$=−0.031, $\alpha_9$=−0.023, $\alpha_{10}$=−0.007; $\alpha_{11}$=0.017, $\alpha_{12}$=0.045, $\alpha_{13}$=0.077, $\alpha_{14}$=0.106, $\alpha_{15}$=0.131, $\alpha_{16}$=0.147, $\alpha_{17}$=0.152, $\alpha_{18}$=0.147, $\alpha_{19}$=0.131, $\alpha_{20}$=0.106, $\alpha_{21}$=0.077, $\alpha_{22}$=0.045, $\alpha_{23}$=0.017, $\alpha_{24}$=−0.007, $\alpha_{25}$=−0.023, $\alpha_{26}$=−0.031, $\alpha_{27}$=−0.032, $\alpha_{28}$=−0.025, $\alpha_{29}$=−0.015, $\alpha_{30}$=−0.004, $\alpha_{31}$=0.007, $\alpha_{32}$=0.014, and $\alpha_{33}$=0.018.

S203. Determine a time of flight of the target object based on a time corresponding to a peak value in the m filtered values.

Herein, m filtered values are obtained after m counts are subject to digital filtering, m filtered values and m counts are in a one-to-one mapping relationship, a peak value (maximum value) is determined from the m filtered values, and then based on the time corresponding to the peak value, the time of flight of the target object is determined. The m filtered values are respectively $S_1, S_2, \ldots, S_k, \ldots, S_m$, where $S_k$ is the peak value in the m filtered values, and time corresponding to $S_k$ is the time of flight of the target object.

Figure 5:
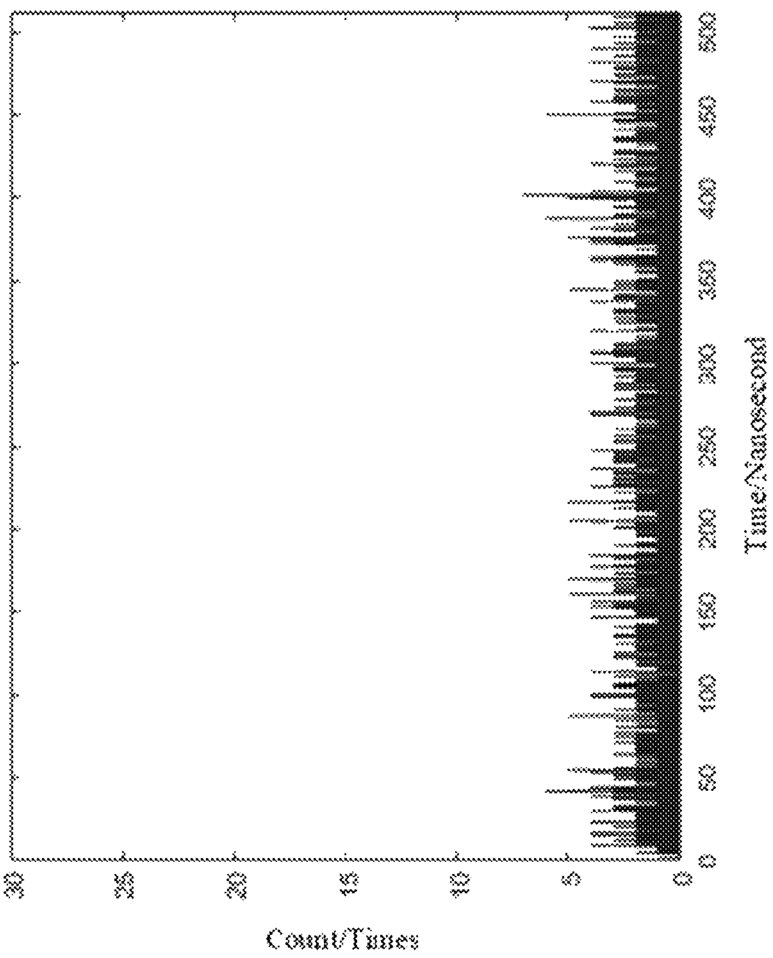
Figure 6:
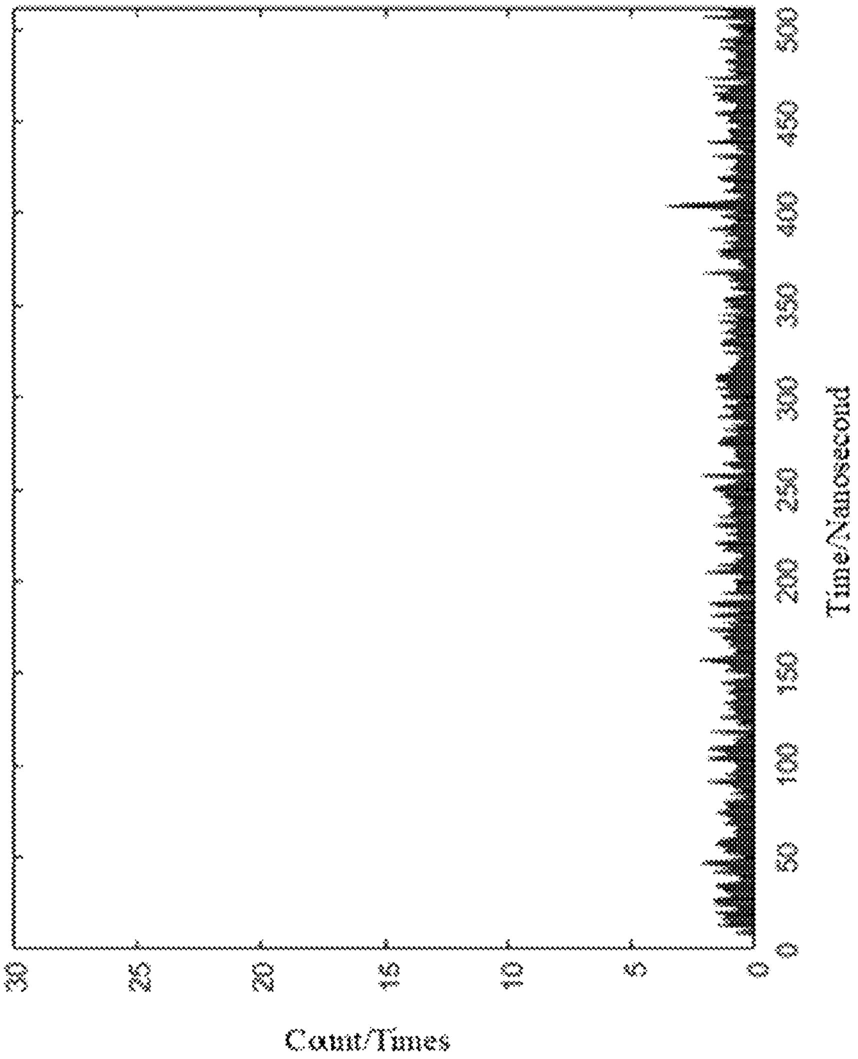

FIG. 5 shows a histogram before digital filtering. A peak value in counts in the histogram is not sufficiently significant due to impact of the noise signal. FIG. 6 shows a histogram obtained after the histogram in FIG. 5 is subject to digital filtering. It can be learned that a count other than the peak value in FIG. 6 is suppressed, the peak value is more significant, time corresponding to the peak value is about 400 ns, and the time is the correct time of flight of the target object.

Based on description of FIG. 2, the histogram data are obtained based on the DTOF measurement method. The count representing the number of echo signals in the histogram data is subject to digital filtering to obtain multiple filtered values, and then the correct time of flight of the target object is determined based on the time corresponding to the peak position in the filtered value, so that the count of the echo signal in the histogram data can basically remain unchanged and the noise signal is effectively suppressed, thereby improving an SBNR of a distance detector and effectively improving measurement accuracy of time of flight of the distance detector.

The time-of-flight measurement method in some embodiments is described in detail above, and a time-of-flight measurement apparatus (referred to as an apparatus 3 below) according to some embodiments is provided below.

Figure 7:
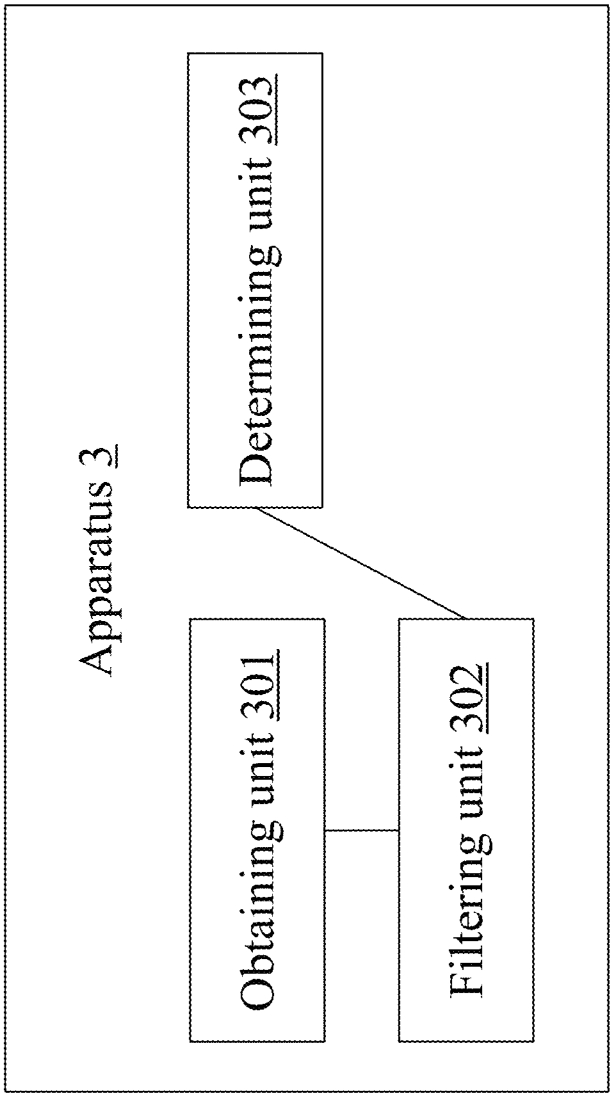
FIG. 7 is a schematic structural diagram of a time-of-flight measurement apparatus according to embodiments of this application.

The apparatus 3 shown in FIG. 7 can implement the time-of-flight measurement method in the embodiment shown in FIG. 2. The apparatus 3 includes an obtaining unit 301, a filtering unit 302, and a determining unit 303.

The obtaining unit 301 is configured to obtain histogram data of a target object, where the histogram data includes m counts, m is an integer greater than 1, and each of the m counts is associated with a time.

The filtering unit 302 is configured to perform digital filtering on the m counts to obtain m filtered values respectively corresponding to the m counts.

The determining unit 303 is configured to determine a time of flight of the target object based on a time corresponding to a peak value in the m filtered values.

In one or more embodiments, performing digital filtering on the m counts includes: performing, by a digital filter, digital filtering on the m counts, where the digital filter includes an FIR filter or an IIR filter.

In one or more embodiments, when the digital filter is the FIR filter, an order of the FIR filter is n−1, coefficients of the FIR filter are $\alpha_1, \alpha_2, \ldots, \alpha_n$, the m counts are $bin_1, bin_2, \ldots, bin_m$, and the m filtered values are $S_1, S_2, \ldots, S_m$, where n is an integer greater than or equal to 1, and m>n; and $S_m=\alpha_1\times bin_m+\alpha_2\times bin_{m-1}+\alpha_3\times bin_{m-2}+\ldots+\alpha_n\times bin_{m-n}$.

In one or more embodiments, obtaining histogram data of a target object includes: reading the m counts included in the histogram data and the time associated with the m counts from a first RAM based on a preset period, where the preset period is a time interval between two adjacent counts in the histogram data.

In one or more embodiments, performing digital filtering on the m counts to obtain m filtered values respectively corresponding to the m counts includes:

- generating m storage addresses based on times respectively corresponding to the m filtered values; and
- storing the m filtered values in a second RAM based on the m storage addresses.

In one or more embodiments, the apparatus further includes:

- a coefficient generating unit, configured to obtain one or more of a configured order, equivalent sampling clock frequency, window function, and equivalent signal frequency.

In one or more embodiments, a coefficient of an FIR filter is obtained based on the order, the equivalent sampling clock frequency, the window function, and the equivalent signal frequency by using a MATLAB toolbox.

In one or more embodiments, an equivalent signal period is equal to half-peak width corresponding to the histogram data.

In one or more embodiments, the sampling clock frequency is equal to a time interval between two adjacent counts in the histogram data.

These embodiments of this application and the method embodiments in FIG. 1A to FIG. 6 are based on the same concept, and also have the same technical effects. For a specific process, refer to the description of the method embodiments in FIG. 1A to FIG. 6.

Details are not described herein again.

The apparatus 3 may be a field-programmable gate array (FPGA), a dedicated integrated chip, a system on chip (SoC), a central processing unit (CPU), a network processor (NP), a digital signal processing circuit, a micro controller unit (MCU), a programmable logic device (PLD) or other integrated chips that realize related functions.

The time-of-flight measurement method in some embodiments is described in detail above, and a time-of-flight measurement apparatus (referred to as an apparatus 4 below) according to some embodiments is provided below.

Figure 8:
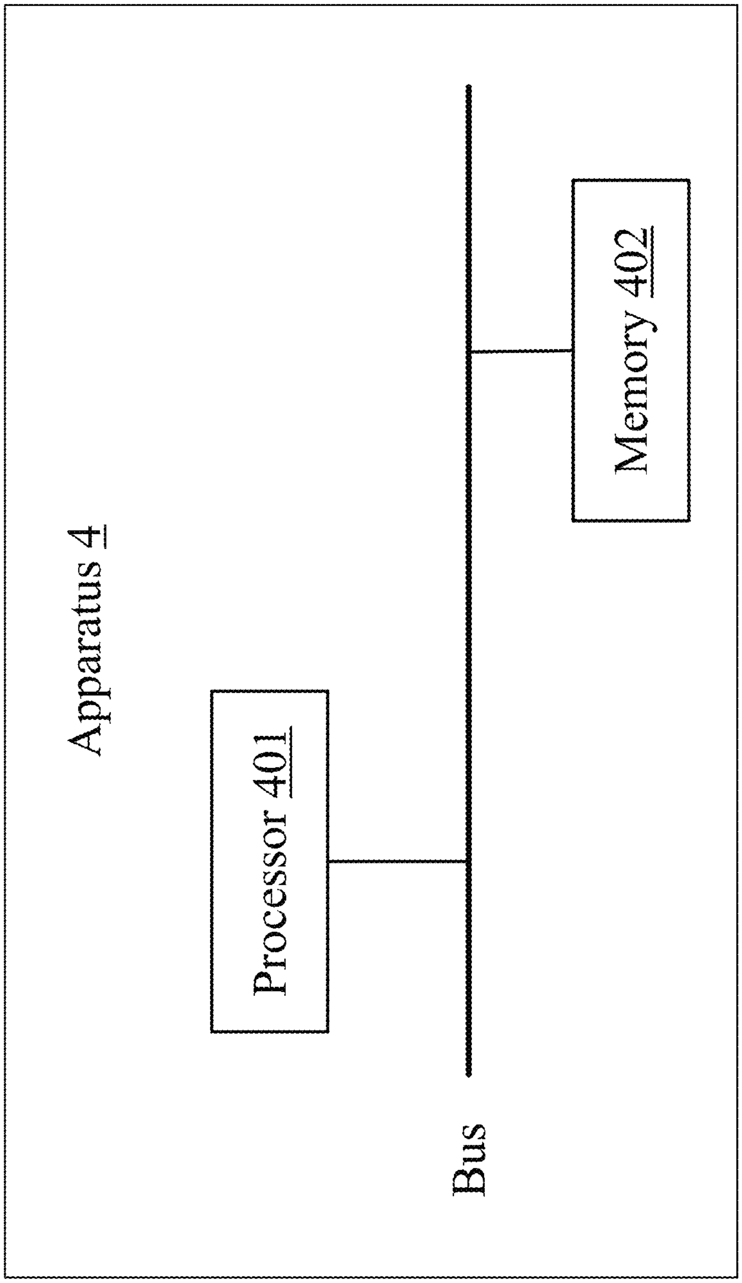
FIG. 8 is another schematic structural diagram of a time-of-flight measurement apparatus according to embodiments of this application.

FIG. 8 is a schematic structural diagram of an apparatus according to embodiments of this application. The apparatus is referred to as an apparatus 4 below. The apparatus 4 can be integrated into the LiDAR in the foregoing embodiments or a supporting platform. As shown in FIG. 8, the apparatus includes a memory 402 and a processor 401.

The memory 402 may be an independent physical unit, and may be connected to the processor 401 through a bus. The memory 402 and the processor 401 can also be integrated together, or implemented through hardware or the like.

In some embodiments, the apparatus 4 may also include an emitter and a receiver, the emitter is configured to emit a laser signal, and the receiver is configured to receive the laser signal.

The memory 402 is configured to store a program for implementing the foregoing method embodiments or each module in the apparatus embodiments, and the processor 401 invokes the program to perform operations in the foregoing method embodiments.

In some embodiments, when a part or all of the time-of-flight measurement methods in the foregoing embodiments is implemented through software, the apparatus may also only include a processor. The memory for storing the program is located outside the apparatus, and the processor is connected to the memory through a circuit or a wire, and is configured to read and execute the program stored in the memory.

The processor may be a CPU, an NP, or a combination of the CPU and the NP.

The processor can further include a hardware chip. The forgoing hardware chip can be an application-specific integrated circuit (ASIC), a PLD, or a combination thereof. The forgoing PLD may be a complex programmable logic device (CPLD), a FPGA, a generic array logic (GAL) or any combination thereof.

A memory can include a volatile memory, such as a random-access memory (RAM). The memory can also include a non-volatile memory, such as a flash memory, a hard disk drive (HDD) or a solid-state drive (SSD). The memory can also include a combination of the above types of memories.

In the foregoing embodiments, a sending unit or the emitter performs a sending step in the foregoing method embodiments, a receiving unit or the receiver performs a receiving step in the foregoing method embodiments, and another step is performed by another unit or processor. The sending unit and the receiving unit can form a transceiver unit, and the receiver and the emitter can form a transceiver.

An embodiment of this application further provides a computer storage medium that stores a computer program, where the computer program is used to perform the time-of-flight measurement method provided in the foregoing embodiments.

An embodiment of this application further provides a computer program product including an instruction, and when executed on the computer, the instruction enables the computer to perform the time-of-flight measurement method provided in the foregoing embodiments.

Embodiment 2

Referring back to FIG. 1A, in some embodiments, the measurement apparatus includes an emitter (not shown in the figure) and a detector. The emitter is configured to emit a laser pulse, and the detector may include a pixel unit, a TDC, and a RAM. The pixel unit may include one or more SPADs.

A basic DTOF measurement process is as follows. The DTOF emits N pulse signals and receive N echo signals within a single-frame measurement time, and then a histogram is generated by statistics based on a record of the time of flight of the N pulse signals, and the time of flight occurring at the highest frequency is used to calculate a distance between LiDAR and a target object.

Specifically, the emitter emits a pulse signal to the target object, the pulse signal reaches the target object and is reflected, a pixel unit or a pixel array receives an echo signal reflected by the target object, and converts the echo signal into an electrical signal, a TDC records a generating time (or referred to as a timestamp) of the electrical signal, the generating time is used as an arrival time of the echo signal, a RAM stores the arrival time of the echo signal, a time of flight (TOF) can be obtained based on an emission time of the pulse signal and the arrival time of the echo signal, and therefore, a distance between the emitter and the target object can be calculated based on the constant speed of light and the time of flight.

However, in an actual measurement process, due to high sensitivity of the detector, signals received by the detector may further include a noise signal in addition to the echo signal. A source of the noise signal includes a component inside the detector or incident ambient light, but the detector cannot effectively identify the noise signal or the echo signal in the received signals. To reduce impact of the noise signal on a DTOF measurement result, TCSPC in related technologies is used to measure the time of flight. A main principle is that the emitter emits multiple laser pulse signals in a time frame; and because a moving speed of the target object is much lower than the speed of light, the distance from the emitter to the target object in the same time frame can be considered to be unchanged, that is, the time of flight remains unchanged, arrival times of the echo signals are coherent or consistent, the arrival time of the noise signal is random, and after multiple integration periods, the echo signals accumulated by an SiPM (Silicon Photomultiplier) through multiple SPADs in each integration period can outstrip the noise signal.

For example, referring to FIG. 1B, the time frame consists of N integration periods, N is an integer greater than 1, the echo signal received by the detector in each integration period is denoted by a rectangle filled with diagonal lines, and the received noise signal is denoted by a gray colored rectangle. The emitter emits laser pulse signals at start times of a first integration period to an $N^{th}$ integration period. It can be learned from the FIG. 1B that the detector receives multiple noise signals in addition to the echo signal in each integration period, and because a position of the echo signal basically remains unchanged, and a position of each noise signal is relatively random. Therefore, the time of flight (TOF) can be calculated based on the time of emitting the pulse signal by the emitter and the time of receiving the echo signal by the detector, and then a count (the number of accumulations) corresponding to the same time of flight can be collected. The histogram is generated at the bottom of FIG. 1B based on the number of accumulations. A horizontal axis of the histogram represents the time, and a vertical axis represents the count. A time corresponding to the maximum count in the histogram is the time of flight.

It can be learned that, in the current time-of-flight measurement method based on the DTOF, to detect a correct time of flight, it is critical whether a peak position of counts in the histogram can be correctly identified and the correct time of flight is further identified.

As shown in FIG. 1C below, when the ambient light is weak and there is a small distance between the emitter and the target, the SBNR is large, and a peak value of the histogram corresponding to the echo signal is easy to obtain after multiple integration periods. However, when the ambient light has strong light intensity or there is a large distance between the emitter and the target object, the number of signal photons received by the detector decreases as the distance increases, received ambient photons still remain unchanged, and the SBNR is reduced. As shown in FIG. 1D below, due to randomness of the noise signal, some peak values of the noise signal on the histogram may fluctuate to be greater than a corresponding peak value of the signal photons, and as a result, a rear-end circuit incorrectly recognizes the peak value, thereby causing a detection error. In addition, the stronger the ambient light and the larger the distance between the emitter and the detected target, the greater the probability that the peak value of the noise signal covers the peak value of the echo signal and the lower the detection accuracy.

Figure 9:
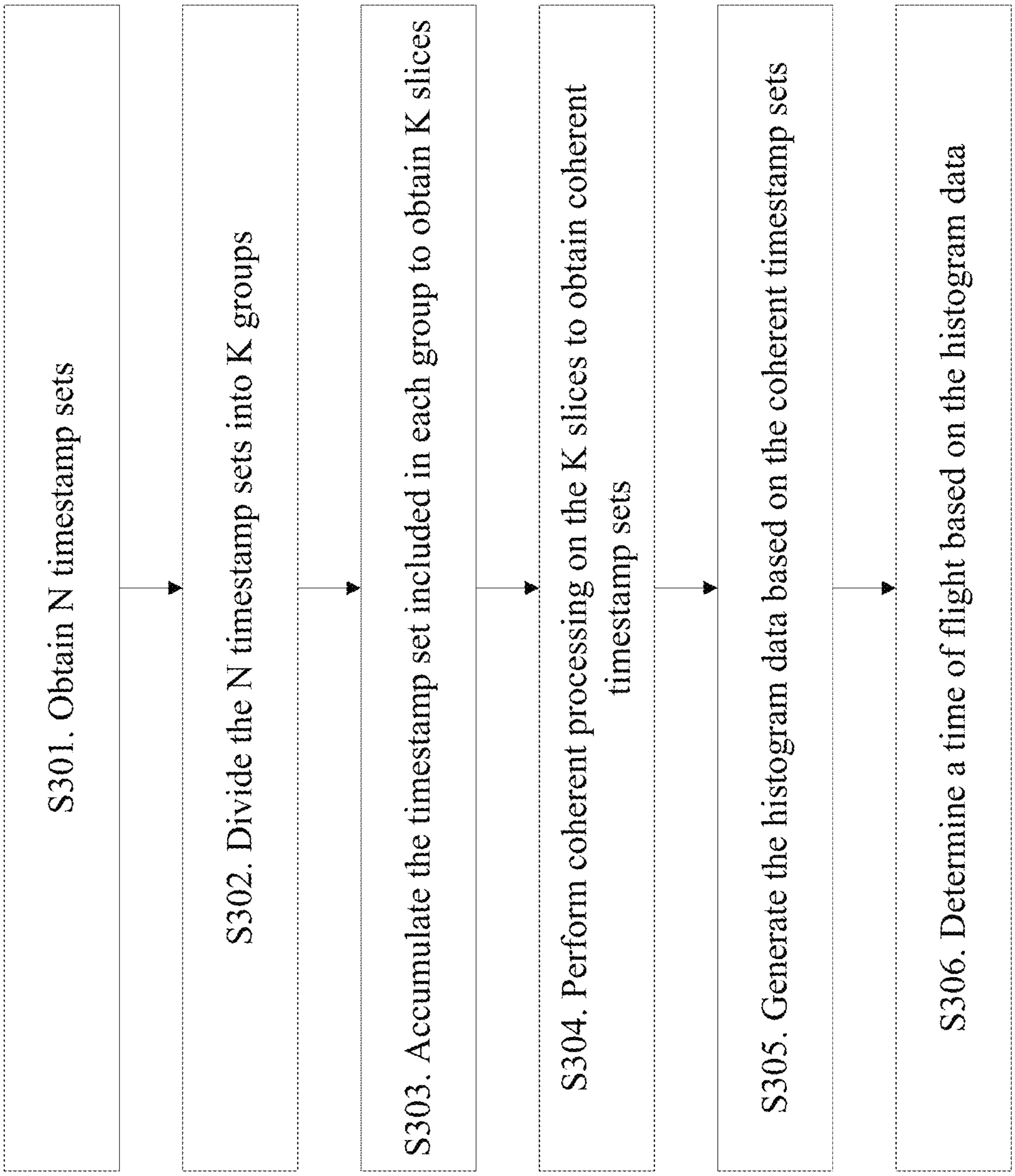
FIG. 9 is a schematic flowchart of a time-of-flight measurement method according to embodiments of this application.

FIG. 9 is a schematic flowchart of a time-of-flight measurement method according to embodiments of this application. The method includes, but is not limited to, the following steps.

S301. Obtain N timestamp sets.

Herein, 1 timestamp set is used to represent a photon event corresponding to 1 integration period, and may include a noise event and an echo signal event. The timestamp sets are corresponding to the same integration period, and the TDC records the receiving times of the echo signal (pulse signal reflected by the target object) and the noise signal, and stores recorded timestamps of an echo signal and a noise signal in each integration period into a memory. Timestamps, recorded by the TDC, of multiple echo signals and multiple noise signals in one integration period form a timestamp set. For a specific process of recording the timestamps of the echo signals and the noise signals in the integration period, refer to FIG. 1A and FIG. 1B. Details are not described herein again. The measurement apparatus in this application obtains N timestamp sets recorded by the TDC within N integration periods, each timestamp set includes at least one timestamp, and timestamp sets may include the same number of timestamps or different numbers of timestamps.

For example, when N=4, a timestamp set corresponding to the first integration period includes 2 timestamps: t1 and t12, a timestamp set corresponding to the second integration period includes 4 timestamps: t21, t22, t23, and t24, a timestamp set corresponding to the third integration period includes 4 timestamps: t31, t32, t33, and t34, and a timestamp set corresponding to the fourth integration period includes 7 timestamps: t41, t42, t43, t44, t45, t46, and t47.

It can be understood that a time interval between the two adjacent timestamps in the same timestamp set is greater than or equal to the minimum time resolution of the TDC, which depends on a hardware capacity of the TDC.

S302. Divide the N timestamp sets into K1 groups.

Herein, the N integration periods can belong to the same frame, that is, the measurement apparatus measures the time of flight of the target object by a time unit of a frame, N is an integer greater than 1, and a signal detected by the detector during the integration period may be the noise signal or the echo signal. The noise signal may be generated in the external environment, inside the device, or in another manner. Timestamps corresponding to the noise signals are randomly distributed in the integration period, and the timestamp of the echo signal is related to a distance between the emitter and the target object. Distance measurement results within N integration periods are similar, and therefore, the echo signals are concentrated at a specific position of the integration period. At a start moment of each integration period, the emitter emits a pulse signal to the target object, so that there is only one echo signal in each integration period. In some embodiments, N timestamp sets are divided into K groups, each group includes one or more timestamp sets, and the groups may include the same number of timestamp sets or different numbers of timestamp sets.

For example, when N=10, 10 timestamp sets are a timestamp set 1, a timestamp set 2, a timestamp set 3, . . . , a timestamp set 10, and the 10 timestamp sets are divided into 4 groups. The first group includes 3 timestamp sets: the timestamp set 1 to the timestamp set 3; the second group includes 3 timestamp sets: the timestamp set 4 to the timestamp set 6; the third group includes 2 timestamp sets: the timestamp set 7 and the timestamp set 8; and the fourth group includes 2 timestamp sets: the timestamp set 9 and the timestamp set 10.

It can be understood that, when the groups include the same number of timestamp sets, each group includes M timestamp sets, and therefore, K1=N/M, that is, the N timestamp sets are divided into K1 groups.

Possibly, when each group includes more than 1 timestamp set, sequence numbers of multiple timestamp sets are not necessarily continuous.

S303. Accumulate the timestamp set included in each group to obtain K1 slices.

For each group, integration periods of timestamp sets in the group are equal, and before the timestamp sets in the group are accumulated, the integration periods corresponding to the timestamp sets are aligned, that is, the integration periods corresponding to the timestamp sets have coincided start moments and coincided end moments. Then the timestamp sets in the group are combined to obtain a slice. For example, a specific group includes a timestamp set 1 and a timestamp set 2, the timestamp set 1 includes timestamps t0 and t1, the timestamp set 2 includes timestamps t3, t1, t4, and t6, and then the two timestamp sets in the first group are accumulated to obtain corresponding slices t0, t1, t1, t3, t4, and t6. It should be noted that when the timestamp sets in K groups are accumulated, K accumulation processes can be simultaneously performed in parallel, to reduce a calculation time.

Figure 10:
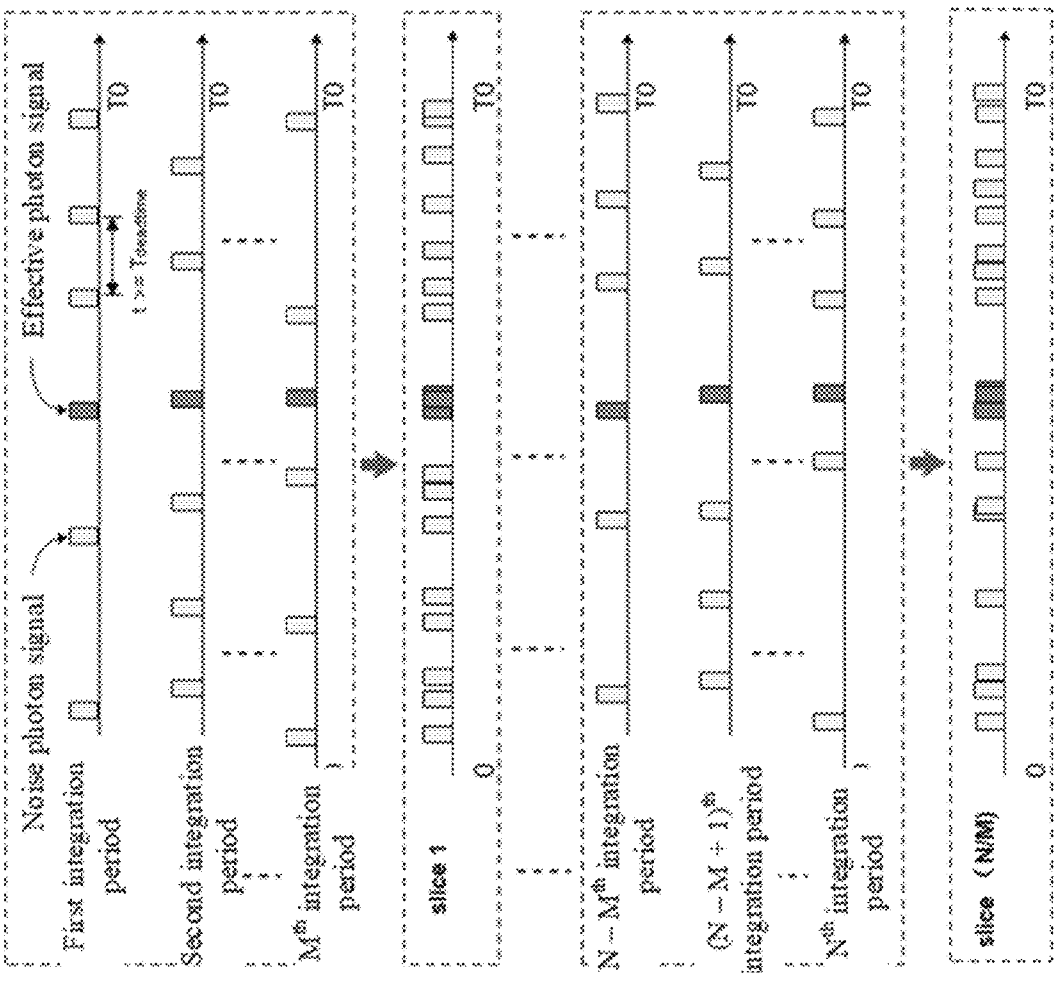
FIG. 10 is a schematic diagram of accumulation of a timestamp set within a group according to embodiments of this application.
Figure 11:
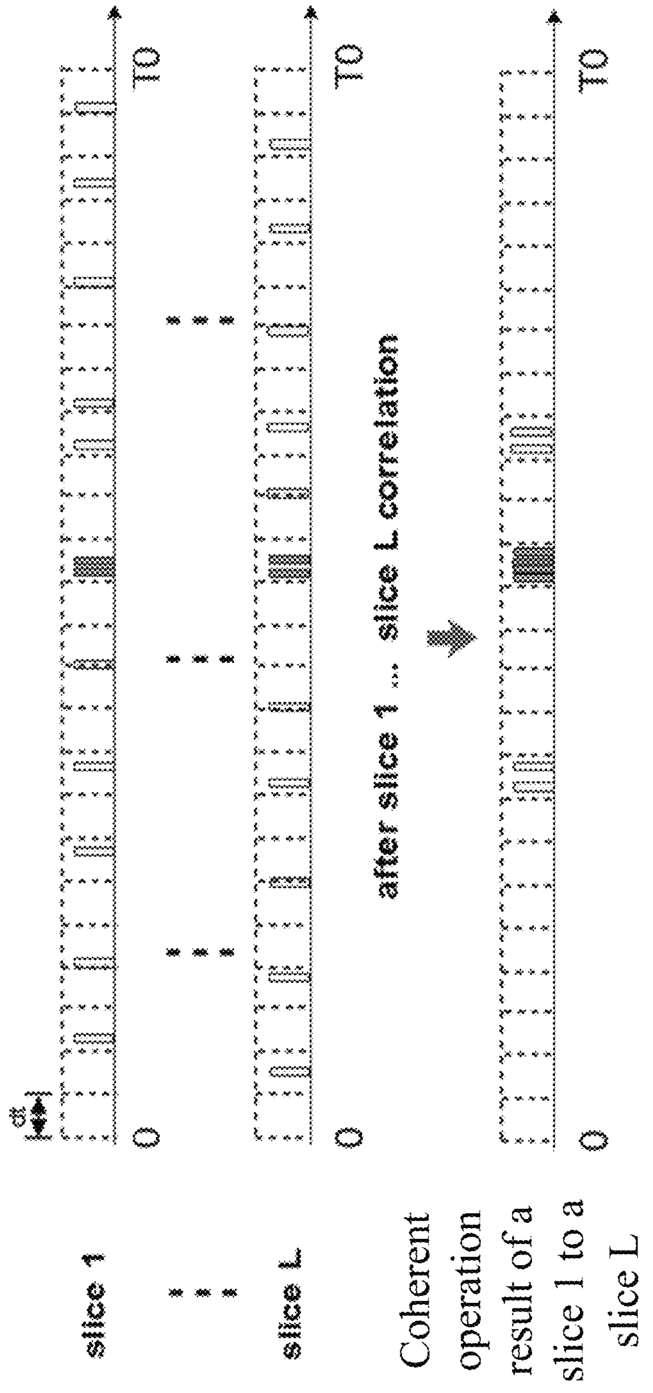
FIG. 11 and FIG. 12 are schematic diagrams of a principle of performing coherent processing on a slice according to embodiments of this application.

For example, referring to FIG. 10, N timestamp sets are obtained, N integration periods are divided into multiple groups, each group includes M integration periods, and therefore, the number of groups is N/M. A generation process of a slice 1 (slice 1) is as follows. A timestamp set corresponding to the first integration period includes 6 timestamps, and a time interval t between two adjacent timestamps in any timestamp set is at least a dead time ($T_{deadtime}$) of a SPAD, and the time interval t is generally much greater than the time resolution of the TDC. A timestamp set corresponding to the second integration period includes 6 timestamps, . . . , a timestamp set corresponding to the $M^{th}$ integration period includes 6 timestamps; start moments of the first integration period to the $M^{th}$ integration period are 0, and end moments are TO. The first integration period to the $M^{th}$ integration period are aligned, then the M timestamp sets in the group are accumulated to obtain the slice 1, and time length of the slice 1 is from 0 to T0. By analogy, a timestamp set corresponding to an $(N-M)^{th}$ integration period to a timestamp set corresponding to an $N^{th}$ integration period are accumulated to obtain a slice (N/M) (slice (N/M)).

S304. Perform coherent processing on the K1 slices to obtain coherent timestamp sets.

The coherent processing is performed with the slice as a basic granularity to obtain coherent timestamp sets. Coherent processing is intended to concentrate the timestamps of the echo signals and randomize the timestamps of the noise signals to enhance the echo signals and suppress the noise signals.

In a possible embodiment, all the K1 slices can be subject to coherent processing to obtain coherent timestamp sets, to improve accuracy of coherent processing; or L slices can be selected from the K1 slices to be subject to coherent processing, to obtain coherent timestamp sets.

A rule for selecting L slices from K1 slices is as follows.

1. L odd-numbered slices are selected from the K1 slices.

For example, K1=10, L=5, 10 slices are a slice 1, a slice 2, a slice 3, a slice 4, a slice 5, a slice 6, a slice 7, a slice 8, a slice 9, and a slice 10 respectively, odd-numbered slices of the slice 1, the slice 3, the slice 5, the slice 7, and the slice 9 are selected from the 10 slices, and the 5 odd-numbered slices are subject to coherent processing, to obtain coherent timestamp sets.

2. L even-numbered slices are selected from the K1 slices.

For example, K1=10, L=3, 10 slices are a slice 1, a slice 2, a slice 3, a slice 4, a slice 5, a slice 6, a slice 7, a slice 8, a slice 9, and a slice 10 respectively, even-numbered slices of the slice 6, the slice 8, and the slice 10 are selected from the 10 slices, and the 3 even-numbered slices are subject to coherent processing, to obtain coherent timestamp sets.

3. L slices are selected from the K1 slices randomly.

For example, K1=10, L=7, 10 slices are a slice 1, a slice 2, a slice 3, a slice 4, a slice 5, a slice 6, a slice 7, a slice 8, a slice 9, and a slice 10 respectively, 7 slices of the slice 1, the slice 2, the slice 3, the slice 6, the slice 7, the slice 9, and the slice 10 are selected from the 10 slices randomly, and the 7 slices are subject to coherent processing, to obtain coherent timestamp sets.

4. K1 slices are sorted in ascending order of numbers of timestamps, where the number of timestamps indicates the number of timestamps included in the slice, then first L slices are selected, the selected L slices are subject to coherent processing, and calculation load of coherent processing can be reduced by selecting a slice with fewer timestamps for coherent processing.

For example, K1=10, L=5, 10 slices are a slice 1, a slice 2, a slice 3, a slice 4, a slice 5, a slice 6, a slice 7, a slice 8, a slice 9, and a slice 10 respectively. The slice 1 includes 11 timestamps, the slice 2 includes 10 timestamps, the slice 3 includes 9 timestamps, the slice 4 includes 8 timestamps, the slice 5 includes 7 timestamps, the slice 6 includes 6 timestamps, the slice 7 includes 5 timestamps, the slice 8 includes 4 timestamps, the slice 9 includes 3 timestamps, and the slice 10 includes 2 timestamps. The 10 slices are sorted in ascending order of the numbers of timestamps into a sequence: the slice 10, the slice 9, the slice 8, the slice 7, the slice 6, the slice 5, the slice 4, the slice 3, the slice 2, and the slice 1. First 5 slices of the slice 10, the slice 9, the slice 8, the slice 7, and the slice 6 are selected from the foregoing 10 slices to be subject to coherent processing to obtain coherent timestamp sets.

5. K1 slices are sorted in descending order based on numbers of timestamps, where then last L slices are selected, the selected L slices are subject to coherent processing, and calculation load of coherent processing can be reduced by selecting a slice with fewer timestamps for coherent processing.

For example, K1=10, L=5, 10 slices are a slice 1, a slice 2, a slice 3, a slice 4, a slice 5, a slice 6, a slice 7, a slice 8, a slice 9, and a slice 10 respectively. The slice 1 includes 20 timestamps, the slice 2 includes 21 timestamps, the slice 3 includes 22 timestamps, the slice 4 includes 23 timestamps, the slice 5 includes 27 timestamps, the slice 6 includes 28 timestamps, the slice 7 includes 30 timestamps, the slice 8 includes 31 timestamps, the slice 9 includes 33 timestamps, and the slice 10 includes 36 timestamps. The 10 slices are sorted in descending order of the numbers of timestamps into a sequence: the slice 10, the slice 9, the slice 8, the slice 7, the slice 6, the slice 5, the slice 4, the slice 3, the slice 2, and the slice 1. Last 5 slices of the slice 5, the slice 4, the slice 3, the slice 2, and the slice 1 are selected from the foregoing 10 slices to be subject to coherent processing to obtain coherent timestamp sets.

In a possible embodiment, steps of performing coherent processing on L slices selected from the K1 slices to obtain coherent timestamp sets include:

dividing time length of the L slices into P1 consecutively distributed time windows respectively; and obtaining the coherent timestamp sets based on time windows of the L slices.

Time length of each of the L slices are equally divided into P1 consecutively distributed time windows, the L slices have the same integration period, P1 time windows on the L slices are distributed at the same position on the time axis, that is, abscissa, time windows corresponding to a first slice are $W_{11}$, $W_{12}$, . . . , $W_{1P1}$, time windows corresponding to a second slice are $W_{21}$, $W_{22}$, . . . , $W_{2P1}$, and time windows corresponding to an $L^{th}$ slice are $W_{L1}$, $W_{L2}$, . . . , $W_{LP1}$. The integration period of the coherent timestamp sets is also divided into P1 consecutive time windows, that is, distribution positions of time windows of the coherent timestamp sets are completely the same as distribution positions of time windows of the L slices. A timestamp in each time window of the coherent timestamp set is determined based on the following rule. For any time window in the coherent timestamp set, an $i^{th}$ time window is set, $1 \le i \le P1$, and timestamps at the same time window position in the L slices are processed. If at least one of time windows $W_{1i}$, $W_{2i}$, . . . , $W_{Li}$ does not cover the timestamp, no timestamp is set in the $i^{th}$ time window in the coherent timestamp set; or if the L time windows all cover timestamps, the timestamps in the L time windows are accumulated to obtain a timestamp in the $i^{th}$ time window in the coherent timestamp set.

Figure 12:
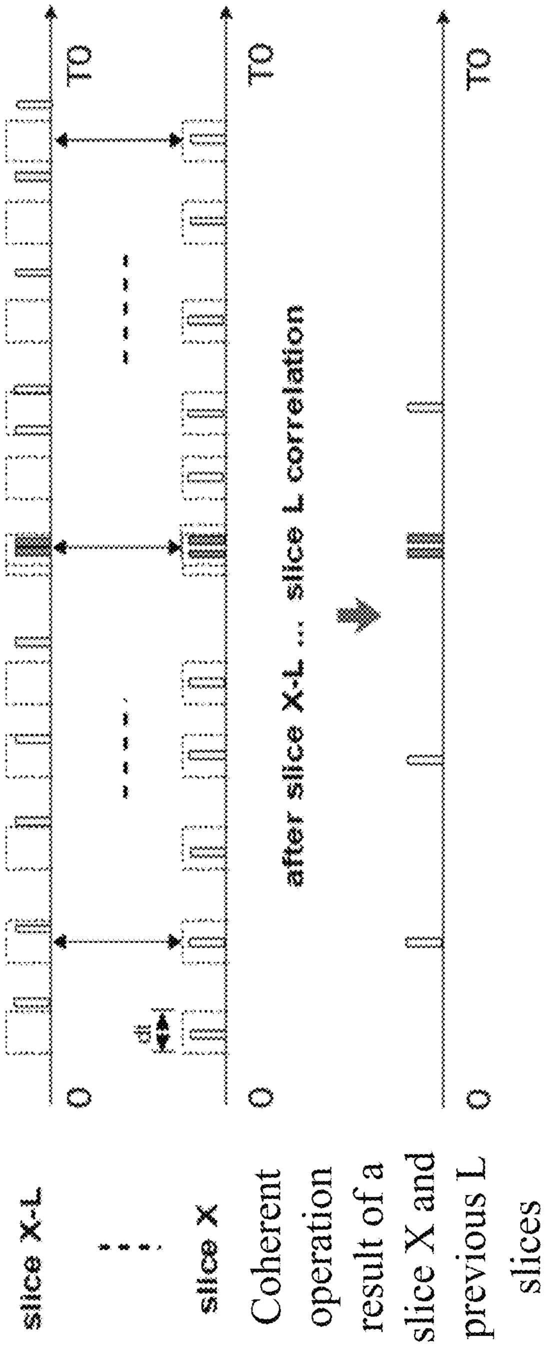

For example, FIG. 10 is a schematic diagram of a principle of performing coherent processing on multiple slices. The L slices are a slice 1, a slice 2, . . . , a slice L, the slice 1 to the slice L have the same integration period, a start moment of the integration period is 0, and an end moment is T0. As shown in FIG. 12, an integration period of each of the slice 1 to the slice L is divided into 25 time windows, and length of the time window is dt. For example, the length of the time window is twice the minimum time resolution of the TDC. Because the slice 1 to the slice L have the same integration period, distribution positions of time windows in the slice 1 to the slice L are also completely the same. A coherent operation is performed on the slice 1 to the slice L to obtain coherent timestamp sets, that is, coherent operation results corresponding to the slice 1 to the slice L in FIG. 12. Integration periods of the coherent timestamp sets are the same as integration periods of the slice 1 to the slice L. An integration period on the coherent timestamp sets is also divided into 25 time windows, and distribution positions of the time windows of the coherent timestamp sets are completely the same as the distribution positions of the time windows of the slice 1 to the slice L. For first time windows on the coherent timestamp sets, a first time window of the slice 1 and a first time window of the slice L do not cover the timestamp, and therefore, no timestamp is set in the first time windows of the coherent timestamp sets. For $9^{th}$ time windows on the coherent timestamp sets, $9^{th}$ time windows of the slice 1 to the slice L all cover timestamps, and timestamps in the foregoing $9^{th}$ time windows are accumulated to obtain timestamps in the $9^{th}$ time windows of the coherent timestamp sets. By analogy, distribution of timestamps in 25 time windows on the coherent timestamp sets shown in FIG. 12 can be obtained. In other words, a coherent processing procedure in this application can be summarized as follows. For each time window on the slice 1 to the slice L, a time window covering the timestamp is denoted as “1”, a time window covering no timestamp is denoted as “0”, AND operation is performed on L time windows at the same position on the slice 1 to the slice L to obtain an operation result of the time windows at corresponding positions of the coherent timestamp sets. If the operation result is 0, no timestamp is output in the corresponding time window; or if the operation result is 1, the timestamps in all the time windows are accumulated and output.

In another possible embodiment, performing coherent processing on the K1 slices to obtain coherent timestamp sets includes:

- setting a time window for each timestamp in an $X^{th}$ slice, where the time window needs to cover the timestamp, and in some embodiments, the timestamp can be located at a center of the corresponding time window;
- setting time windows for L slices before the $X^{th}$ slice based on a time window position of the $X^{th}$ slice, where distribution positions of time windows of the previous L slices and the $X^{th}$ slice are completely identical;
- obtaining intermediate coherent timestamp sets corresponding to the $X^{th}$ slice based on the $X^{th}$ slice and the previous L slices;
- determining K1−X+1 corresponding intermediate coherent timestamp sets of the $X^{th}$ slice to the $K1^{th}$ slice; and
- accumulating K1−X+1 intermediate coherent timestamp sets to obtain coherent timestamp sets.

The $X^{th}$ slice is any one of the K1 slices. Because previous L slices of the $X^{th}$ slice need to be processed, X needs to satisfy a condition that X≥L+1, X=L+1, L+2, . . . , K1, and X and L are integers greater than 1. A time window is set for each timestamp in the $X^{th}$ slice, and then corresponding time windows are respectively set for the previous L slices based on a time window position of the $X^{th}$ slice, that is, positions and the number of time windows set in the $X^{th}$ slice are the same as positions and the number of time windows set in the previous L slices. Because positions and numbers of timestamps corresponding to different slices may be different, timestamps in the corresponding time windows of different slices may have different positional relationships. Assuming that the number of time windows of the $X^{th}$ slice is $P_X$ and the number of time windows of corresponding previous L slices is also $P_X$, time windows corresponding to the $X^{th}$ slice are $W_{X1}$, $W_{X2}$, . . . , $W_{XP_X}$, corresponding time windows of a corresponding $(X-1)^{th}$ slice are $W_{(X-1)1}$, $W_{(X-1)2}$, . . . , $W_{(X-1)P_X}$ respectively, and time windows corresponding to the $X-L^{th}$ slice are $W_{(X-L)1}$, $W_{(X-L)2}$, . . . , $W_{(X-L)P_X}$ respectively.

It can be understood that, because intermediate coherent timestamp sets corresponding to the $X^{th}$ slice and the $X^{th}$ slice have the same time length and are aligned, the time length of the intermediate coherent timestamp sets is also divided into $P_X$ slices. For example, in some embodiments where there are 10 (K1=10) slices, and a $5^{th}$ (X=5) slice includes 9 timestamps, and therefore, 9 time windows are set. Correspondingly, 9 time windows are also set for first 4 (L=4) slices. For another example, if $6^{th}$ slice includes 5 timestamps, 5 time windows are set, and 5 time windows are also set for first 5 slices. For any time window of intermediate coherent timestamp sets corresponding to the $X^{th}$ slice, any time window is set as an $i^{th}$ time window, $1 \le i \le P_X$, and if at least one of time windows $W_{Xi}$, $W_{(X-1)i}$, . . . , $W_{(X-L)i}$ does not cover the timestamp, no timestamp is set in the $i^{th}$ time window; or if the time windows $W_{Xi}$, $W_{(X-1)i}$, . . . , $W_{(X-L)i}$ all cover timestamps, the timestamps in the time windows $W_{Xi}$, $W_{(X-1)i}$, . . . , $W_{(X-L)i}$ are accumulated to obtain a timestamp in the $i^{th}$ time window. In other words, herein, a procedure of determining intermediate coherent timestamp sets is as follows. For each time window on the slice X to the slice X−L, a timestamp covering a timestamp is denoted as “1”, a timestamp covering no timestamp is denoted as “0”, AND operation is performed on L+1 time windows at the same position on the slice X to the slice X-L to obtain an operation result of the time windows at corresponding positions of the intermediate coherent timestamp sets. If the operation result is 0, no timestamp is output in the corresponding time window; or if the operation result is 1, the timestamps in all the time windows are output.

For example, referring to FIG. 12, a position of each timestamp in the slice X on the integration period is first determined, then a time window is set with each timestamp as a center point, and the time windows may be inconsecutive. In FIG. 12, the slice X corresponds to 12 time windows, and 12 time windows are also set for a slice X−1 to a slice X−L, then timestamps in time windows at the same position in the slice X to the slice X−L are compared, and if at least one of the L+1 time windows at the same position does not cover a timestamp, no timestamp is output; or if all L+1 time windows at the same position cover the timestamp, all the timestamps in the L+1 time windows are accumulated and then output.

A total of K1−X+1 intermediate coherent timestamp sets respectively corresponding to the $X^{th}$ slice to a $K1^{th}$ slice can be obtained in the method in FIG. 12, and then the K1−X+1 intermediate coherent timestamp sets are accumulated to obtain final coherent timestamp sets. For an accumulation method, refer to an accumulation process of the timestamp sets in the group. Details are not described herein again.

It should be noted that when intermediate coherent timestamp sets respectively corresponding to the $X^{th}$ slice to the $K1^{th}$ slice are calculated, a method can be performed to simultaneously divide the time windows for the K1−X+1 slices. For example, K1−X+1 calculation threads are simultaneously invoked to respectively calculate the intermediate coherent timestamp sets corresponding to each slice, thereby improving an operation speed of coherent processing.

S305. Generate the histogram data based on the coherent timestamp sets.

An abscissa in the histogram data represents the time length of the coherent timestamp set and a time window divided on the time length, and an ordinate represents the number of timestamps corresponding to each time window in the timestamp set.

Figure 13:
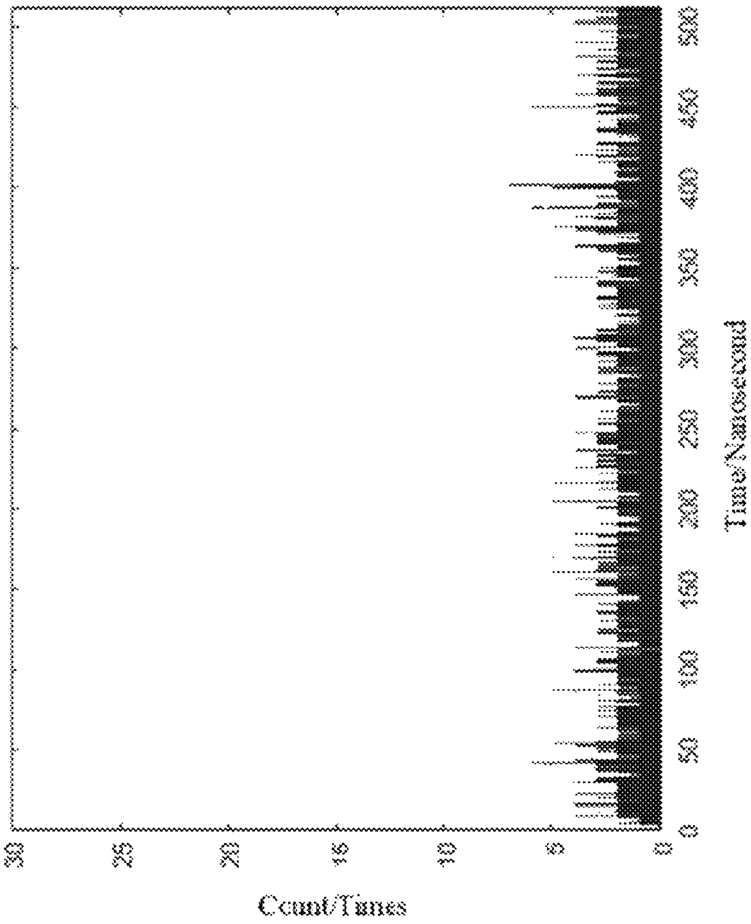
FIG. 13 shows histogram data before coherent processing according to embodiments of this application.
Figure 14:
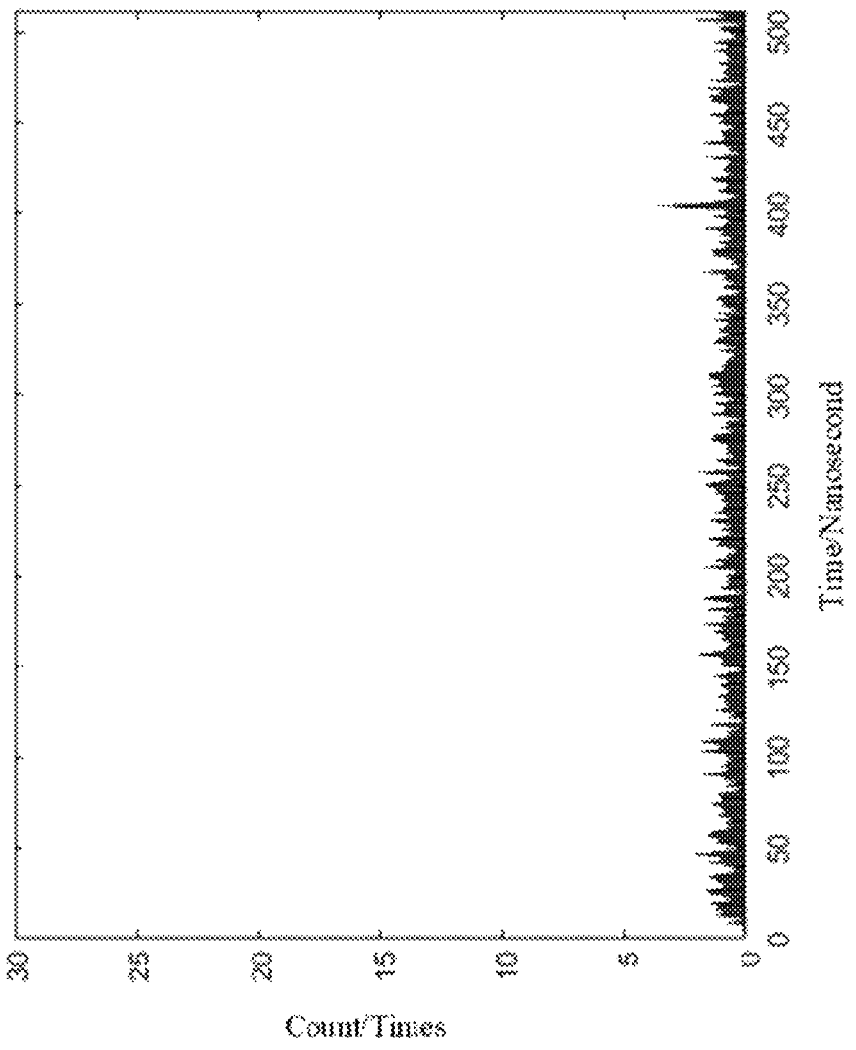
FIG. 14 shows histogram data obtained after coherent processing according to embodiments of this application.

For example, referring to histogram data shown in FIG. 13 and FIG. 14, FIG. 13 shows a histogram before coherent processing. A peak value in counts in the histogram is not sufficiently significant due to impact of the noise signal. FIG. 14 shows histogram data obtained after coherent processing with a slice as granularity. It can be learned that a count other than the peak value in FIG. 14 is suppressed, the peak value is more significant, and time corresponding to the peak value is about 400 ns.

S306. Determine a time of flight based on the histogram data.

A timestamp with the maximum count in the histogram data is used as a signal receiving moment, and the time of flight is calculated based on the emission moment of the pulse signal and the signal receiving moment. For example, the timestamp with the maximum count in the histogram data is t1, a preset signal emission moment is t0, then the time of flight is t1−t0, and then the distance between the detector and the target object can be calculated based on the time of flight and the speed of light.

Based on description of FIG. 9, multiple timestamp sets collected by the TDC in the integration period are obtained, the multiple timestamp sets are divided by slices, the multiple divided slices are subject to mutual coherent operation to obtain coherent timestamp sets, and then the coherent timestamp sets are used to generate the histogram data. Therefore, the correct time of flight of the target object can be determined based on a peak position of the count in the histogram data, a count of the timestamp corresponding to the echo signal in the histogram data remains basically unchanged, and the count of the timestamp corresponding to the noise pulse signal is suppressed, thereby improving the SBNR of the distance detector and effectively improving the measurement accuracy of the time of flight of the distance detector.

The time-of-flight measurement method in some embodiments is described in detail above, and a time-of-flight measurement apparatus (referred to as an apparatus 80 below) according to some embodiments is provided below.

Figure 15:
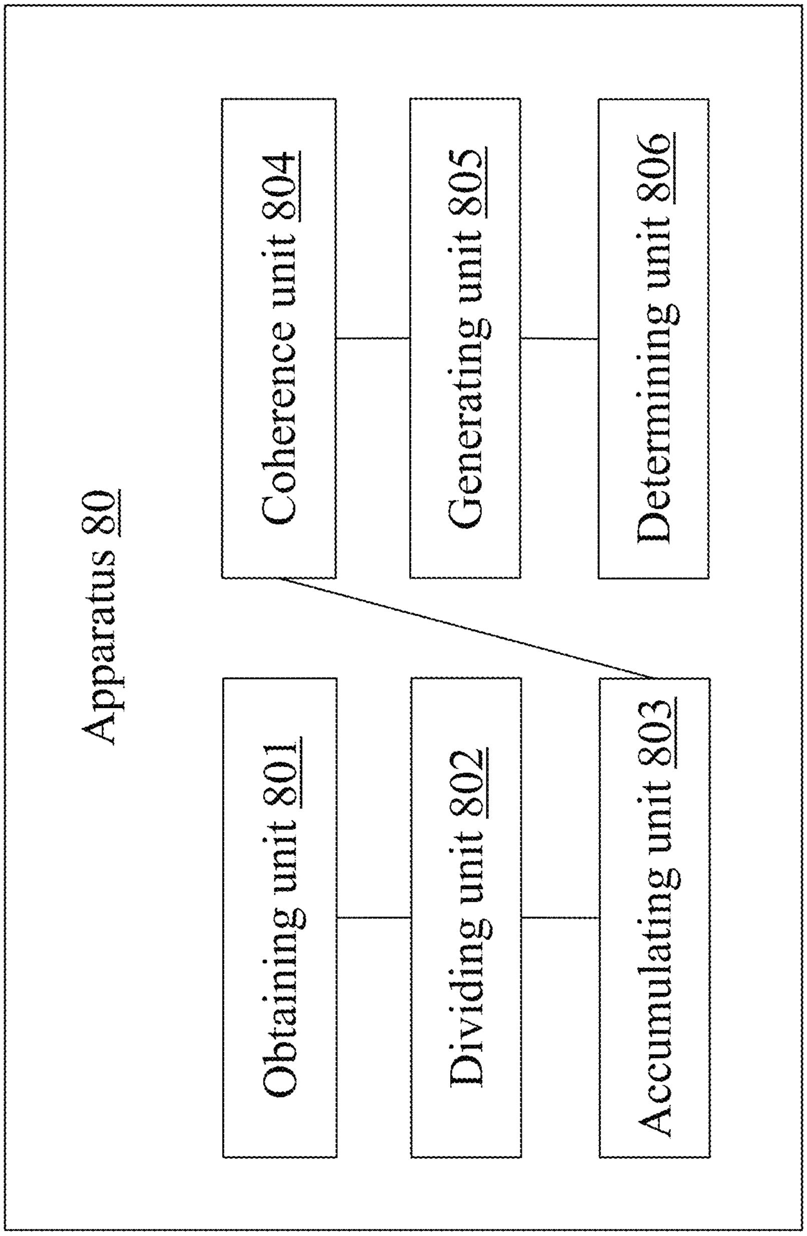
FIG. 15 is a schematic structural diagram of a time-of-flight measurement apparatus according to embodiments of this application.

The apparatus 80 shown in FIG. 15 can implement the time-of-flight measurement method in the embodiments shown in FIG. 9. The apparatus 80 includes an obtaining unit 801, a dividing unit 802, an accumulating unit 803, a coherence unit 804, a generating unit 805, and a determining unit 806.

The obtaining unit 801 is configured to obtain N timestamp sets, where N is an integer greater than 1, each timestamp set represents a photon event corresponding to an integration period, each timestamp set includes multiple timestamps, and integration periods of the timestamp sets are equal.

The dividing unit 802 is configured to divide the N timestamp sets into K groups, where K is an integer greater than 1, and each group includes one or more timestamp sets.

The accumulating unit 803 is configured to accumulate the timestamp set included in each group to obtain K slices, where each slice includes multiple timestamps.

The coherence unit 804 is configured to perform coherent processing on the K slices to obtain coherent timestamp sets.

The generating unit 805 is configured to generate the histogram data based on the coherent timestamp sets.

The determining unit 806 is configured to determine a time of flight based on the histogram data.

In one or more embodiments, the groups include the same number of timestamp sets, where K1=N/M, M is the number of timestamp sets in each group, and M is an integer greater than or equal to 1.

In one or more embodiments, performing coherent processing on the K1 slices to obtain coherent timestamp sets includes:

selecting L slices from the K1 slices, where $1<L\leq K1$, and L is an integer; and performing coherent processing on the L slices to obtain coherent timestamp sets.

In one or more embodiments, the L slices are even-numbered slices in the K1 slices; the L slices are odd-numbered slices in the K1 slices; or the L slices are last L slices in the K1 slices, where the K1 slices are arranged in a descending order based on the number of timestamps.

In one or more embodiments, performing coherent processing on the L slices to obtain coherent timestamp sets includes:

dividing time length of each of the L slices into P1 consecutive time windows, where time windows corresponding to a first slice are $W_{11}, W_{12}, \ldots, W_{1P1}$, time windows corresponding to a second slice are $W_{21}, W_{22}, \ldots, W_{2P1}, \ldots$, and time windows corresponding to an $L^{th}$ slice are $W_{L1}, W_{L2}, \ldots, W_{LP1}$; and obtaining coherent timestamp sets based on time windows of the L slices, where integration periods of the coherent timestamp sets are equal to integration periods of the L slices, and the integration period of the coherent timestamp set is divided into P1 consecutively distributed time windows; and for an $i^{th}$ time window in the coherent timestamp set, $1\leq i\leq P1$, and if at least one of time windows $W_{1i}, W_{2i}, \ldots, W_{Li}$ does not cover the timestamp, no timestamp is set in the $i^{th}$ time window in the coherent timestamp set; or if the time windows $W_{1i}, W_{2i}, \ldots, W_{Li}$ all cover timestamps, the timestamps in the time windows $W_{1i}, W_{2i}, \ldots, W_{Li}$ are accumulated to obtain a timestamp in the $i^{th}$ time window in the coherent timestamp set. In one or more embodiments, performing coherent processing on the K slices to obtain coherent timestamp sets includes:

setting a time window for each timestamp in an $X^{th}$ slice, where the $X^{th}$ slice is in the K1 slices, X=L+1, L+2, . . . , K1, and X and L are integers greater than 1;

setting time windows for L slices before the $X^{th}$ slice based on a time window position of the $X^{th}$ slice, where the $X^{th}$ slice is corresponding to $P_X$ time windows, the time windows corresponding to the $X^{th}$ slice are respectively $W_{X1}, W_{X2}, \ldots, W_{XP_X}$, time windows corresponding to an $(X-1)^{th}$ slice are respectively $W_{(X-1)1}, W_{(X-1)2}, \ldots, W_{(X-1)P_X}, \ldots$, and time windows corresponding to an $(X-L)^{th}$ slice are $W_{(X-L)1}, W_{(X-L)2}, \ldots, W_{(X-L)P_X}$;

obtaining intermediate coherent timestamp sets based on the $X^{th}$ slice and the previous L slices, where integration periods of the intermediate coherent timestamp sets are equal to an integration period of the $X^{th}$ slice, and the integration period of the intermediate coherent timestamp set is divided into $P_X$ time windows; and for an $i^{th}$ time window in the intermediate coherent timestamp set, $1\leq i\leq P_X$, and if at least one of time windows $W_{Xi}$, $W_{(X-1)i}$, . . . , $W_{(X-L)i}$, does not cover the timestamp, no timestamp is set in the $i^{th}$ time window; or if the time windows $W_{Xi}$, $W_{(X-1)i}$, . . . , $W_{(X-L)i}$ all cover timestamps, the timestamps in the time windows $W_{Xi}$, $W_{(X-1)i}$, . . . , $W_{(X-L)i}$ are accumulated to obtain a timestamp in the $i^{th}$ time window;

determining intermediate coherent timestamp sets corresponding to K1−X+1 slices from the $X^{th}$ slice to the $K1^{th}$ slice; and accumulating K1−X+1 intermediate coherent timestamp sets to obtain coherent timestamp sets.

In one or more embodiments, a time window is set in the integration period of the $X^{th}$ slice centered on each timestamp.

In one or more embodiments, the histogram data includes multiple timestamps and counts corresponding to the timestamps.

In one or more embodiments, determining a time of flight based on the histogram data includes:

using a timestamp with the maximum count in the histogram data as a signal receiving moment; and calculating the time of flight based on a preset signal emission moment and the signal receiving moment.

These embodiments of this application and the method embodiments in FIG. 1A to FIG. 1D and FIG. 9 to FIG. 14 are based on the same concept, and also have the same technical effects. For a specific process, refer to the description of the method embodiments in FIG. 1A to FIG. 1D and FIG. 9 to FIG. 14. Details are not described herein again.

The apparatus 80 may be a FPGA, a dedicated integrated chip, an SoC, a CPU, an NP, a digital signal processing circuit, an MCU, a PLD or other integrated chips that implement related functions.

The time-of-flight measurement method in some embodiments is described in detail above, and a time-of-flight measurement apparatus (referred to as an apparatus 90 below) according to some embodiments is provided below.

Figure 16:
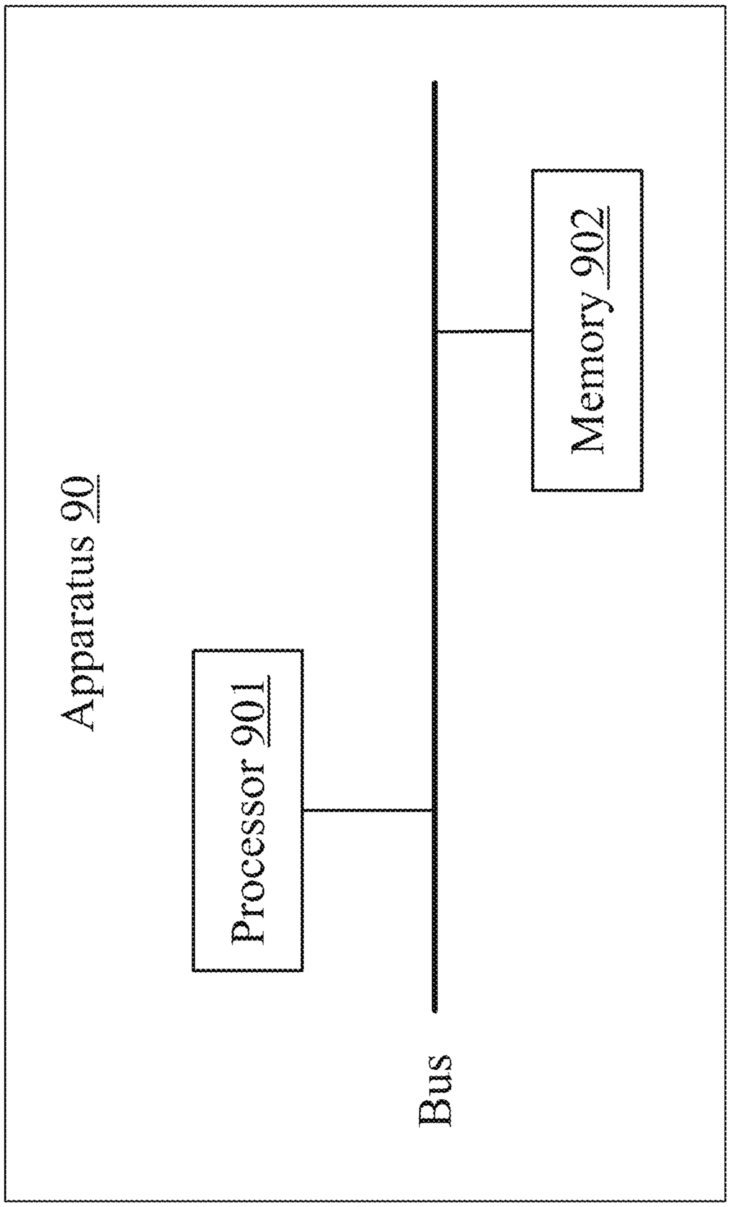
FIG. 16 is another schematic structural diagram of a time-of-flight measurement apparatus according to embodiments of this application.

FIG. 16 is a schematic structural diagram of an apparatus according to embodiments of this application. The apparatus is referred to as an apparatus 90 below. The apparatus 90 can be integrated into the LiDAR in the foregoing embodiments or a supporting platform. As shown in FIG. 16, the apparatus includes a memory 902 and a processor 901.

The memory 902 may be an independent physical unit, and may be connected to the processor 901 through a bus. The memory 902 and the processor 901 can also be integrated together, or implemented through hardware or the like.

In some embodiments, the apparatus 9 may also include an emitter and a receiver, the emitter is configured to emit a laser signal, and the receiver is configured to receive the laser signal.

The memory 902 is configured to store a program for implementing the foregoing method embodiments or each module in the apparatus embodiments, and the processor 901 invokes the program to perform operations in the foregoing method embodiments, including:

obtaining N timestamp sets, where N is an integer greater than 1, each timestamp set represents a photon event corresponding to an integration period, each timestamp set includes multiple timestamps, and integration periods of the timestamp sets are equal;

dividing the N timestamp sets into K1 groups, where K1 is an integer greater than 1, and each group includes one or more timestamp sets;

accumulating the timestamp set included in each group to obtain K1 slices, where each slice includes multiple timestamps;

performing coherent processing on the K1 slices to obtain coherent timestamp sets;

generating the histogram data based on the coherent timestamp sets; and determining a time of flight based on the histogram data.

In one or more embodiments, the groups include the same number of timestamp sets, where K1=N/M, M is the number of timestamp sets in each group, and M is an integer greater than or equal to 1.

In one or more embodiments, when performing coherent processing on the K1 slices to obtain coherent timestamp sets, the processor 901 is configured to:

select L slices from the K1 slices, where 1<L≤K1, and L is an integer; and perform coherent processing on the L slices to obtain coherent timestamp sets.

In one or more embodiments, the L slices are even-numbered slices in the K1 slices;

the L slices are odd-numbered slices in the K1 slices; or the L slices are last L slices in the K1 slices, where the K1 slices are arranged in a descending order based on the number of timestamps.

In one or more embodiments, when performing coherent processing on the L slices to obtain coherent timestamp sets, the processor 901 is configured to:

divide time length of each of the L slices into P consecutive time windows, where time windows corresponding to a first slice are $W_{11}$, $W_{12}$, . . . , $W_{1P1}$, time windows corresponding to a second slice are $W_{21}$, $W_{22}$, . . . , $W_{2P1}$, . . . , and time windows corresponding to an $L^{th}$ slice are $W_{L1}$, $W_{L2}$, . . . , $W_{LP1}$; and obtain coherent timestamp sets based on time windows of the L slices, where integration periods of the coherent timestamp sets are equal to integration periods of the L slices, and the integration period of the coherent timestamp set is divided into P consecutively distributed time windows; and for an $i^{th}$ time window in the coherent timestamp set, 1≤i≤P, and if at least one of time windows $W_{1i}$, $W_{2i}$, . . . , $W_{L1}$ does not cover the timestamp, no timestamp is set in the $i^{th}$ time window in the coherent timestamp set; or if the time windows $W_{1i}$, $W_{2i}$, . . . , $W_{Li}$ all cover timestamps, the timestamps in the time windows $W_{1i}$, $W_{2i}$, . . . , $W_{Li}$ are accumulated to obtain a timestamp in the $i^{th}$ time window in the coherent timestamp set.

In one or more embodiments, when performing coherent processing on the K1 slices to obtain coherent timestamp sets, the processor 901 is configured to:

set a time window for each timestamp in an $X^{th}$ slice, where the $X^{th}$ slice is in the K1 slices, X=L+1, L+2, . . . , K1, and X and L are integers greater than 1;

set time windows for L slices before the $X^{th}$ slice based on a time window position of the $X^{th}$ slice, where the $X^{th}$ slice is corresponding to $P_X$ time windows, the time windows corresponding to the $X^{th}$ slice are respectively $W_{X1}$, $W_{X2}$, . . . , $W_{XP_X}$, time windows corresponding to an $(X-1)^{th}$ slice are respectively $W_{(X-1)1}$, $W_{(X-1)2}$, . . . , $W_{(X-1)P_X}$, . . . , and time windows corresponding to an $(X-L)^{th}$ slice are $W_{(X-L)1}$, $W_{(X-L)2}$, . . . , $W_{(X-L)P_X}$;

obtain intermediate coherent timestamp sets based on the $X^{th}$ slice and the previous L slices, where integration periods of the intermediate coherent timestamp sets are equal to an integration period of the $X^{th}$ slice, and the integration period of the intermediate coherent timestamp set is divided into $P_X$ time windows; and for an $i^{th}$ time window in the intermediate coherent timestamp set, $1 \le i \le P_X$, and if at least one of time windows $W_{Xi}$, $W_{(X-1)i}$, . . . , $W_{(X-L)i}$ does not cover the timestamp, no timestamp is set in the $i^{th}$ time window; or if the time windows $W_{Xi}$, $W_{(X-1)i}$, . . . , $W_{(X-L)i}$ all cover timestamps, the timestamps in the time windows $W_{Xi}$, $W_{(X-1)i}$, . . . , $W_{(X-L)i}$ are accumulated to obtain a timestamp in the $i^{th}$ time window;

determine intermediate coherent timestamp sets corresponding to K1−X+1 slices from the $X^{th}$ slice to the $K1^{th}$ slice; and accumulate K1−X+1 intermediate coherent timestamp sets to obtain coherent timestamp sets.

In one or more embodiments, a time window is set in the integration period of the $X^{th}$ slice centered on each timestamp.

In one or more embodiments, the histogram data includes multiple timestamps and counts corresponding to the timestamps.

In one or more embodiments, when determining a time of flight based on the histogram data, the processor 901 is configured to:

use a timestamp with the maximum count in the histogram data as a signal receiving moment; and calculate the time of flight based on a preset signal emission moment and the signal receiving moment.

These embodiments of this application and the embodiment of FIG. 9 are based on the same concept, and also have the same technical effects. For a specific process, refer to the description of the embodiment of FIG. 9. Details are not described herein again.

When a part or all of the time-of-flight measurement method in the foregoing embodiments is implemented through software, the apparatus may also only include a processor. The memory for storing the program is located outside the apparatus, and the processor is connected to the memory through a circuit or a wire, and is configured to read and execute the program stored in the memory.

The processor may be a CPU, an NP or a combination of the CPU and the NP.

The processor can further include a hardware chip. The forgoing hardware chip can be an ASIC, a PLD, or a combination thereof. The forgoing PLD may be a CPLD, a FPGA, a GAL or any combination thereof.

A memory can include a volatile memory, such as a RAM. The memory can also include a non-volatile memory, such as a flash memory, an HDD or an SSD. The memory can also include a combination of the above types of memories.

In the foregoing embodiments, a sending unit or the emitter performs a sending step in the foregoing method embodiments, a receiving unit or the receiver performs a receiving step in the foregoing method embodiments, and another step is performed by another unit or processor. The sending unit and the receiving unit can form a transceiver unit, and the receiver and the emitter can form a transceiver.

An embodiment of this application further provides a computer storage medium that stores a computer program, where the computer program is used to perform the time-of-flight measurement method provided in the foregoing embodiments.

An embodiment of this application further provides a computer program product including an instruction, and when executed on the computer, the instruction enables the computer to perform the time-of-flight measurement method provided in the foregoing embodiments.

Embodiment 3

Referring back to FIG. 1A, in some embodiments, the measurement system includes an emitter (not shown in the figure) and a detector. The emitter is configured to emit a laser pulse. The detector may include a pixel unit, a TDC, and a RAM. The pixel unit may include one or more SPADs.

A basic DTOF measurement process is as follows. The DTOF emits N pulse signals and receive N echo signals within a single-frame measurement time, and then a histogram is generated for statistics based on a record of the time of flight of the pulse signals, and the time of flight occurring at the highest frequency is used to calculate a distance between LiDAR and a target object.

Specifically, the emitter emits a pulse signal to the target object, the pulse signal reaches the target object and is reflected, a pixel unit or a pixel array receives an echo signal reflected by the target object, and converts the echo signal into an electrical signal, a TDC records a generating time (or referred to as a timestamp) of the electrical signal, the generating time is used as an arrival time of the echo signal, a RAM stores the timestamp of the echo signal, a time of flight (TOF) can be obtained based on an emission time of the pulse signal and the arrival time of the echo signal, and therefore, a distance between the emitter and the target object can be calculated based on the constant speed of light and the time of flight.

However, in an actual measurement process, due to high sensitivity of the detector, signals received by the detector further include a noise signal in addition to the echo signal. A source of the noise signal includes a component inside the detector or incident ambient light, but the detector cannot effectively identify the noise signal or the echo signal in the received signals. To reduce impact of the noise signal on a DTOF measurement result, TCSPC in related technologies is used to measure the time of flight. A main principle is that the emitter emits multiple pulse signals in a time frame; and because arrival times of the echo signals received by the detector are coherent or consistent, the arrival time of the noise signal is random, and after multiple integration periods, the echo signals can outstrip the noise signal.

For example, referring to FIG. 1B, the time frame consists of N integration periods, N is an integer greater than 1, the echo signal received by the detector in each integration period is denoted by a rectangle filled with diagonal lines, and the received noise signal is denoted by a gray colored rectangle. The emitter emits laser pulse signals at start times of a first integration period to an $N^{th}$ integration period. It can be learned from the figure that the detector receives multiple noise signals in addition to the echo signal in each integration period, a position of the echo signal basically remains unchanged, and a position of each noise signal is relatively random. Specifically, the timestamp information on the horizontal axis of FIG. 1B indicates a moment of receiving a signal by the TDC, and the time of flight (TOF) can be calculated based on the emission time of the pulse signal and an arrival time generated through the echo signal. Further, an ordinate in FIG. 1B corresponds to a count (cumulative number) of noise signals or echo signals received at each timestamp. It can be understood that the timestamp corresponding to the maximum count in the histogram of this application is the time of flight.

It can be learned that, in the current time-of-flight measurement method based on the DTOF, to detect a time of flight, it is critical to identify a peak position of counts in the histogram and further identify the time of flight. As shown in FIG. 1C below, when the ambient light is weak and there is a small distance between the emitter and the target, the SBNR is large, and a peak value of the histogram corresponding to the echo signal is easy to obtain after multiple integration periods. However, when the ambient light has strong light intensity or there is a large distance between the emitter and the target object, the number of echo signals received by the detector decreases as the distance increases, received ambient photons remain unchanged as the distance changes, and the SBNR is reduced. As shown in FIG. 1D below, due to a random effect of the ambient light, some peak values of the ambient light on the histogram may fluctuate to be greater than a corresponding peak value of the echo signal, and as a result, a rear-end circuit incorrectly recognizes the peak value, thereby causing a detection error. In addition, the stronger the ambient light and the larger the distance between the emitter and the detected target, the greater the probability that the peak value of the noise signal covers the peak value of the echo signal and the lower the detection accuracy.

Figure 17:
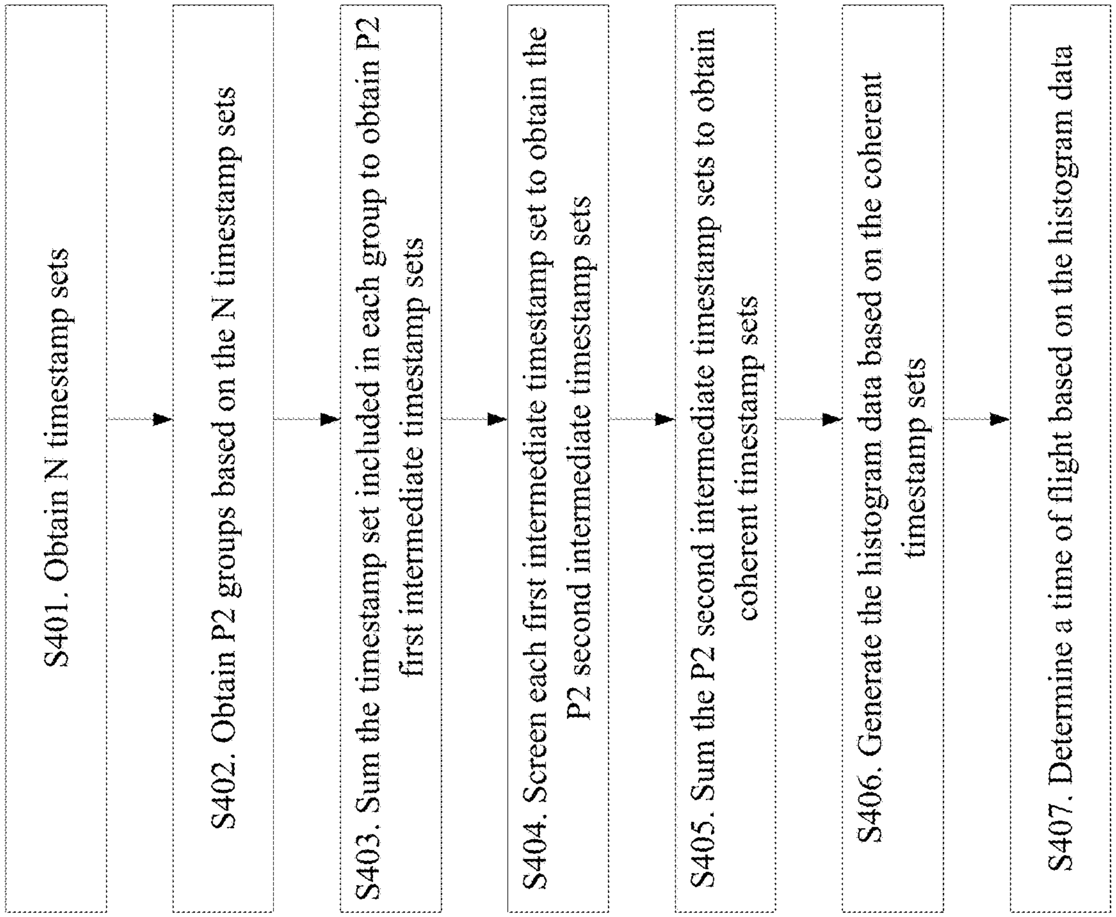
FIG. 17 is a schematic flowchart of a time-of-flight measurement method according to embodiments of this application.

FIG. 17 is a schematic flowchart of a time-of-flight measurement method according to embodiments of this application. The method includes, but is not limited to, the following steps.

S401. Obtain N timestamp sets.

Herein, 1 timestamp set is used to represent a photon event corresponding to 1 integration period, and may include a noise event and an echo event. The timestamp sets are corresponding to the same integration period, and the TDC records the receiving time of the echo signal (pulse signal reflected by the target object). Further, a recorded timestamp of a pulse signal in each integration period is stored into a memory. Timestamps, recorded by the TDC, of multiple echo signals in one integration period form a timestamp set. For a specific process of recording the timestamp of the echo signal in the integration period, refer to FIG. 1A and FIG. 1B. Details are not described herein again. The measurement apparatus in this application obtains N timestamp sets recorded by the TDC within N integration periods, each timestamp set includes at least one timestamp, and timestamp sets may include the same number of timestamps or different numbers of timestamps.

For example, when the number N of timestamp sets is equal to 4, a timestamp set corresponding to a first integration period can include 2 timestamps: $t_{11}$ and $t_{12}$, a timestamp set corresponding to a second integration period can include 4 timestamps: $t_{21}$, $t_{22}$, $t_{23}$, and $t_{24}$, a timestamp set corresponding to a third integration period can include 4 timestamps: $t_{31}$, $t_{32}$, $t_{33}$, and $t_{34}$, and a timestamp set corresponding to a fourth integration period can include 7 timestamps: $t_{41}$, $t_{42}$, $t_{43}$, $t_{44}$, $t_{45}$, $t_{46}$, and $t_{47}$.

It can be understood that a time interval between the two adjacent timestamps in the same timestamp set is greater than or equal to the minimum time resolution of the TDC, which depends on a hardware capacity of the TDC.

S402. Obtain P2 groups based on the N timestamp sets.

N integration periods can belong to the same frame, that is, the measurement apparatus measures the N integration periods by a time unit of a frame. The echo signals received in the N integration periods are accumulated as per timestamps, and finally, the time of flight of the target object is obtained, where N is an integer greater than 1. A signal detected by the detector in the integration period may be a noise signal, or may be an echo signal generated after the pulse signal emitted by the emitter is reflected by the target object. The noise signal may be generated in the external environment, inside the device, or in another manner. Timestamps corresponding to the noise signals are randomly distributed in the integration period, and the timestamp of the echo signal is related to a distance between the emitter and the target object. When the distance basically remains unchanged within N integration periods, the echo signals are concentrated at a specific position of the integration period.

It can be understood that, in some embodiments, there is only one echo signal in each integration period. The N timestamp sets are divided into P2 groups, where P2<N, P2 is an integer, and each group includes at least two timestamp sets. The groups may include the same number of timestamp sets or different numbers of timestamp sets, and at least two timestamp sets included in each group may be consistent or inconsistent. This is not limited in these embodiments of this application.

Possibly, N=10, P2=5, the groups include the same number of timestamp sets and timestamp sets included in each group are inconsistent, and therefore, the 10 timestamp sets are a timestamp set 1, a timestamp set 2, a timestamp set 3, . . . , a timestamp set 10 respectively. Each group includes 2 timestamp sets, a group 1 includes the timestamp set 1 and the timestamp set 2, a group 2 includes the timestamp set 3 and the timestamp set 4, a group 3 includes the timestamp set 5 and the timestamp set 6, a group 4 includes the timestamp set 7 and the timestamp set 8, and a group 5 includes the timestamp set 9 and the timestamp set 10.

Possibly, N=10, P2=4, the groups include the same number of timestamp sets and timestamp sets included in each group are consistent. The 10 timestamp sets are a timestamp set 1, a timestamp set 2, . . . , a timestamp set 10 respectively. Each group includes 4 timestamp sets, a group 1 includes the timestamp set 1, the timestamp set 2, the timestamp set 3, and the timestamp set 4, a group 2 includes the timestamp set 2, the timestamp set 3, the timestamp set 4, and the timestamp set 5, a group 3 includes the timestamp set 5, the timestamp set 6, the timestamp set 7, and the timestamp set 8, and a group 4 includes the timestamp set 7, the timestamp set 8, the timestamp set 9, and the timestamp set 10.

Possibly, N=10, P2=3, the groups include different numbers of timestamp sets and timestamp sets included in each group are inconsistent. The 10 timestamp sets are a timestamp set 1, a timestamp set 2, . . . , a timestamp set 10 respectively. A group 1 includes 2 timestamp sets: the timestamp set 1 and the timestamp set 2; a group 2 includes 3 timestamp sets: the timestamp set 3, the timestamp set 4, and the timestamp set 5; and a group 3 includes 5 timestamp sets: the timestamp set 6, the timestamp set 7, the timestamp set 8, the timestamp set 9, and the timestamp set 10.

Possibly, N=10, P2=3, the groups include different numbers of timestamp sets and timestamp sets included in each group are consistent. The 10 timestamp sets are a timestamp set 1, a timestamp set 2, . . . , a timestamp set 10 respectively. A group 1 includes 3 timestamp sets: the timestamp set 1, the timestamp set 5, and the timestamp set 6; a group 2 includes 4 timestamp sets: the timestamp set 1, the timestamp set 2, the timestamp set 3, and the timestamp set 4; and a group 3 includes 5 timestamp sets: the timestamp set 2, the timestamp set 7, the timestamp set 8, the timestamp set 9, and the timestamp set 10.

In a possible embodiment, obtaining P2 groups based on the N timestamp sets may include:

selecting K2 timestamp sets (K2<N) from N timestamp sets P2 times randomly, to obtain P2 groups, where each group includes K2 timestamp sets, and each group includes K2 different timestamp sets.

For each process of selecting K2 timestamp sets, the measurement apparatus obtains a current time value, then a hash operation is performed on the current time value to obtain a hash value, and then the hash value is used to perform modulo operation on the number N to obtain a remainder i. A value range of the remainder i is 0 to N−1, the remainder i is used as a sequence number of a timestamp set, the timestamp set corresponding to the remainder i is used as a reference timestamp set, and the reference timestamp set and previous K2−1 timestamp sets of the reference timestamp set is used as currently selected K2 timestamps. If the number of timestamp sets before the reference timestamp set is less than K2−1, other timestamp sets are selected from the rear of the N timestamp sets. Alternatively, the reference timestamp set and following K2−1 timestamp sets of the reference timestamp set is used as currently selected K2 timestamps. If the number of timestamp sets after the reference timestamp set is less than K2−1, other timestamp sets are selected from the head of the N timestamp sets.

Possibly, in a current random selection process, a currently obtained time value is Nov. 7, 2020, 13:39:00, and a hash operation is performed on the current time value to obtain a hash value of 65538. Assuming that N=10 and K2=4, sequence numbers of a timestamp set 1 to a timestamp set 10 are 0 to 9 respectively. A modulo operation is performed on the calculated hash value of 65538 against 10 to obtain a remainder of 8, that is, a sequence number of the reference timestamp set is 8, and the timestamp set with the sequence number of 8 and the 3 timestamp sets with sequence numbers of 5 to 7 respectively, namely, the timestamp set 6, the timestamp set 7, the timestamp set 8, and the timestamp set 9 are used as 4 currently selected timestamp sets.

Possibly, in a current random selection process, a currently obtained time value is Nov. 7, 2020, 13:44:01, and a hash operation is performed on the current time value to obtain 62539. Assuming that N=10 and K2=4, sequence numbers of timestamp sets 1 to 10 are 0 to 9 respectively. A modulo operation is performed on the hash value of 62539 against 10 to obtain a remainder of 9, that is, there are not 3 timestamp sets after a timestamp set with the sequence number of 9, and thus 3 other timestamp sets are selected from the head, that is, the timestamp set 10, the timestamp set 1, the timestamp set 2, and the timestamp set 3 are used as 4 currently selected timestamp sets.

It should be noted that the foregoing embodiments of randomly selecting K2 timestamp sets from N timestamp sets is only used as an example for description, and any method can also be used to randomly select K2 timestamp sets. For example, a numerical probability algorithm, Monte Carlow algorithm, Las Vegas algorithm, or Sherwood algorithm is used to randomly select a specified number of timestamp sets. This is not limited in these embodiments of this application.

In a possible embodiment, P2 groups are obtained based on the N timestamp sets by using the following rule.

The P2 groups are a group 1, a group 2, . . . , a group P2, and the N timestamp sets are a timestamp set 1, a timestamp set 2, . . . , a timestamp set N, where P2=N−K2+1; and the group 1 includes a timestamp set 1, a timestamp set 2, . . . , a timestamp set K2, the group 2 includes a timestamp set 2, a timestamp set 3, . . . , a timestamp set K2+1, . . . , and a group N−K2+1 includes a timestamp set N−K2+1, a timestamp set N−K2+2, . . . , a timestamp set N.

For example, N=10, K2=4, P2=10−4+1=7, and therefore, the 10 timestamp sets are a timestamp set 1, a timestamp set 2, . . . , a timestamp set 10 respectively. Each group includes 4 timestamp sets, a group 1 includes a timestamp set 1 to a timestamp set 4, a group 2 includes a timestamp set 2 to a timestamp set 5, a group 3 includes a timestamp set 3 to a timestamp set 6, a group 4 includes a timestamp set 4 to a timestamp set 7, a group 5 includes a timestamp set 5 to a timestamp set 8, a group 6 includes a timestamp set 6 to a timestamp set 9, and a group 7 includes a timestamp set 7 to a timestamp set 10.

It can be understood that, in the foregoing embodiments, an interval between sequence numbers of first timestamp sets of two adjacent groups is 1, and in this application, the interval can be set to a value greater than 1 as required. For example, a group 1 includes a timestamp set 1 to a timestamp set 4, and a group 2 includes a timestamp set 3 to a timestamp set 6, . . . .

In the foregoing embodiments of this application, selection of identical timestamp sets in specific groups when P2>N−K2+1 may be avoided. Therefore, in some embodiments, the N timestamp sets can be divided into P2 groups, and processing such as integration processing is further performed on each group of timestamp sets to implement a multi-pulse integration process of the echo signal, which not only increases reuse of effective timestamp data, but also can reduce repetitive work caused when the selected timestamp sets in the group are completely the same, thereby effectively improving efficiency of obtaining the time of flight.

In a possible design, numbers of timestamps in the groups are equal or close.

The number of timestamps refers to the total number of timestamps in one timestamp set. In the process of obtaining the P2 groups based on the N timestamp sets, the number of timestamps in each timestamp set is counted, and numbers of timestamps in the groups should be made equal or as close as possible. When the numbers of timestamps are close, this means that numbers of timestamps in any two groups are not greater than a specified number threshold. Based on the foregoing rule, the P2 groups can be obtained from the N timestamp sets, which can balance data volumes of the groups and facilitate application of a parallel calculation structure.

In a possible embodiment, before obtaining P2 groups based on the N timestamp sets, the method further includes:

counting the number of timestamps corresponding to each of the N timestamp sets respectively; and sorting the N timestamp sets in descending order or ascending order based on the number of timestamps.

It can be understood that the N timestamp sets are sorted in ascending or descending order, making it easy to rapidly form required timestamp sets when the P2 groups are generated based on the rule that the numbers of timestamps are equal or close.

S403. Accumulate the timestamp set included in each group to obtain P2 first intermediate timestamp sets.

For each group, integration periods of timestamp sets in the group are equal, and before the timestamp sets in the group are accumulated, the integration periods corresponding to the timestamp sets are aligned, that is, the integration periods corresponding to the timestamp sets have coincided start moments and coincided end moments. Then, the timestamp sets in the groups are combined to obtain a first intermediate timestamp set. For example, a specific group includes a timestamp set 1 and a timestamp set 2, the timestamp set 1 includes timestamps t0 and t1, the timestamp set 2 includes timestamps t4 and t6, and then the two timestamp sets in the first group are accumulated to obtain corresponding first intermediate timestamp sets t0, t1, t4, and t6.

In a possible embodiment, accumulating the timestamp set included in each group to obtain P2 first intermediate timestamp sets may include:

starting P2 accumulation processing threads and invoking the P2 accumulation processing threads, to accumulate the timestamp sets included in each group in parallel to obtain the P2 first intermediate timestamp sets.

When the timestamp sets in P2 groups are accumulated, P2 accumulation threads can be simultaneously performed in parallel, to reduce a calculation time.

Figure 18:
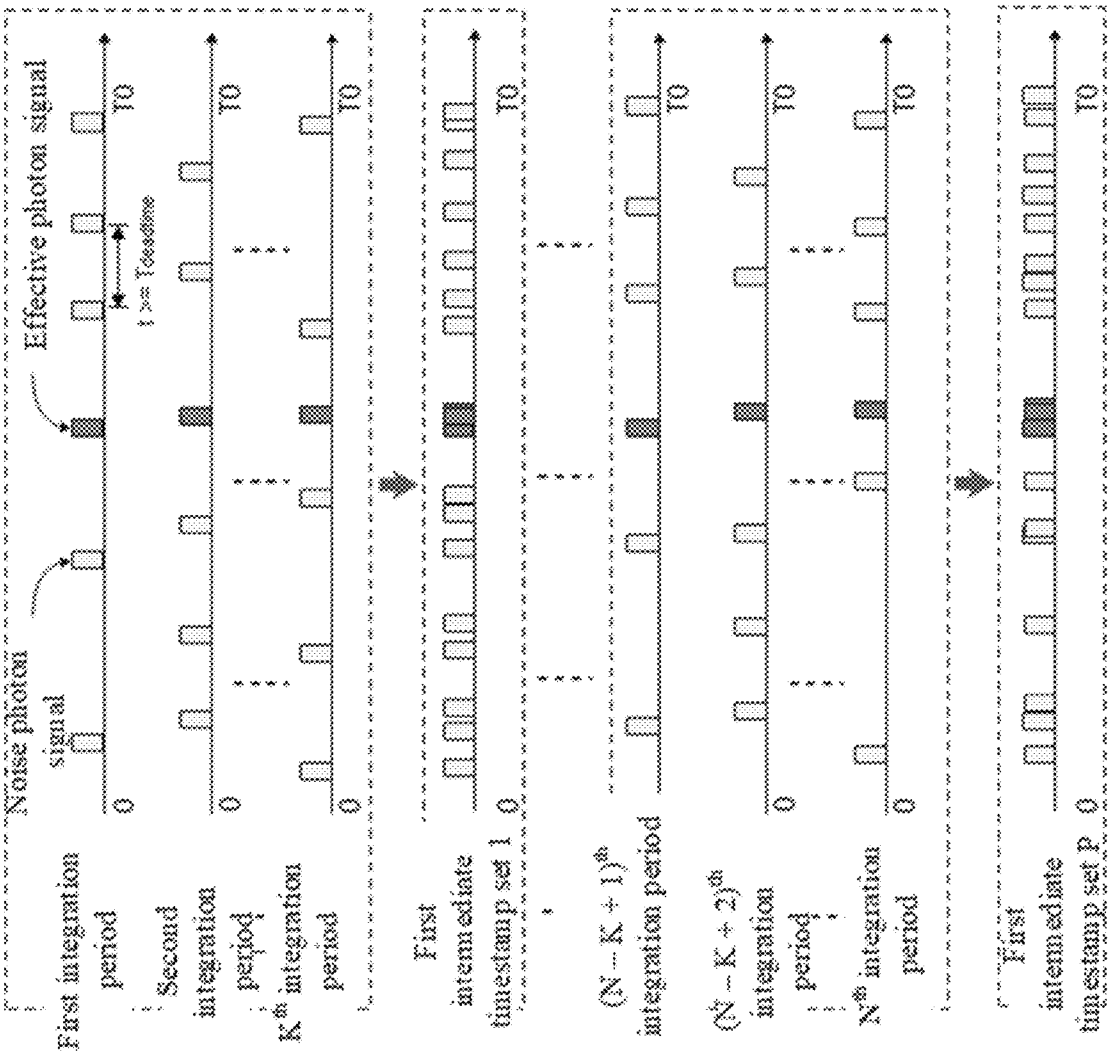
FIG. 18 is a schematic diagram of accumulation of a timestamp set within a group according to embodiments of this application.

For example, as shown in FIG. 18, N timestamp sets are obtained, N integration periods are divided into P2 groups, each group includes K2 timestamp sets, each timestamp set corresponds to one integration period, the number P2 of groups satisfies that P2=N−K2+1, and the group 1 includes a timestamp set 1 (corresponding to a first integration period) to a timestamp set K2 (corresponding to a $K2^{th}$ integration period). A generation process of a first intermediate timestamp set 1 is as follows. A timestamp set (timestamp set 1) corresponding to the first integration period may include 6 timestamps, a time interval between two adjacent timestamps in any timestamp set is t, and specifically, width of the time interval t is an integral multiple of the time resolution of the TDC. A timestamp set (timestamp set 2) corresponding to the second integration period includes 6 timestamps, . . . , a timestamp set (timestamp set K2) corresponding to the $K2^{th}$ integration period includes 6 timestamps; start moments of the first integration period to the $K2^{th}$ integration period are 0, and end moments are T0. The first integration period to the $K2^{th}$ integration period are aligned, then the K2 timestamp sets in the group are accumulated to obtain the first intermediate timestamp set 1. By analogy, timestamp sets from that corresponding to an $(N-K2+1)^{th}$ integration period to that corresponding to an $N^{th}$ integration period are accumulated to obtain a first intermediate timestamp set P2.

S404. Screen each first intermediate timestamp set to obtain the P2 second intermediate timestamp sets.

The screening process includes: moving, by a sliding window with preset width, on time length to implement screening. Specifically, from a start moment of the first intermediate timestamp set, the sliding window moves, and a step of each movement is the width of the sliding window; and then, the number of timestamps covered by each sliding window is counted, and if the number is less than the number threshold, a timestamp in a current sliding window is filtered out; or if the number is greater than or equal to the number threshold, the timestamp in the current sliding window is retained. In some embodiments, a number threshold corresponding to each group is related to the total number of timestamps in the timestamp set. For example, the total number of timestamps in the timestamp set in the group is equal to the number threshold, or the total number of timestamps in the timestamp set in the group minus 1 is equal to the number threshold. In addition, if total numbers of timestamps in timestamp sets in groups are equal, number thresholds of the groups are also equal. In some embodiments, the width of the sliding window is also related to the number of timestamp sets in the group, and the width of the sliding window can be an integer multiple of minimum time resolution of the TDC. For example, the width of the sliding window can be greater than or equal to K times the minimum time resolution of the TDC, where K is an integer greater than 1.

Figure 19:
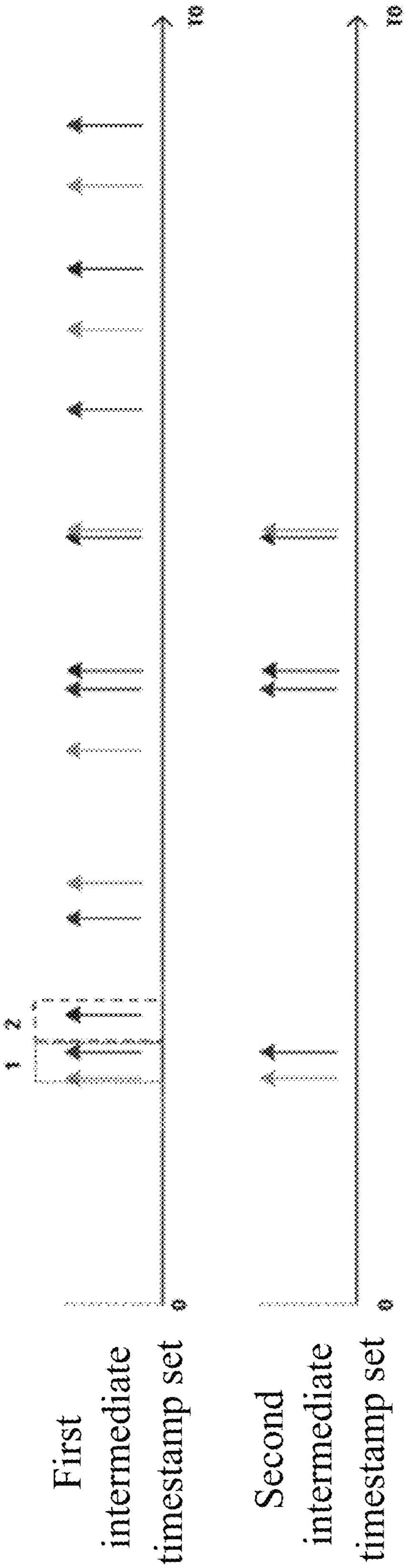
FIG. 19 is a schematic diagram of a principle of screening a first intermediate timestamp set according to embodiments of this application.
Figure 21:
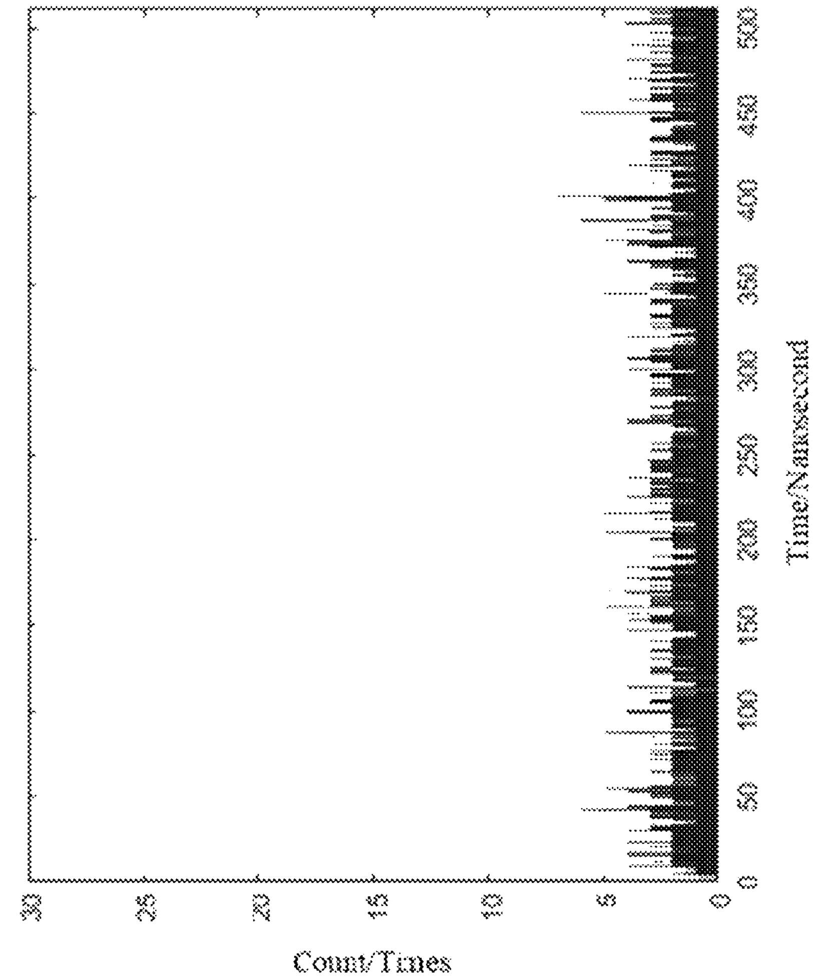
FIG. 21 shows histogram data before screening according to embodiments of this application.

For example, referring to FIG. 19, the number threshold is 2, and the width of the sliding window is 4 times the minimum time resolution of the TDC. A first dashed box in FIG. 19 is a position of the sliding window at a current moment in an integration period of a first intermediate timestamp set, and can be denoted as a time window 1. The number of timestamps (corresponding to echo signals) in the time window 1 is 2, which satisfies the condition that the number of timestamps is greater than or equal to the number threshold of 2, and therefore, all the timestamps in the time window 1 are retained. A second dashed box in FIG. 21 is a position of a sliding window at the next moment, and can be denoted as a time window 2, the counted number of timestamps covered by the time window 2 is 1, which is less than the number threshold of 2, and therefore, all the timestamps within the time window 2 are filtered out. After the first intermediate timestamp set is screened through the sliding window, the second intermediate timestamp set at the bottom of FIG. 19 is obtained.

S405. Accumulate the P2 second intermediate timestamp sets to obtain coherent timestamp sets.

P2 second intermediate timestamp sets are aligned and have the same time length, coherent timestamp sets are obtained after the P2 second intermediate timestamp sets are accumulated, and the coherent timestamp sets are a collection of all the timestamps in the P2 second intermediate timestamp sets.

Figure 20:
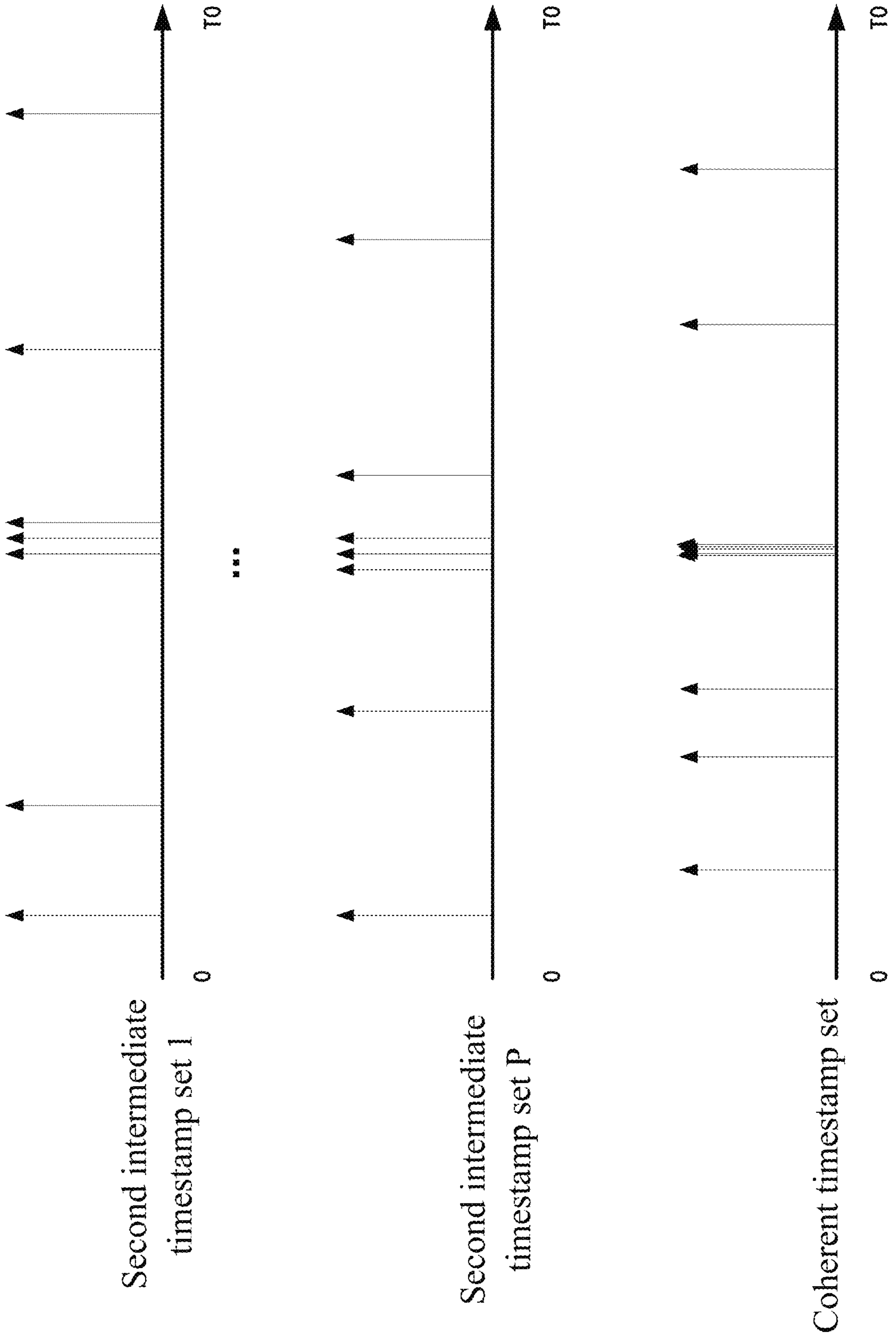
FIG. 20 is a schematic diagram of a principle of accumulating each second intermediate timestamp set according to embodiments of this application.

For example, referring to FIG. 20, the second intermediate timestamp set 1 to the second intermediate timestamp set P2 are accumulated. A specific accumulation process can be the same as the accumulation process in FIG. 18. For details, refer to description of FIG. 18. Details are not described herein again.

S406. Generate the histogram data based on the coherent timestamp sets.

Counts of timestamps in the coherent timestamp sets are collected to generate histogram data. The histogram data includes two dimensions: the timestamps and the count of the timestamps (that is, the number of occurrences).

Figure 22:
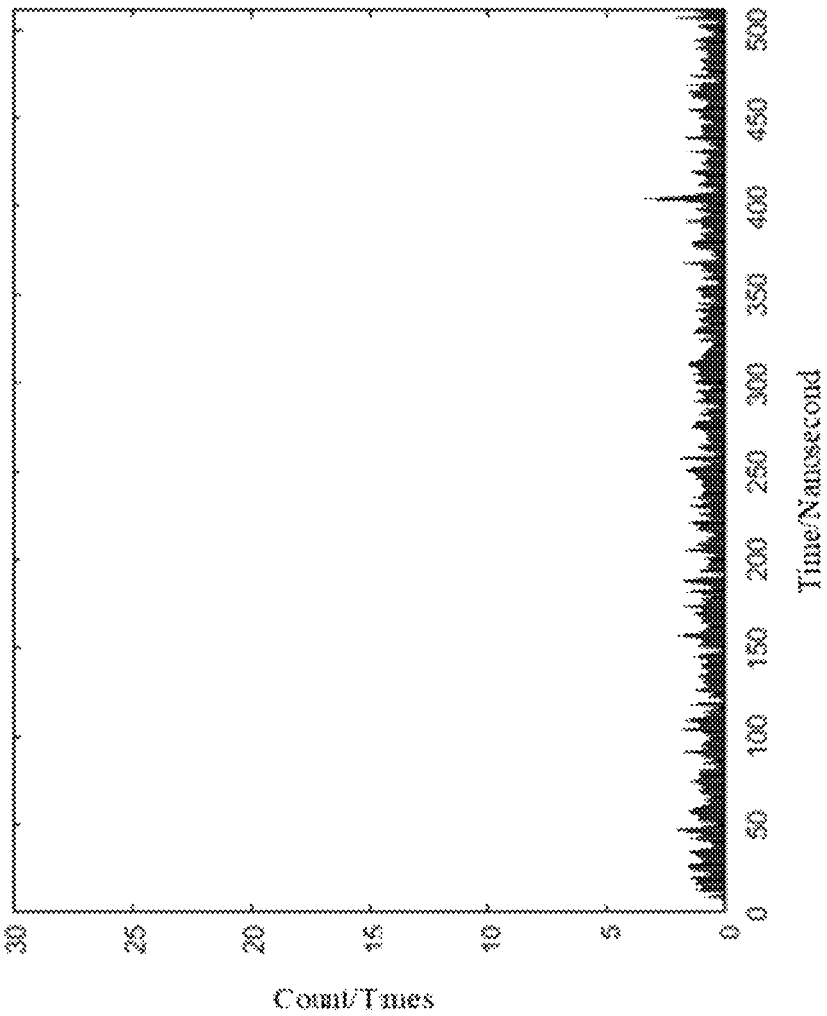
FIG. 22 shows histogram data after screening according to embodiments of this application.

For example, referring to histogram data shown in FIG. 21 and FIG. 22, FIG. 21 shows a histogram before coherent processing. A peak value in counts in the histogram is not sufficiently significant due to impact of the noise signal. FIG. 22 shows histogram data obtained after coherent processing based on multiple-pulse integration. It can be learned that a count other than the peak value in FIG. 22 is suppressed, the peak value is more significant, and time corresponding to the peak value is about 400 ns.

S407. Determine a time of flight based on the histogram data.

A timestamp with the maximum count in the histogram data is used as a signal receiving moment, and the time of flight is calculated based on the emission moment of the pulse signal and the receiving moment of the echo signal. For example, the timestamp with the maximum count in the histogram data is t1, an emission moment of the pulse signal is t0, then an obtained time of flight may be t1−t0, and then the distance between the detector and the target object can be calculated based on the time of flight and the speed of light.

It can be understood that the TDC can be used to collect multiple timestamp sets, the multiple timestamp sets are divided into multiple groups, timestamp sets in each group are accumulated to obtain the first intermediate timestamp set, the sliding window of the preset width is further used to screen each first intermediate timestamp set to obtain a second intermediate timestamp set, the histogram data is generated based on timestamps obtained by accumulating the multiple second intermediate timestamp sets, and in this way, the time of flight can be determined based on the peak position of the count in the histogram data, so that the count of the timestamps corresponding to the echo signal in the histogram data can basically remain unchanged and the count of the timestamps corresponding to the noise signal is suppressed, which not only improves the SBNR of the distance detector, but also effectively improves the measurement accuracy of the time of flight of the distance detector.

The time-of-flight measurement method in some embodiments is described in detail above, and a time-of-flight measurement apparatus (referred to as an apparatus 81 below) according to some embodiments is provided below.

Figure 23:
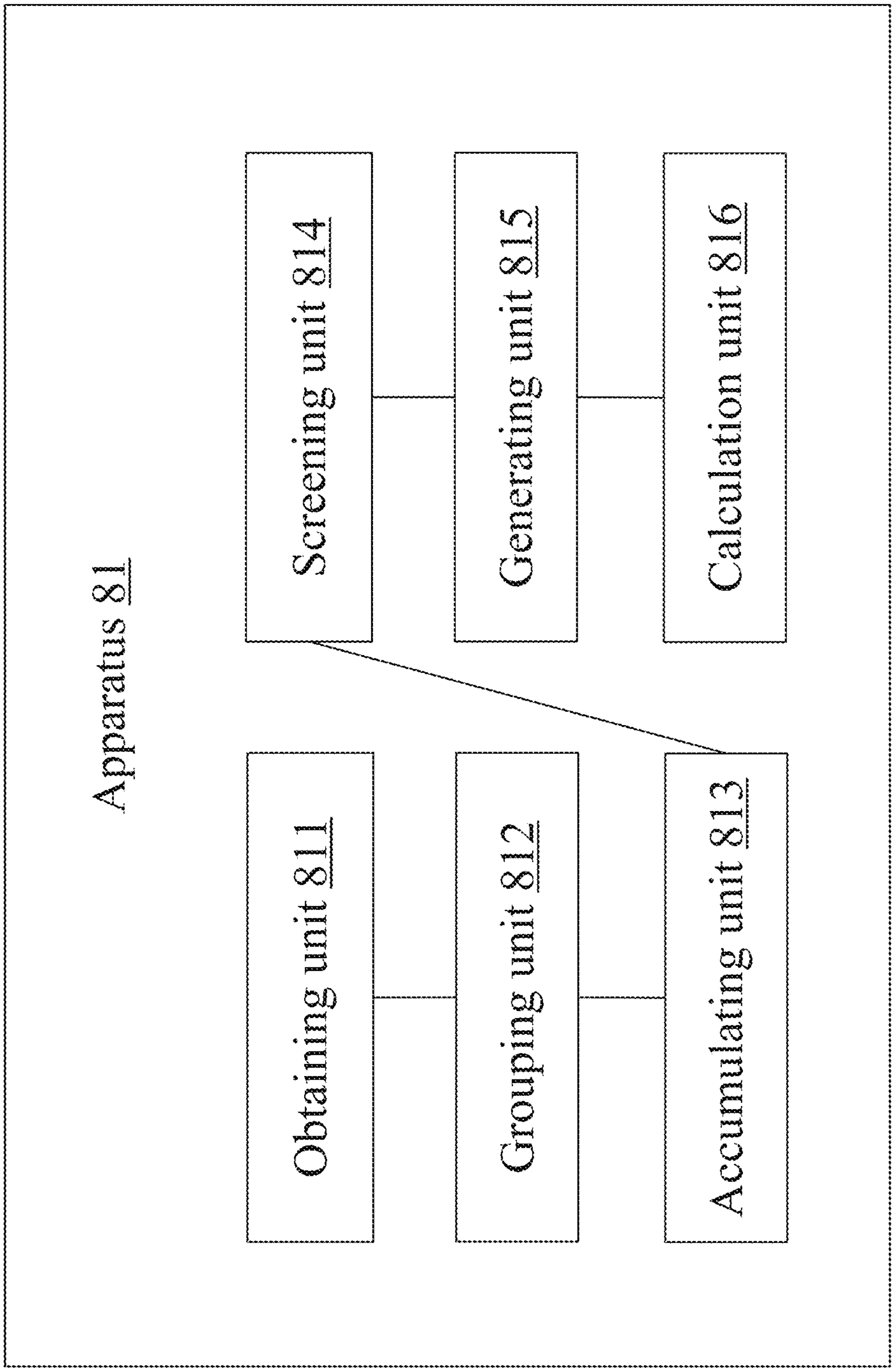
FIG. 23 is a schematic structural diagram of a time-of-flight measurement apparatus according to embodiments of this application.

The apparatus 81 shown in FIG. 23 can implement the time-of-flight measurement method in the embodiment shown in FIG. 17. The apparatus 81 includes an obtaining unit 811, a grouping unit 812, an accumulating unit 813, a screening unit 814, a generating unit 815, and a calculation unit 816.

The obtaining unit 811 is configured to obtain N timestamp sets, where N is an integer greater than 1, each timestamp set includes multiple timestamps, and one timestamp set is corresponding to one integration period.

The grouping unit 812 is configured to obtain P2 groups based on the N timestamp sets, where P2<N, P2 is a positive integer, and each group includes at least two timestamp sets.

The accumulating unit 813 is configured to accumulate the timestamp set included in each group to obtain P2 first intermediate timestamp sets.

The screening unit 814 is configured to screen each first intermediate timestamp set to obtain P2 second intermediate timestamp sets, where a screening process includes: moving, by a sliding window with preset width, on time length to implement screening; and if the number of timestamps covered by the sliding window is less than a number threshold, filtering out the timestamp in the sliding window; or if the number of timestamps covered by the sliding window is greater than or equal to the number threshold, retaining the timestamp in the sliding window.

The accumulating unit 813 is further configured to accumulate the P2 second intermediate timestamp sets to obtain coherent timestamp sets.

The generating unit 815 is configured to obtain the histogram data based on the coherent timestamp sets.

The calculation unit 816 is configured to determine a time of flight based on the histogram data.

In one or more embodiments, each group includes the same number of timestamp sets, and a number threshold corresponding to each group is related to the number of timestamp sets.

In one or more embodiments, obtaining P2 groups based on the N timestamp sets includes:

selecting K2 timestamp sets from N timestamp sets P2 times randomly, to obtain P2 groups, where each group includes K2 timestamp sets, K2<N, and each group includes K2 different timestamp sets.

In one or more embodiments, the P2 groups are a group 1, a group 2, . . . , a group P2, and the N timestamp sets are a timestamp set 1, a timestamp set 2, . . . , a timestamp set N, where P2=N−K2+1; and the group 1 includes a timestamp set 1, a timestamp set 2, . . . , a timestamp set K2, the group 2 includes a timestamp set 2, a timestamp set 3, . . . , a timestamp set K2+1, . . . , and a group N−K2+1 includes a timestamp set N−K2+1, a timestamp set N−K2+2, . . . , a timestamp set N.

In one or more embodiments, length of a sliding window is greater than or equal to an integer multiple of minimum time resolution of a TDC.

In one or more embodiments, numbers of timestamps in the groups are equal or close.

In one or more embodiments, accumulating the timestamp set included in each group to obtain P first intermediate timestamp sets includes:

starting P2 accumulation processing threads and invoking the P2 accumulation processing threads, to accumulate the timestamp sets included in each group to obtain the P2 first intermediate timestamp sets.

Screening each first intermediate timestamp set to obtain P2 second intermediate timestamp sets includes:

starting P2 screening processing threads and invoking the P2 screening processing threads, to screen each first intermediate timestamp set to obtain the P2 second intermediate timestamp sets.

In one or more embodiments, the controller further includes:

a sorting unit (not shown in the figure), configured to: count the number of timestamps corresponding to each of the N timestamp sets respectively; and sort the N timestamp sets in descending order or ascending order based on the number of timestamps.

In one or more embodiments, the histogram data includes multiple timestamps and counts corresponding to the timestamps.

In one or more embodiments, determining a time of flight based on the histogram data includes:

using a timestamp with the maximum count in the histogram data as a receiving moment of an echo signal; and calculating the time of flight based on an emission moment of a pulse signal and the receiving moment of the echo signal.

These embodiments of this application and the method embodiments in FIG. 1A to FIG. 1D and FIG. 17 to FIG. 20 are based on the same concept, and also have the same technical effects. For a specific process, refer to the description of the method embodiments in FIG. 1A to FIG. 1D and FIG. 17 to FIG. 20. Details are not described herein again.

The apparatus 81 may be a FPGA, a dedicated integrated chip, an SoC, a CPU, an NP, a digital signal processing circuit, an MCU, a PLD or other integrated chips that realize related functions.

The time-of-flight measurement method in some embodiments is described in detail above, and a time-of-flight measurement apparatus (referred to as an apparatus 91 below) according to some embodiments is provided below.

Figure 24:
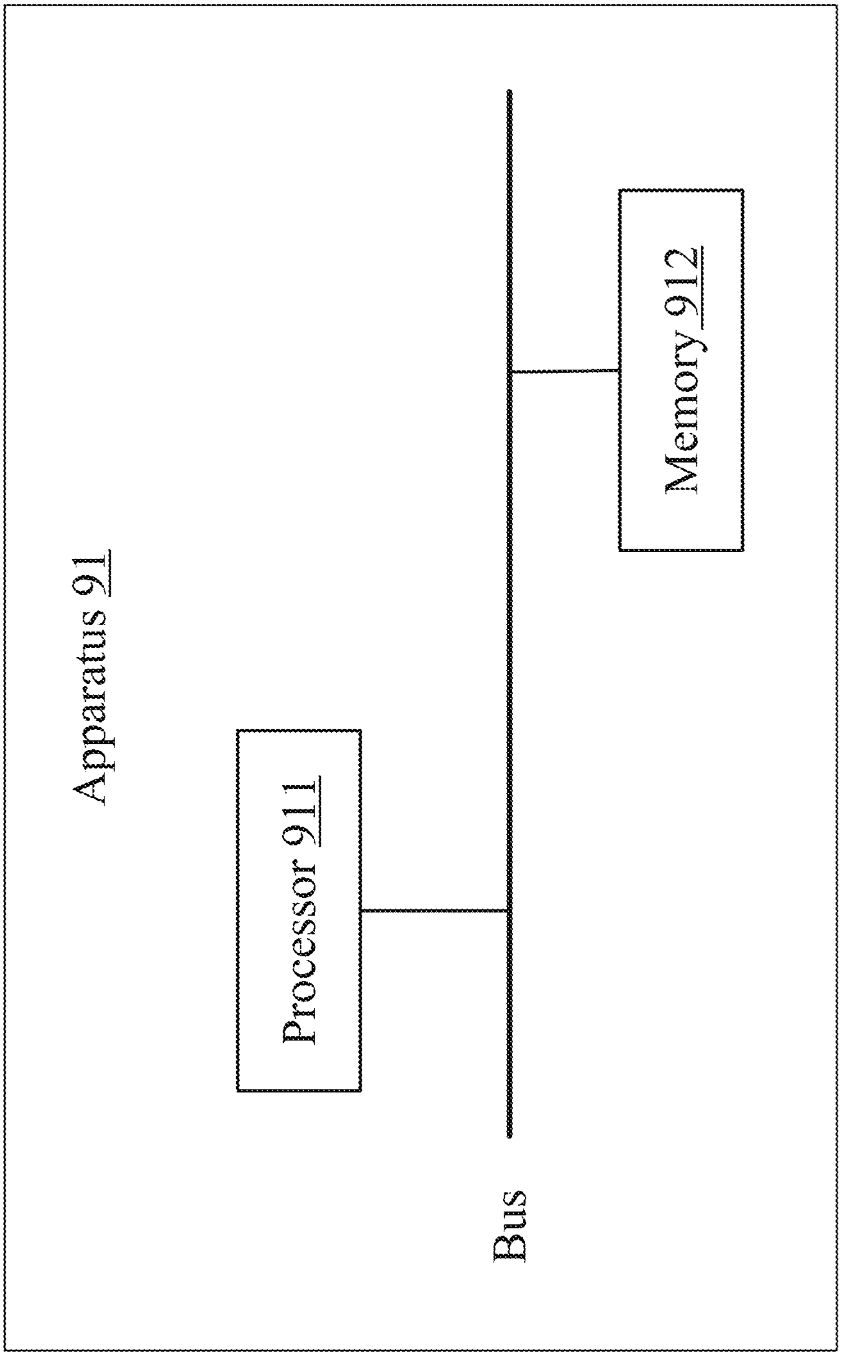
FIG. 24 is another schematic structural diagram of a time-of-flight measurement apparatus according to embodiments of this application.

FIG. 24 is a schematic structural diagram of an apparatus according to embodiments of this application. The apparatus is referred to as an apparatus 91 below. The apparatus 91 can be integrated into the LiDAR in the foregoing embodiments or a supporting platform. As shown in FIG. 24, the apparatus includes a memory 912 and a processor 911.

The memory 912 may be an independent physical unit, and may be connected to the processor 911 through a bus. The memory 912 and the processor 911 can also be integrated together, or implemented through hardware or the like.

In some embodiments, the apparatus 91 may also include an emitter and a receiver, the emitter is configured to emit a laser signal, and the receiver is configured to receive the laser signal.

The memory 912 is configured to store a program for implementing the foregoing method embodiments or each module in the apparatus embodiments, and the processor 911 invokes the program to perform operations in the foregoing method embodiments, including:

obtaining N timestamp sets, where N is an integer greater than 1, each timestamp set includes multiple timestamps, and one timestamp set is corresponding to one integration period;

obtaining P2 groups based on the N timestamp sets, where P2<N, P2 is a positive integer, and each group includes at least two timestamp sets;

accumulating the timestamp set included in each group to obtain P2 first intermediate timestamp sets;

screening each first intermediate timestamp set to obtain P2 second intermediate timestamp sets, where a screening process includes: moving, by a sliding window with preset width, on time length to implement screening; and if the number of timestamps covered by the sliding window is less than a number threshold, filtering out the timestamp in the sliding window; or if the number of timestamps covered by the sliding window is greater than or equal to the number threshold, retaining the timestamp in the sliding window;

accumulating the P2 second intermediate timestamp sets to obtain coherent timestamp sets;

obtaining the histogram data based on the coherent timestamp sets; and determining a time of flight based on the histogram data.

In one or more embodiments, each group includes the same number of timestamp sets, and a number threshold corresponding to each group is related to the number of timestamp sets.

In one or more embodiments, when obtaining P2 groups based on the N timestamp sets, the processor 911 is configured to:

select K2 timestamp sets from N timestamp sets P2 times randomly, to obtain P2 groups, where each group includes K2 timestamp sets, K2<N, and each group includes K2 different timestamp sets.

In one or more embodiments, the P2 groups are a group 1, a group 2, . . . , a group P2, and the N timestamp sets are a timestamp set 1, a timestamp set 2, . . . , a timestamp set N, where P2=N−K2+1; and the group 1 includes a timestamp set 1, a timestamp set 2, . . . , a timestamp set K2, the group 2 includes a timestamp set 2, a timestamp set 3, . . . , a timestamp set K2+1, . . . , and a group N−K2+1 includes a timestamp set N−K2+1, a timestamp set N−K2+2, . . . , a timestamp set N.

In one or more embodiments, length of a sliding window is greater than or equal to an integer multiple of minimum time resolution of a TDC.

In one or more embodiments, numbers of timestamps in the groups are equal or close.

In one or more embodiments, when accumulating the timestamp set included in each group to obtain P2 first intermediate timestamp sets, the processor 911 is configured to: start P2 accumulation processing threads and invoke the P2 accumulation processing threads, to accumulate the timestamp sets included in each group to obtain the P2 first intermediate timestamp sets.

When screening each first intermediate timestamp set to obtain P2 second intermediate timestamp sets, the processor 911 is configured to:

start P2 screening processing threads and invoke the P2 screening processing threads, to screen each first intermediate timestamp set to obtain the P2 second intermediate timestamp sets.

In one or more embodiments, the processor 911 is further configured to:

count the number of timestamps corresponding to each of the N timestamp sets respectively; and sort the N timestamp sets in descending order or ascending order based on the number of timestamps.

In one or more embodiments, the histogram data includes multiple timestamps and counts corresponding to the timestamps.

In one or more embodiments, when determining a time of flight based on the histogram data, the processor 911 is configured to:

use a timestamp with the maximum count in the histogram data as a receiving moment of an echo signal; and calculate the time of flight based on an emission moment of a pulse signal and the receiving moment of the echo signal.

These embodiments of this application and the embodiment of FIG. 17 are based on the same concept, and also have the same technical effects. For a specific process, refer to the description of the embodiment of FIG. 17. Details are not described herein again.

When a part or all of the time-of-flight measurement method in the foregoing embodiments is implemented through software, the apparatus may also only include a processor. The memory for storing the program is located outside the apparatus, and the processor is connected to the memory through a circuit or a wire, and is configured to read and execute the program stored in the memory.

The processor may be a CPU, an NP or a combination of the CPU and the NP.

The processor can further include a hardware chip. The forgoing hardware chip can be an ASIC, a PLD, or a combination thereof. The forgoing PLD may be a CPLD, a FPGA, a GAL or any combination thereof.

A memory can include a volatile memory, such as a RAM. The memory can also include a non-volatile memory, such as a flash memory, an HDD or an SSD. The memory can also include a combination of the above types of memories.

In the foregoing embodiments, a sending unit or the emitter performs a sending step in the foregoing method embodiments, a receiving unit or the receiver performs a receiving step in the foregoing method embodiments, and another step is performed by another unit or processor. The sending unit and the receiving unit can form a transceiver unit, and the receiver and the emitter can form a transceiver.

An embodiment of this application further provides a computer storage medium that stores a computer program, where the computer program is used to perform the time-of-flight measurement method provided in the foregoing embodiments.

An embodiment of this application further provides a computer program product including an instruction, and when executed on the computer, the instruction enables the computer to perform the time-of-flight measurement method provided in the foregoing embodiments.

Embodiment 4

Referring back to FIG. 1A, in some embodiments, the measurement system may include an emitter and a detector. The emitter is configured to emit a pulse signal, and the detector includes a pixel unit, a TDC, and a RAM. Further, the time-of-flight measurement apparatus can measure a time interval between the pulse signal emitted through the laser pulse and the echo signal received by the detector, to measure a distance between the time-of-flight measurement apparatus and a detected object.

A basic DTOF measurement process is as follows. The DTOF emits N pulse signals and receive N echo signals within a single-frame measurement time, and then a histogram is generated for statistics based on a record of the time of flight of the N echo signals, and the time of flight occurring at the highest frequency is used to calculate a distance between LiDAR and a target object.

Specifically, the emitter emits a pulse signal to the target object, the pulse signal reaches the target object and is reflected, a pixel unit or a pixel array receives an echo signal reflected by the target object, and converts the echo signal into an electrical signal, a TDC records a generating time (or referred to as a timestamp) of the electrical signal, the generating time is used as an arrival time of the echo signal, a RAM stores the arrival time of the echo signal, a time of flight (TOF) can be obtained based on an emission time of the pulse signal and the arrival time of the echo signal, and therefore, a distance between the emitter and the target object can be calculated based on the constant speed of light and the time of flight.

However, in an actual measurement process, due to high sensitivity of the detector, signals received by the detector may further include a noise signal in addition to the echo signal reflected by the target object. A source of the noise signal includes a component inside the detector or incident ambient light, but the detector cannot effectively identify the noise signal or the echo signal in the received signals. To reduce impact of the noise signal on a DTOF measurement result, TCSPC in related technologies is used to measure the time of flight. A main principle is that the emitter emits multiple laser pulse signals in a time frame; and because a moving speed of the target object is much lower than the speed of light, arrival times of the echo signals are coherent or consistent, the arrival time of the noise signal is random, and after multiple integration periods, the echo signals accumulated by an SiPM through multiple SPADs in each integration period can outstrip the noise signal.

For example, referring to FIG. 1B, the time frame consists of N integration periods, N is an integer greater than 1, the echo signal that is reflected by the target object and that is received by the detector in each integration period is denoted by a rectangle filled with diagonal lines, and the received noise signal is denoted by a gray colored rectangle. The emitter emits laser pulse signals at start times of a first integration period to an $N^{th}$ integration period. It can be learned from the figure that the detector receives multiple noise signals in addition to the echo signal in each integration period, a position of the echo signal basically remains unchanged, and a position of each noise signal is relatively random. A position of a signal (the noise signal or the echo signal) on a horizontal axis represents an arrival time, and the time of flight (TOF) of each echo signal can be calculated based on the emission time of the pulse signal and the arrival time of the echo signal, and then a count (the number of accumulations) of echo signals corresponding to the same time of flight can be collected. The histogram (histogram) is generated at the bottom of FIG. 1B based on the number of accumulations. A horizontal axis of the histogram represents the time, and a vertical axis represents the count. A time corresponding to the maximum count in the histogram is the time of flight.

It can be learned that, in the current time-of-flight measurement method based on the DTOF, to detect a time of flight, it is critical to effectively identify a peak position of counts in the histogram and to further identify the time of flight. As shown in FIG. 1C below, when the ambient light is weak and there is a small distance between the emitter and the target, the SBNR is large, and a peak value of the histogram corresponding to the echo signal is easy to obtain after multiple integration periods. However, when the ambient light has strong light intensity or there is a large distance between the emitter and the target object, the number of echo signals received by the detector decreases as the distance increases, received ambient photons still remain unchanged, and the SBNR is reduced. As shown in FIG. 1D below, due to randomness of the noise signal, some peak values of the noise signal on the histogram may fluctuate to be greater than a corresponding peak value of the echo signals, and as a result, a rear-end circuit incorrectly recognizes the peak value, thereby causing a detection error. In addition, the stronger the ambient light and the larger the distance between the emitter and the detected target, the greater the probability that the peak value of the noise signal covers the peak value of the echo signal and the lower the ranging accuracy.

Figure 25:
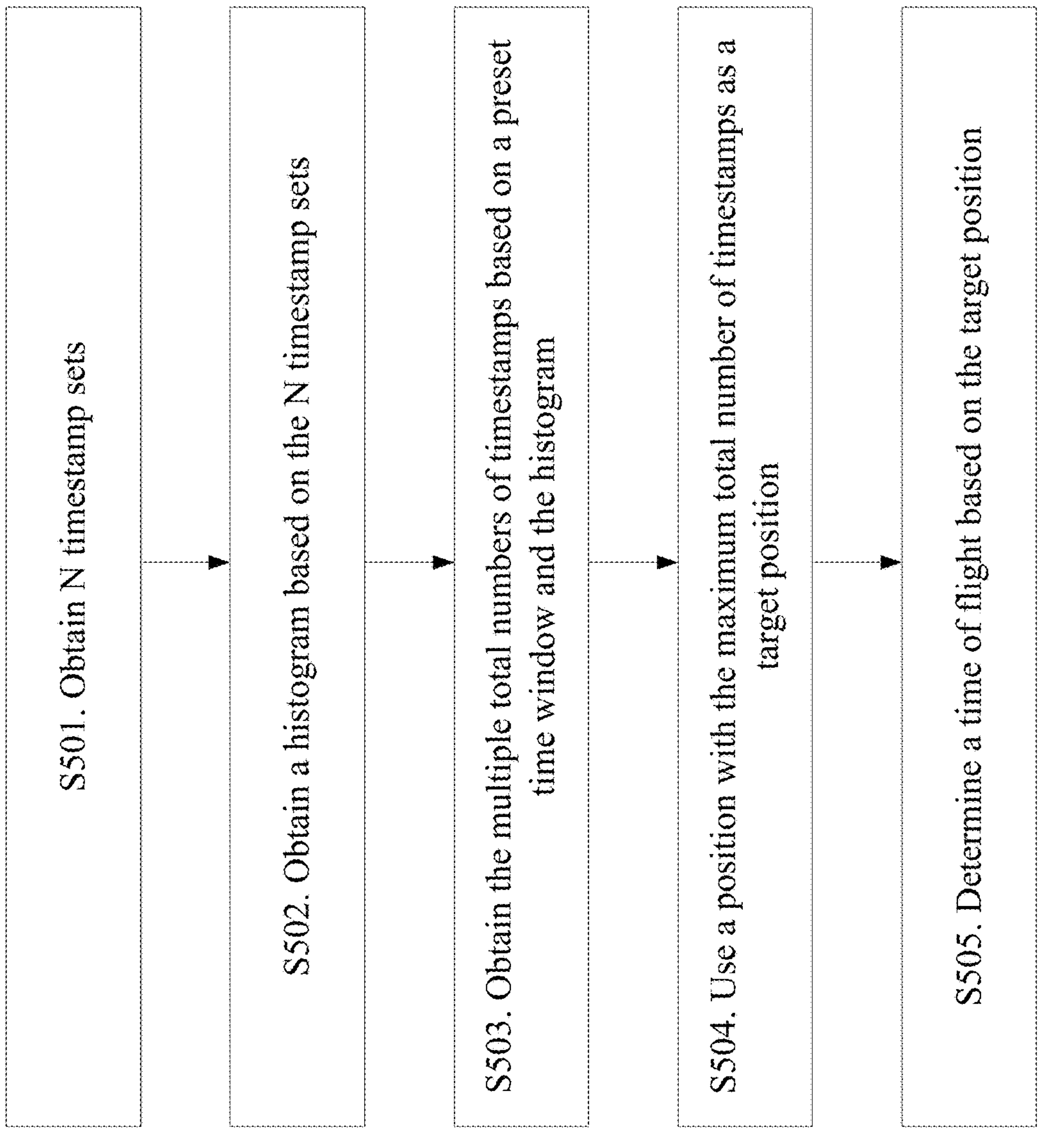
FIG. 25 is a schematic flowchart of a time-of-flight measurement method according to embodiments of this application.

FIG. 25 is a schematic flowchart of a time-of-flight measurement method according to embodiments of this application. The method includes, but is not limited to, the following steps.

S501. Obtain N timestamp sets.

Herein, 1 timestamp set is used to represent a photon event corresponding to 1 integration period, and may include a noise event and an echo signal event. The timestamp sets are corresponding to the same integration period, and the TDC records the receiving time of the echo photons (pulse signal reflected by the target object), and stores recorded timestamps of an echo signal in each integration period into a memory. Timestamps, recorded by the TDC, of multiple echo signals in one integration period form a timestamp set. For a specific process of recording the timestamp of the echo signal in the integration period, refer to FIG. 1A and FIG. 1B. Details are not described herein again. The measurement apparatus in this application obtains N timestamp sets recorded by the TDC within N integration periods, each timestamp set includes at least one timestamp, and timestamp sets may include the same number of timestamps or different numbers of timestamps.

For example, when N=4, a timestamp set corresponding to a first integration period includes 2 timestamps: $t_{11}$ and $t_{12}$, a timestamp set corresponding to a second integration period includes 4 timestamps: $t_{21}$, $t_{22}$, $t_{23}$, and $t_{24}$, a timestamp set corresponding to a third integration period includes 4 timestamps: $t_{31}$, $t_{32}$, $t_{33}$, and $t_{34}$, and a timestamp set corresponding to a fourth integration period includes 7 timestamps: $t_{41}$, $t_{42}$, $t_{43}$, $t_{44}$, $t_{45}$, $t_{46}$, and $t_{47}$.

It can be understood that a time interval between the two adjacent timestamps in the same timestamp set is greater than or equal to the minimum time resolution of the TDC, which depends on a hardware capacity of the TDC.

S502. Obtain a histogram based on the N timestamp sets.

The histogram may include multiple timestamps and the count of the timestamps, and the count represents the counted number of timestamps. For example, referring to the histogram shown in FIG. 1B, the histogram may include 16 timestamps: t1 to t16, and the timestamps correspond to their respective counts.

In a possible embodiment, obtaining a histogram based on the N timestamp sets may include the following manner.

Possibly, because the N integration periods in some embodiments are one detection period, the histogram can be obtained by accumulating the N timestamp sets, so that a histogram of a complete detection period of one frame can be obtained.

Possibly, in some embodiments, K3 timestamp sets can be further selected from the N timestamp sets, where K3<N and K3 is an integer greater than 2; and the selected K3 timestamp sets are further accumulated to obtain a histogram.

Specifically, in some embodiments, K3 timestamp sets are selected from the N timestamp sets, a value of K3 is less than N, and therefore, it is unnecessary to process all the timestamp sets, which can reduce accumulated data volume, thereby reducing duration required for operation.

It can be understood that, in some embodiments, the N integration periods have the same time length. In addition, when the K3 timestamp sets are selected, integration periods of the timestamp sets need to be aligned, that is, start moments of the integration periods are aligned, end moments of the integration periods are aligned, and then the K3 timestamp sets are accumulated. For a specific accumulation process, refer to description of FIG. 1B. Details are not described herein again.

Further, in an embodiment of this application, a method of selecting K3 timestamp sets from the N timestamp sets includes:

Method 1: Selecting K3 Timestamp Sets from the N Timestamp Sets Randomly.

Specifically, for a process of selecting K3 timestamp sets, the measurement apparatus obtains a current time value as an initial input parameter, the current measurement apparatus may alternatively obtain an initial input parameter of another type, for example, a variable such as latitude and longitude coordinates, then a hash operation is performed on the current time value to obtain a hash value, and then the hash value is used to perform modulo operation on the number N to obtain a remainder i. A value range of the remainder i is 0 to N−1, the remainder i is used as a sequence number of a timestamp set, the timestamp set corresponding to the remainder i is used as a reference timestamp set, and the reference timestamp set and previous K3−1 timestamp sets of the reference timestamp set is used as currently selected K3 timestamp sets. If the number of timestamp sets before the reference timestamp set is less than K3−1, other timestamp sets are selected from the rear of the N timestamp sets. Alternatively, the reference timestamp set and following K3−1 timestamp sets of the reference timestamp set is used as currently selected K3 timestamp sets. If the number of timestamp sets after the reference timestamp set is less than K3−1, other timestamp sets are selected from the head of the N timestamp sets.

Possibly, in a process of randomly selecting K3 timestamp sets, a currently obtained time value is Nov. 7, 2020, 13:39:00, and a hash operation is performed on the current time value to obtain a hash value of 65538. Assuming that N=10 and K3=4, sequence numbers of a timestamp set 1 to a timestamp set 10 are 0 to 9 respectively. A modulo operation is performed on the calculated hash value of 65538 against 10 to obtain a remainder of 8, that is, a sequence number of the reference timestamp set is 8, and the timestamp set with the sequence number of 8 and the 3 timestamp sets with sequence numbers of 5 to 7 respectively, namely, the timestamp set 6, the timestamp set 7, the timestamp set 8, and the timestamp set 9 are used as 4 currently selected timestamp sets.

Possibly, in a current random selection process, a currently obtained time value is Nov. 7, 2020, 13:44:01, and a hash operation is performed on the current time value to obtain 62539. Assuming that N=10 and K3=4, sequence numbers of timestamp sets 1 to 10 are 0 to 9 respectively. A modulo operation is performed on the hash value of 62539 against 10 to obtain a remainder of 9, that is, there are not 3 timestamp sets after a timestamp set with the sequence number of 9, and thus 3 other timestamp sets are selected from the head, that is, the timestamp set 10, the timestamp set 1, the timestamp set 2, and the timestamp set 3 are used as 4 currently selected timestamp sets.

It should be noted that the foregoing embodiments of randomly selecting K3 timestamp sets from N timestamp sets is only used as an example for description, and any method can also be used to randomly select K3 timestamp sets. For example, a numerical probability algorithm, Monte Carlow algorithm, Las Vegas algorithm, or Sherwood algorithm is used to randomly select a specified number of timestamp sets. This is not limited in these embodiments of this application.

Method 2: Selecting K3 Timestamp Sets with the Minimum Number of Timestamps from the N Timestamp Sets.

It can be understood that because a unique number of pulse signals are emitted in each integration period, when a timestamp set with a small number of timestamps in the integration period is selected, fewer timestamps of the noise signal are correspondingly included. For example, N=10, K3=4, the 10 timestamp sets are a timestamp set 1 to a timestamp set 10 respectively, 100 timestamps are included in the timestamp set 1, 122 timestamps are included in the timestamp set 2, 123 timestamps are included in the timestamp set 3, 102 timestamps are included in the timestamp set 4, 98 timestamps are included in the timestamp set 5, 90 timestamps are included in the timestamp set 6, 80 timestamps are included in the timestamp set 7, 85 timestamps are included in the timestamp set 8, 89 timestamps are included in the timestamp set 9, and 84 timestamps are included in the timestamp set 10. 4 timestamp sets of the timestamp set 7, the timestamp set 8, the timestamp set 9, and the timestamp set 10 with the minimum number of timestamps are selected from the 10 timestamp sets.

Method 3: Selecting K3 Timestamps with Odd Sequence Numbers from the N Timestamp Sets.

The N timestamp sets are numbered from 1, sequence numbers of the N timestamp sets are 1, 2, 3, . . . , N, and odd numbers are 1, 3, 5, 7, . . . .

For example, N=10, K3=4, the 10 timestamp sets are a timestamp set 1 to a timestamp set 10 respectively, and 4 timestamp sets of the timestamp set 1, the timestamp set 3, the timestamp set 5, and the timestamp set 7 with odd sequence numbers are selected from the 10 timestamp sets.

Method 4: Selecting K3 Timestamp Sets with Even Sequence Numbers from the N Timestamp Sets.

The N timestamp sets are numbered from 1, sequence numbers of the N timestamp sets are 1, 2, 3, . . . , N, and even numbers are 2, 4, 6, 8, . . . .

For example, N=10, K3=4, the 10 timestamp sets are a timestamp set 1 to a timestamp set 10 respectively, and 4 timestamp sets of the timestamp set 2, the timestamp set 4, the timestamp set 6, and the timestamp set 8 with even sequence numbers are selected from the 10 timestamp sets.

In another possible embodiment, obtaining a histogram based on the N timestamp sets may include:

smoothing the N timestamp sets respectively to obtain N processed timestamp sets; and accumulating the N processed timestamp sets to obtain a final histogram.

Integration periods of the N timestamp sets are aligned, that is, start moments of the integration periods are aligned, end moments of the integration periods are aligned, and then the N timestamp sets are accumulated, to obtain an intermediate histogram. For a specific accumulation process, refer to description of FIG. 1B. Details are not described herein again. Then the intermediate histogram is smoothed to obtain a final histogram.

Figure 26:
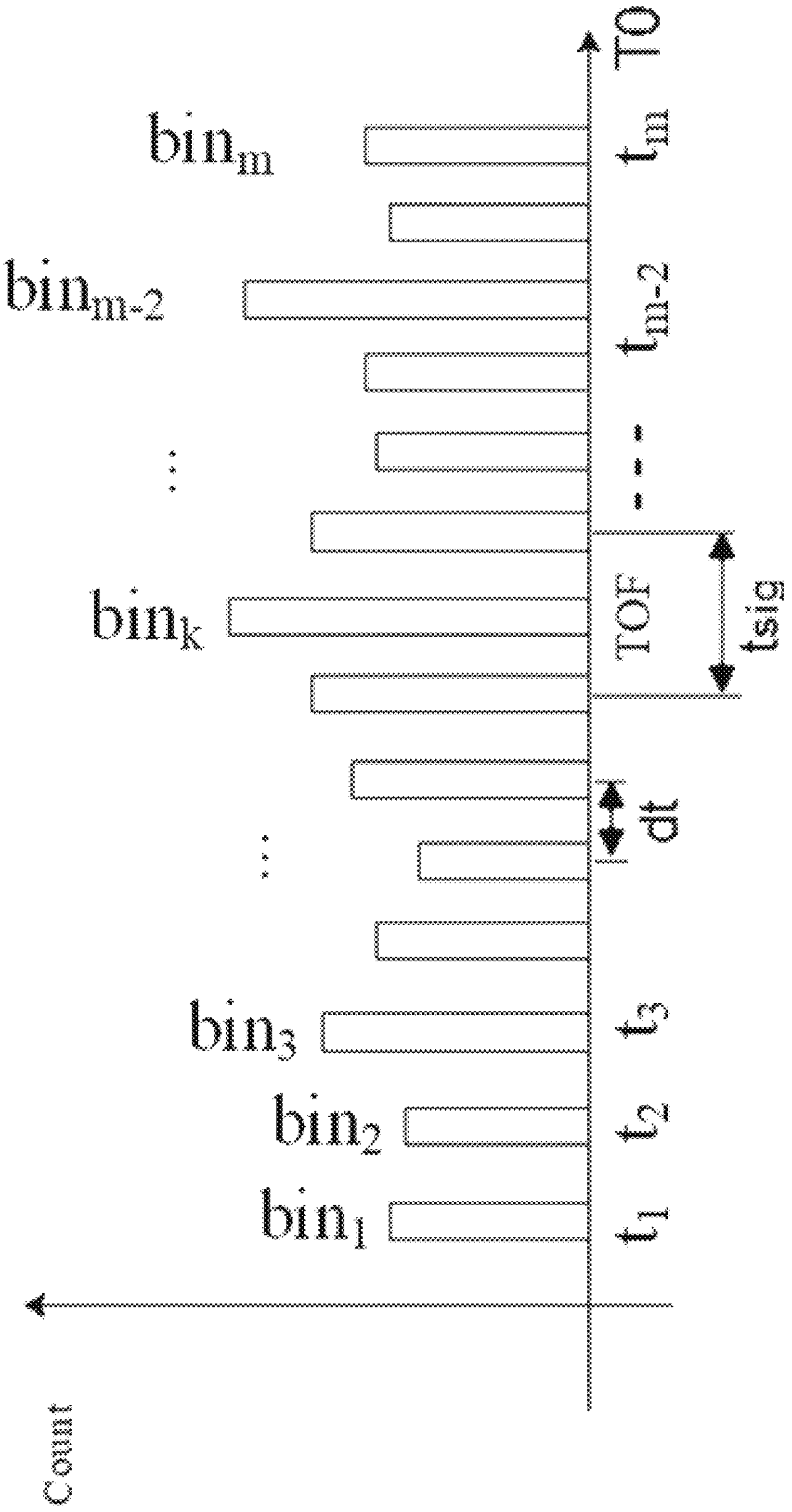
FIG. 26 is a schematic diagram of a histogram before smoothing within a group according to embodiments of this application.
Figure 27:
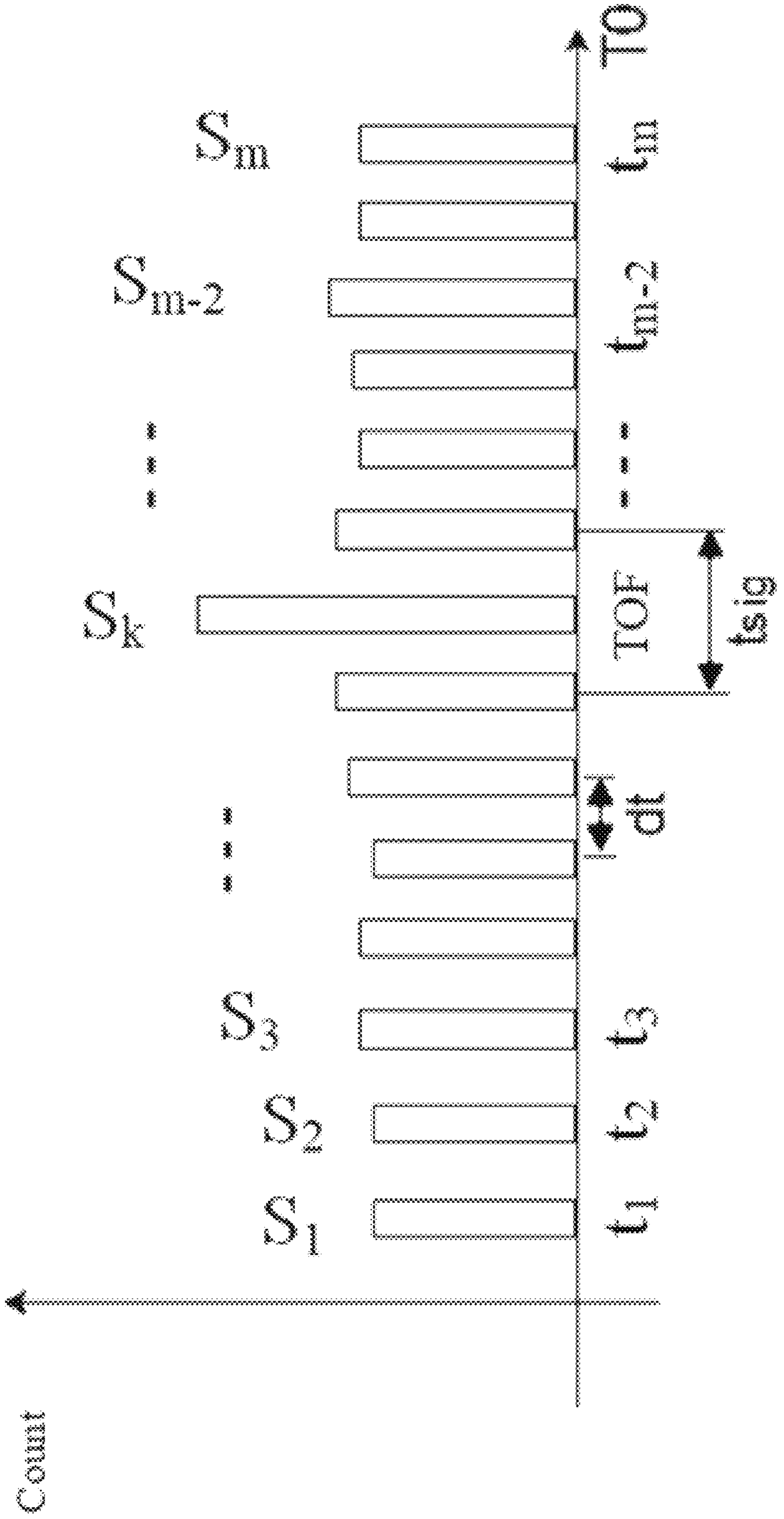
FIG. 27 is a stereogram of a histogram after smoothing according to embodiments of this application.

FIG. 26 shows a histogram obtained after accumulation of N timestamp sets when data in the N timestamp sets is not smoothed according to embodiments of this application. The histogram includes m timestamps and a count corresponding to each timestamp, wherein m is an integer greater than 2, an abscissa in the histogram represents a time, an ordinate represents the count, m counts are $bin_1$, $bin_2$, . . . , $bin_k$, . . . , $bin_m$, and timestamps corresponding to the m counts are $t_1$, $t_2$, . . . , $t_m$, respectively. A time interval between two adjacent counts in the histogram is greater than the minimum time resolution of the TDC. FIG. 27 shows m filtered values obtained after accumulation of histograms of N timestamp sets processed after data in the N timestamp sets is respectively smoothed according to embodiments of this application.

Possibly, as shown in FIG. 27, in some embodiments, a digital filter may be used for smoothing. When the digital filter is an FIR filter, an order of the FIR filter is n−1. Before smoothing, m counts are $bin_1$, $bin_2$, . . . , $bin_m$, respectively. After smoothing, the m counts are $S_{21}$, $S_{22}$, . . . , $S_{2m}$, respectively.

It can be understood that $S_{21}$ is data obtained by accumulating counts at a moment t1 in the N timestamp sets after the data in the N timestamp sets is respectively smoothed, . . . , and $S_{2m}$ is data obtained by accumulating counts at a moment $t_m$ in the N timestamp sets after the data in the N timestamp sets is respectively smoothed. The digital filter respectively performs digital filtering on m counts in N timestamp sets based on an equivalent sampling clock period, performs digital filtering once per clock period, and completes digital filtering of the m counts in the m clock periods. Therefore, in some embodiments, the timestamp of the noise signal can be suppressed through smoothing, so that the timestamp of the echo signal can be rapidly determined.

It can be understood that smoothing may include but not limited to FIR digital filtering, FIIR digital filtering, interpolation processing, and the like.

S503. Obtain the multiple total numbers of timestamps based on a preset time window and the histogram.

A time interval of the histogram is the same as the integration period of the N timestamp sets. Length of the time window is greater than the minimum time resolution of the TDC, and is generally an integer multiple of the minimum time resolution of the TDC. For example, the minimum time resolution of the TDC is 1 ns, and the length of the time window is 3 ns.

Possibly, multiple consecutive time windows of the same width are set between a start moment and an end moment of the histogram based on the preset time window; and the counts of all the timestamps covered by the time windows are summed to obtain multiple total numbers of timestamps.

Specifically, in some embodiments, the time length between the start moment and the end moment of the histogram can be divided into multiple time windows, and two adjacent time windows are not overlapped. That is, a start moment of a current time window is an end moment of a previous time window, and an end moment of the current time window is a start moment of the next time window. For each time window, the number of timestamps covered by the time window is counted to obtain multiple total numbers of timestamps.

Possibly, the time window is controlled to slide by a preset sliding step between the start moment and the end moment of the histogram; and the counts of all the timestamps covered by the time window at each sliding position are summed to obtain multiple total numbers of timestamps.

In some embodiments, length of the time window can be equal to width of the laser pulse, the emitter emits laser pulses within respective integration periods of the N timestamp sets, the laser pulse lasts for specific duration, and the duration is the width of the laser pulse. Further, because the length of the time window in some embodiments is equal to the width of the laser pulse, the slidable time window can concentrate the echo signals in the same time window, which not only reduces the time of searching for peak timestamps, but also improves searching accuracy of peak timestamps.

It can be understood that the sliding step represents the time interval between two adjacent sliding positions, and the sliding step may be greater than or equal to K times the minimum time resolution of the TDC, where K is an integer greater than 1. In this way, in some embodiments, the TDC can be used to effectively identify each time window in the N timestamp sets. The measurement apparatus controls the time window to slide from the start moment to the end moment of the histogram, and the time window is at multiple different sliding positions during the sliding process. Further, for each sliding position of the time window, the counts of all the timestamps covered by the time window are collected, and then the counts of all the timestamps are summed to obtain the total number of timestamps corresponding to the sliding position.

S504. Use a position with the maximum total number of timestamps as a target position.

After the time window slides from the start moment to the end moment of the histogram, total numbers of timestamps at the sliding positions are obtained, and the sliding position with the maximum total number of timestamps is determined. For example, the time window slides 5 times between the start moment and the end moment of the histogram, the counted total number of timestamps covered by the time window at a first sliding position is 12, the counted total number of timestamps covered by the time window at a second sliding position is 15, a counted total number of timestamps covered by the time window at a third sliding position is 27, the counted total number of timestamps covered by the time window at a fourth sliding position is 10, and the counted total number of timestamps covered by the time window at a fifth sliding position is 8. Therefore, the total number of timestamps at the third sliding position is the maximum, and the third sliding position is determined as the target position.

Figure 28:
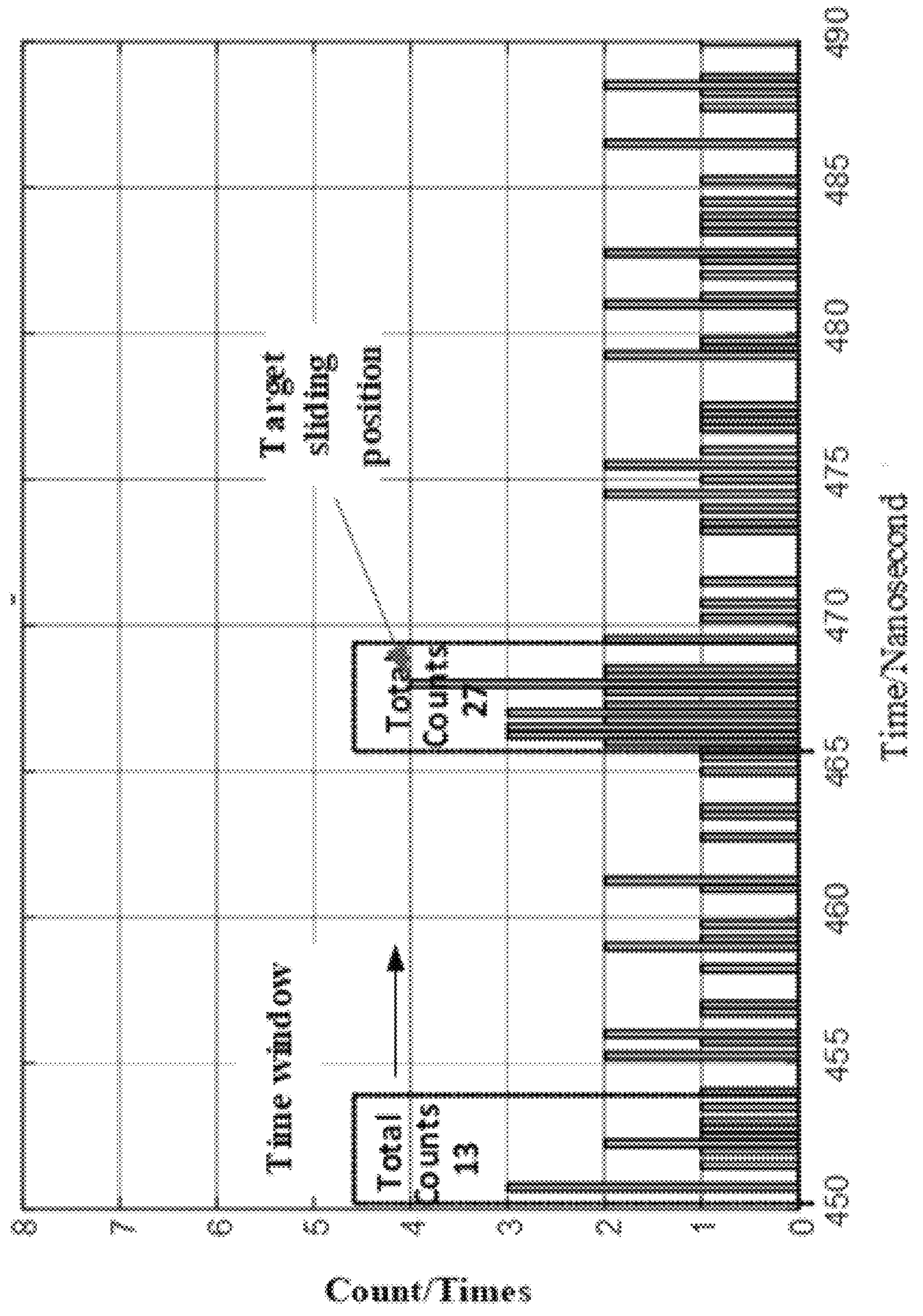
FIG. 28 is a schematic diagram of a principle of sliding of a time window on a histogram according to embodiments of this application.

For example, referring to FIG. 28, a start moment of the histogram is 450 nanoseconds, an end moment is 490 nanoseconds, and length of a time window is 3 nanoseconds (shown in a dashed box in FIG. 28). Specifically, the first sliding position of the time window is 450 nanoseconds to 453 nanoseconds, the second sliding position is 451 nanoseconds to 454 nanoseconds, and so on, so that all sliding positions in the histogram can be determined. Counts of all the timestamps covered by the time window at the sliding positions are summed. For example, counts of all the timestamps covered by the time window at the first sliding position are summed, and the obtained total number of timestamps is 13. The sliding position with the maximum total number of timestamps is determined. As shown in FIG. 28, the sliding position with the maximum total number of timestamps is 466 nanoseconds to 469 nanoseconds, the time window covers 11 timestamps at the sliding position, and the 11 timestamps are denoted as a timestamp 1 to a timestamp 11. A count of the timestamp 1 is 2, a count of the timestamp 2 is 3, a count of the timestamp 3 is 3, a count of the timestamp 4 is 2, a count of the timestamp 5 is 3, a count of the timestamp 6 is 2, a count of the timestamp 7 is 2, a count of the timestamp 8 is 4, a count of the timestamp 9 is 2, a count of the timestamp 10 is 2, and a count of the timestamp 11 is 2. The counts of the foregoing 11 timestamps are summed to obtain the total number of timestamps, namely, 27.

S505. Determine a time of flight based on the target position.

In this embodiment, the count of all the timestamps covered by the time window can be collected at each sliding position, the position with the maximum total number of timestamps is the target position, that is, the time of receiving the echo signal is within a range of the time window at the target position, and the time of flight is calculated accordingly. For the histogram, methods of determining a time of flight based on the target position include:

Method 1: Obtaining a Count of Each Timestamp Covered by the Time Window at the Target Position;

using a timestamp with the maximum count as a peak timestamp; and calculating the time of flight based on the peak timestamp.

For example, referring to FIG. 28, the time window covers 11 timestamps at the target position, and the 11 timestamps are denoted as a timestamp 1 to a timestamp 11. A count of the timestamp 1 is 2, a count of the timestamp 2 is 3, a count of the timestamp 3 is 3, a count of the timestamp 4 is 2, a count of the timestamp 5 is 3, a count of the timestamp 6 is 2, a count of the timestamp 7 is 2, a count of the timestamp 8 is 4, a count of the timestamp 9 is 2, a count of the timestamp 10 is 2, and a count of the timestamp 11 is 2. Therefore, the count of the timestamp 8 is the maximum, the timestamp 8 is used as the peak timestamp, and the peak time is a detected signal receiving time. Then, the time of flight is calculated based on an emission moment of a photon signal and the peak timestamp. For example, a peak timestamp is t1, a preset signal emission moment is t0, then the time of flight is from t1 to t0, and then the distance between the detector and the target object can be calculated based on the time of flight and the speed of light.

Method 2: Obtaining a Count of Each Timestamp Covered by the Time Window at the Target Position;

sorting the timestamps in ascending order based on the count;

averaging following N timestamps to obtain a peak timestamp, where N is an integer greater than 1; and calculating the time of flight based on the peak timestamp.

For example, referring to FIG. 28, the time window covers 11 timestamps at the target position, and the 11 timestamps are denoted as a timestamp 1 to a timestamp 11. A count of the timestamp 1 is 2, a count of the timestamp 2 is 3, a count of the timestamp 3 is 3, a count of the timestamp 4 is 2, a count of the timestamp 5 is 3, a count of the timestamp 6 is 2, a count of the timestamp 7 is 2, a count of the timestamp 8 is 4, a count of the timestamp 9 is 2, a count of the timestamp 10 is 2, and a count of the timestamp 11 is 2. The foregoing 11 timestamps are sorted in ascending order based on the counts into a sequence: the timestamp 1, the timestamp 4, the timestamp 6, the timestamp 7, the timestamp 9, the timestamp 10, the timestamp 11, the timestamp 8, the timestamp 2, the timestamp 3, and the timestamp 5, and the last 4 timestamps are averaged to obtain the peak timestamp. An averaging method includes, but is not limited to, weighted averaging, arithmetic averaging, or geometric averaging. For example, a peak timestamp is t1, an emission moment of a pulse signal is t0, then the time of flight is from t1 to t0, and then the distance between the detector and the target object can be calculated based on the time of flight and the speed of light.

Method 3: Obtaining a Count of Each Timestamp Covered by the Time Window at the Target Position;

sorting the timestamps in descending order based on the count;

averaging previous N timestamps to obtain a peak timestamp, where N is an integer greater than 1; and calculating the time of flight based on the peak timestamp.

For example, referring to FIG. 28, the time window covers 11 timestamps at the target position, and the 11 timestamps are denoted as a timestamp 1 to a timestamp 11. A count of the timestamp 1 is 2, a count of the timestamp 2 is 3, a count of the timestamp 3 is 3, a count of the timestamp 4 is 2, a count of the timestamp 5 is 3, a count of the timestamp 6 is 2, a count of the timestamp 7 is 2, a count of the timestamp 8 is 4, a count of the timestamp 9 is 2, a count of the timestamp 10 is 2, and a count of the timestamp 11 is 2. The foregoing 11 timestamps are sorted in descending order based on the counts into a sequence: the timestamp 8, the timestamp 2, the timestamp 3, the timestamp 5, the timestamp 1, the timestamp 4, the timestamp 6, the timestamp 7, the timestamp 9, the timestamp 10, and the timestamp 11, and the first 4 timestamps are averaged to obtain the peak timestamp. An averaging method includes, but is not limited to, weighted averaging, arithmetic averaging, or geometric averaging. For example, a peak timestamp is t1, an emission moment of a pulse signal is t0, then the time of flight is from t1 to t0, and then the distance between the detector and the target object can be calculated based on the time of flight and the speed of light.

It can be understood that, in the foregoing embodiments of this application, the timestamps are sorted in ascending or descending order, to reduce the data volume required for calculating the peak timestamp, which can not only effectively improve the efficiency of determining the peak timestamp, but also improve the measurement accuracy of the time of flight.

Therefore, in some embodiments, the multiple timestamp sets collected by the TDC in the integration period can be obtained, the histogram is obtained based on the multiple timestamp sets, the time window is used to slide between the start moment and the end moment of the histogram, and the count of all the timestamps covered by the time window is collected at each sliding position, the position with the maximum total number of timestamps is the target position, that is, the time of receiving the echo signal is within a range of the time window at the target position, and the time of flight is calculated accordingly. Because the pulse of the emitted pulse signal has specific pulse width, that is, the pulse of the emitted pulse signal lasts for specific duration, the echo signal returned after the pulse signal is reflected by the object has the same pulse width characteristic as the emitted pulse signal. However, the noise signal does not have such a pulse width characteristic. Therefore, the echo signals are enhanced after being accumulated in the time window, and correspondingly, the noise signal does not have such a characteristic. In some embodiments, the time window is slid on the histogram, the timestamp of the echo signal can be incorporated at a specific sliding position, so that the total number of timestamps after the summation in the time window is significant and the timestamp of the echo signal is easier to determine accurately, thereby improving the SBNR of the distance detector and effectively improving measurement accuracy of the time of flight of the distance detector.

The time-of-flight measurement method in some embodiments is described in detail above, and a time-of-flight measurement apparatus (referred to as an apparatus 82 below) according to some embodiments is provided below.

Figure 29:
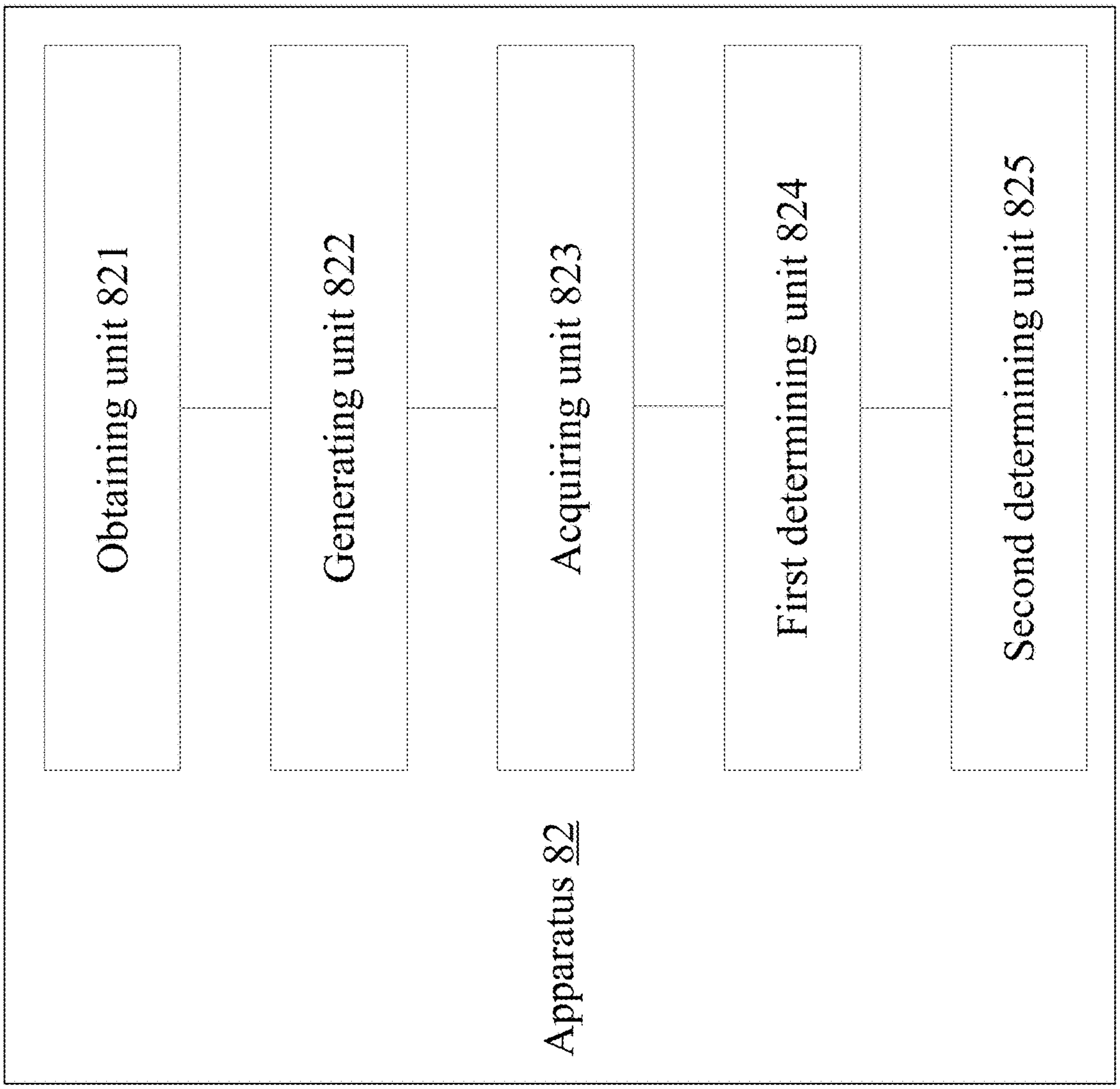
FIG. 29 is a schematic structural diagram of a time-of-flight measurement apparatus according to embodiments of this application.
Figure 30:
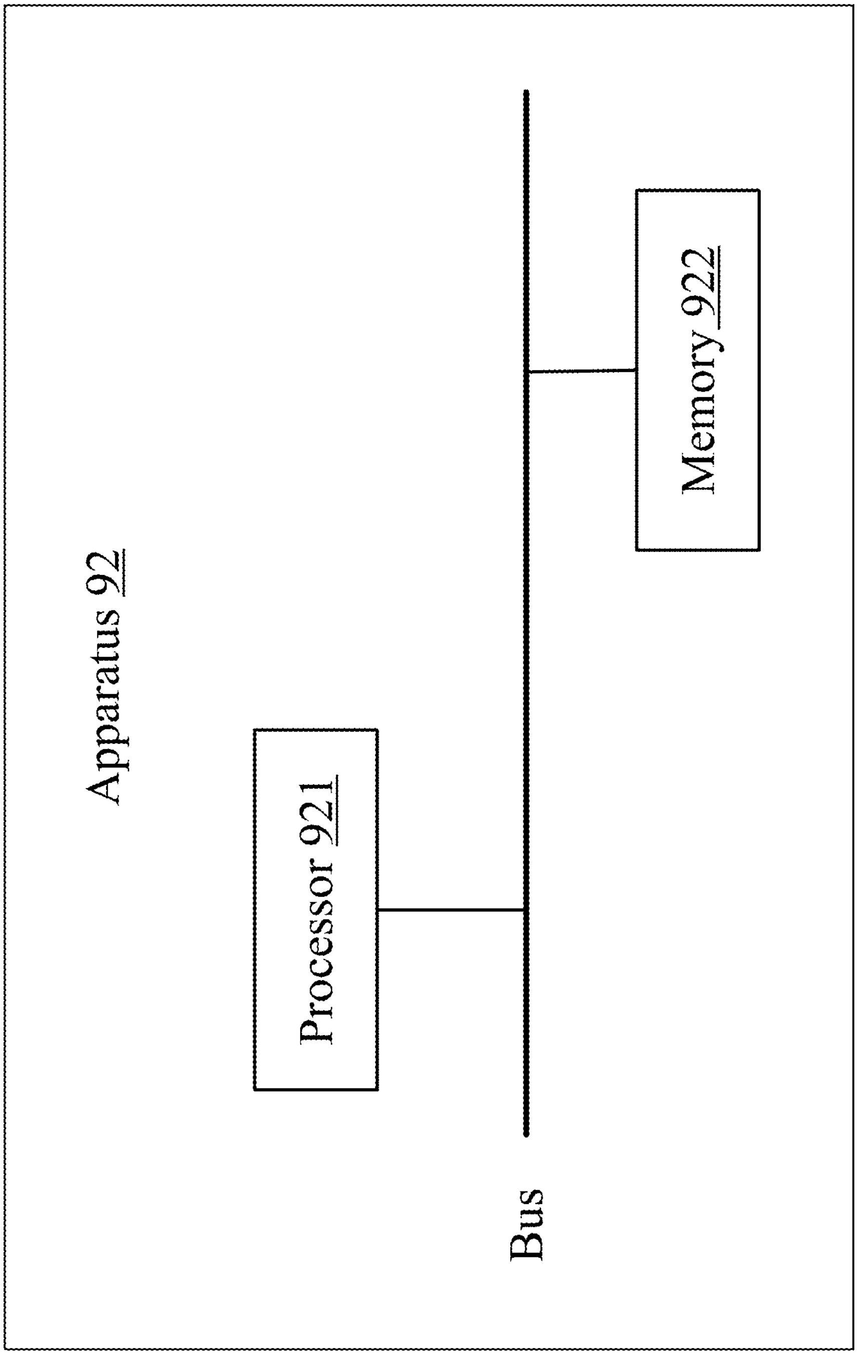
FIG. 30 is another schematic structural diagram of a time-of-flight measurement apparatus according to embodiments of this application.

The apparatus 82 shown in FIG. 29 can implement the time-of-flight measurement method in the embodiment shown in FIG. 25. The apparatus 82 includes an obtaining unit 821, a generating unit 822, an acquiring unit 823, a first determining unit 824, and a second determining unit 825.

The obtaining unit 821 is configured to obtain N timestamp sets, where N is an integer greater than 1, each timestamp set includes multiple timestamps, and integration periods of the timestamp sets are equal.

The generating unit 822 is configured to obtain a histogram based on the N timestamp sets, where an abscissa of the histogram includes multiple timestamps, and an ordinate of the histogram includes counts corresponding to the timestamps.

The acquiring unit 823 is configured to obtain the multiple total numbers of timestamps based on a preset time window and the histogram.

The first determining unit 824 is configured to use a position with the maximum total number of timestamps as a target position.

The second determining unit 825 is configured to determine a time of flight based on the target position.

In one or more embodiments, the acquiring unit 823 includes:

- a first setting subunit, configured to set multiple consecutive time windows of the same width from a start moment to an end moment in the histogram based on the preset time window; and
- a second setting subunit, configured to sum timestamp counts of all the timestamps covered by each time window to obtain the multiple total numbers of timestamps, where
- the first determining unit 824 is specifically configured to use a time window position with the maximum total number of timestamps as a target position.

In one or more embodiments, the acquiring unit 823 includes:

- a third setting subunit, configured to control the time window to slide between the start moment and the end moment in the histogram with a preset sliding step; and
- a fourth setting subunit, configured to sum counts of all the timestamps covered by the time window at each sliding position to obtain the multiple total numbers of timestamps, where
- the first determining unit 824 is specifically configured to use a sliding position with the maximum total number of timestamps as a target position.

In one or more embodiments, the second determining unit 825 includes:

- a first obtaining subunit, configured to obtain a count of each timestamp covered by the time window at the target position;
- a first peak timestamp determining subunit, configured to use a timestamp with the maximum count as a peak timestamp; and
- a first calculating subunit, configured to calculate the time of flight based on the peak timestamp.

In one or more embodiments, the second determining unit 825 includes:

- a second obtaining subunit, configured to obtain a count of each timestamp covered by the time window at the target position;
- an ascending-order sorting subunit, configured to sort the timestamps in ascending order based on the count;
- a first acquiring subunit, configured to average following M timestamps to obtain a peak timestamp, where M is an integer greater than 1, and M<N;
- a second peak timestamp determining subunit, configured to use the peak timestamp as a signal receiving moment; and
- a second calculating subunit, configured to calculate the time of flight based on an emission moment of a pulse signal and the receiving moment of the echo signal.

In one or more embodiments, the second determining unit 825 includes:

- a third obtaining subunit, configured to obtain a count of each timestamp covered by the time window at the target position;
- a descending-order sorting subunit, configured to sort the timestamps in descending order based on the count;
- a second acquiring subunit, configured to average previous M timestamps to obtain a peak timestamp, where M is an integer greater than 1, and M<N;
- a third peak timestamp determining subunit, configured to use the peak timestamp as a signal receiving moment; and
- a third calculating subunit, configured to calculate the time of flight based on an emission moment of a pulse signal and the receiving moment of the echo signal.

In one or more embodiments, the generating unit 822 includes:

- a selecting subunit, configured to select K2 timestamp sets from the N timestamp sets, where K2<N, and K2 is an integer greater than 2; and
- an accumulating unit, configured to accumulate the selected K2 timestamp sets to obtain a histogram.

In one or more embodiments, the selecting subunit is specifically configured to:

- select K2 timestamp sets from the N timestamp sets randomly;
- select K2 timestamp sets with the minimum number of timestamps from the N timestamp sets;
- select K2 timestamp sets with odd sequence numbers from the N timestamp sets; or
- select K2 timestamp sets with even sequence numbers from the N timestamp sets.

In one or more embodiments, the generating unit 822 includes:

- a smoothing subunit, configured to smooth the N timestamp sets to obtain N processed timestamp sets; and
- a histogram acquiring unit, configured to accumulate the N processed timestamp sets to obtain a final histogram.

In one or more embodiments, length of the time window is greater than or equal to an integer multiple of minimum time resolution of a TDC.

In one or more embodiments, length of the time window is equal to width of laser pulse.

These embodiments of this application and the method embodiments in FIG. 1A to FIG. 1D and FIG. 25 to FIG. 28 are based on the same concept, and also have the same technical effects. For a specific process, refer to the description of the method embodiments in FIG. 1A to FIG. 1D and FIG. 25 to FIG. 28. Details are not described herein again.

The apparatus 82 may be a FPGA, a dedicated integrated chip, an SoC, a CPU, an NP, a digital signal processing circuit, an MCU, a PLD or other integrated chips that realize related functions.

The time-of-flight measurement method in some embodiments is described in detail above, and a time-of-flight measurement apparatus (referred to as an apparatus 92 below) according to some embodiments is provided below.

FIG. 29 is a schematic structural diagram of an apparatus according to embodiments of this application. The apparatus is referred to as an apparatus 92 below. The apparatus 92 can be integrated into the LiDAR in the foregoing embodiments or a supporting platform. As shown in FIG. 29, the apparatus includes a memory 922 and a processor 921.

The memory 922 may be an independent physical unit, and may be connected to the processor 921 through a bus. The memory 922 and the processor 921 can also be integrated together, or implemented through hardware or the like.

In some embodiments, the apparatus 92 may also include an emitter and a receiver, the emitter is configured to emit a laser signal, and the receiver is configured to receive the laser signal.

The memory 922 is configured to store a program for implementing the foregoing method embodiments or each module in the apparatus embodiments, and the processor 921 invokes the program to perform operations in the foregoing method embodiments, including:

obtaining N timestamp sets, where N is an integer greater than 1, each timestamp set includes multiple timestamps, and integration periods of the timestamp sets are equal;

obtaining a histogram based on the N timestamp sets, where an abscissa of the histogram includes multiple timestamps, and an ordinate of the histogram includes counts corresponding to the timestamps; and obtaining the multiple total numbers of timestamps based on a preset time window and the histogram;

using a position with the maximum total number of timestamps as a target position; and determining a time of flight based on the target position.

In one or more embodiments, when obtaining the multiple total numbers of timestamps based on a preset time window and the histogram, the processor 921 is configured to:

set multiple consecutive time windows of the same width from a start moment to an end moment in the histogram based on the preset time window; and sum timestamp counts of all the timestamps covered by each time window to obtain the multiple total numbers of timestamps.

Using a position with the maximum total number of timestamps as a target position includes: using a time window position with the maximum total number of timestamps as the target position.

In one or more embodiments, when obtaining the multiple total numbers of timestamps based on a preset time window and the histogram, the processor 921 is configured to:

control the time window to slide between the start moment and the end moment in the histogram with a preset sliding step; and sum counts of all the timestamps covered by the time window at each sliding position to obtain the multiple total numbers of timestamps.

Using a position with the maximum total number of timestamps as a target position includes: using a sliding position with the maximum total number of timestamps as the target position.

In one or more embodiments, when determining a time of flight based on the target position, the processor 921 is configured to:

obtain a count of each timestamp covered by the time window at the target position;

use a timestamp with the maximum count as a peak timestamp; and calculate the time of flight based on the peak timestamp.

In one or more embodiments, when determining a time of flight based on the target position, the processor 921 is configured to:

obtain a count of each timestamp covered by the time window at the target position;

sort the timestamps in ascending order based on the count;

average following M timestamps to obtain a peak timestamp, where M is an integer greater than 1, and M<N;

use the peak timestamp as a signal receiving moment; and calculate the time of flight based on an emission moment of a pulse signal and the receiving moment of the echo signal.

In one or more embodiments, when determining a time of flight based on the target position, the processor 921 is configured to:

obtain a count of each timestamp covered by the time window at the target position;

sort the timestamps in descending order based on the count;

average previous M timestamps to obtain a peak timestamp, where M is an integer greater than 1, and M<N;

use the peak timestamp as a signal receiving moment; and calculate the time of flight based on an emission moment of a pulse signal and the receiving moment of the echo signal.

In one or more embodiments, when obtaining a histogram based on the N timestamp sets, the processor 921 is configured to:

select K2 timestamp sets from the N timestamp sets, where K2<N and K2 is an integer greater than 2; and accumulate the selected K2 timestamp sets to obtain a histogram.

In one or more embodiments, when selecting K2 timestamp sets from the N timestamp sets, the processor 921 is configured to:

select K2 timestamp sets from the N timestamp sets randomly;

select K2 timestamp sets with the minimum number of timestamps from the N timestamp sets;

select K2 timestamp sets with odd sequence numbers from the N timestamp sets; or select K2 timestamp sets with even sequence numbers from the N timestamp sets.

In one or more embodiments, when obtaining a histogram based on the N timestamp sets, the processor 921 is configured to:

smooth the N timestamp sets to obtain N processed timestamp sets; and accumulate the N processed timestamp sets to obtain a final histogram.

In one or more embodiments, length of the time window is greater than or equal to an integer multiple of minimum time resolution of a TDC.

In one or more embodiments, length of the time window is equal to width of laser pulse.

These embodiments of this application and the embodiment of FIG. 25 are based on the same concept, and also have the same technical effects. For a specific process, refer to the description of the embodiment of FIG. 25. Details are not described herein again.

When a part or all of the time-of-flight measurement method in the foregoing embodiments is implemented through software, the apparatus may also only include a processor. The memory for storing the program is located outside the apparatus, and the processor is connected to the memory through a circuit or a wire, and is configured to read and execute the program stored in the memory.

The processor may be a CPU, an NP or a combination of the CPU and the NP.

The processor can further include a hardware chip. The forgoing hardware chip can be an ASIC, a PLD, or a combination thereof. The forgoing PLD may be a CPLD, a FPGA, a GAL or any combination thereof.

A memory can include a volatile memory, such as a RAM. The memory can also include a non-volatile memory, such as a flash memory, an HDD or an SSD. The memory can also include a combination of the above types of memories.

In the foregoing embodiments, a sending unit or the emitter performs a sending step in the foregoing method embodiments, a receiving unit or the receiver performs a receiving step in the foregoing method embodiments, and another step is performed by another unit or processor. The sending unit and the receiving unit can form a transceiver unit, and the receiver and the emitter can form a transceiver.

An embodiment of this application further provides a computer storage medium that stores a computer program, where the computer program is used to perform the time-of-flight measurement method provided in the foregoing embodiments.

An embodiment of this application further provides a computer program product including an instruction, and when executed on the computer, the instruction enables the computer to perform the time-of-flight measurement method provided in the foregoing embodiments.

Embodiment 5

Referring to FIG. 1A, FIG. 1A is a diagram of an architecture of a time-of-flight measurement apparatus according to embodiments of this application. In some embodiments, the measurement system includes an emitter (not shown in the figure) and a detector. The emitter is configured to emit a laser pulse. The detector may include a pixel unit, a TDC, and a RAM. The pixel unit may include one or more SPADs.

A basic DTOF measurement process is as follows: The DTOF emits N pulse signals and receive N echo signals within a single-frame measurement time, and then a histogram is generated for statistics based on a record of the time of flight of the pulse signals, and the time of flight occurring at the highest frequency is used to calculate a distance between LiDAR and a target object.

Specifically, the emitter emits a pulse signal to the target object, the pulse signal reaches the target object and is reflected, a pixel unit or a pixel array receives an echo signal reflected by the target object, and converts the echo signal into an electrical signal, a TDC records a generating time (or referred to as a timestamp) of the electrical signal, the generating time is used as an arrival time of the echo signal, a RAM stores the timestamp of the echo signal, a time of flight (TOF) can be obtained based on an emission time of the pulse signal and the arrival time of the echo signal, and therefore, a distance between the emitter and the target object can be calculated based on the constant speed of light and the time of flight.

However, in an actual measurement process, due to high sensitivity of the detector, signals received by the detector further include a noise signal in addition to the echo signal. A source of the noise signal includes a component inside the detector or incident ambient light, but the detector cannot effectively identify the noise signal or the echo signal in the received signals. To reduce impact of the noise signal on a DTOF measurement result, TCSPC in related technologies is used to measure the time of flight. A main principle is that the emitter emits multiple pulse signals in a time frame; and because arrival times of the echo signals received by the detector are coherent or consistent, the arrival time of the noise signal is random, and after multiple integration periods, the echo signals can outstrip the noise signal.

For example, referring to FIG. 1B, the time frame consists of N integration periods, N is an integer greater than 1, the echo signal received by the detector in each integration period is denoted by a rectangle filled with diagonal lines, and the received noise signal is denoted by a gray colored rectangle. The emitter emits laser pulse signals at start times of a first integration period to an $N^{th}$ integration period. It can be learned from the figure that the detector receives multiple noise signals in addition to the echo signal in each integration period, a position of the echo signal basically remains unchanged, and a position of each noise signal is relatively random. Specifically, the timestamp information on the horizontal axis of FIG. 1B indicates a moment of receiving a signal by the TDC, and the time of flight (TOF) can be calculated based on the emission time of the pulse signal and an arrival time generated through the echo signal. Further, an ordinate in FIG. 1B corresponds to a count (cumulative number) of noise signals or echo signals received at each timestamp. It can be understood that the timestamp corresponding to the maximum count in the histogram of this application is the time of flight.

It can be learned that, in the current time-of-flight measurement method based on the DTOF, to detect a time of flight, it is critical to identify a peak position of counts in the histogram and further identify the time of flight. As shown in FIG. 1C below, when the ambient light is weak and there is a small distance between the emitter and the target, the SBNR is large, and a peak value of the histogram corresponding to the echo signal is easy to obtain after multiple integration periods. However, when the ambient light has strong light intensity or there is a large distance between the emitter and the target object, the number of echo signals received by the detector decreases as the distance increases, received ambient photons remain unchanged as the distance changes, and the SBNR is reduced. As shown in FIG. 1D below, due to a random effect of the ambient light, some peak values of the ambient light on the histogram may fluctuate to be greater than a corresponding peak value of the echo signal, and as a result, a rear-end circuit incorrectly recognizes the peak value, thereby causing a detection error. In addition, the stronger the ambient light and the larger the distance between the emitter and the detected target, the greater the probability that the peak value of the noise signal covers the peak value of the echo signal and the lower the detection accuracy.

Figure 31:
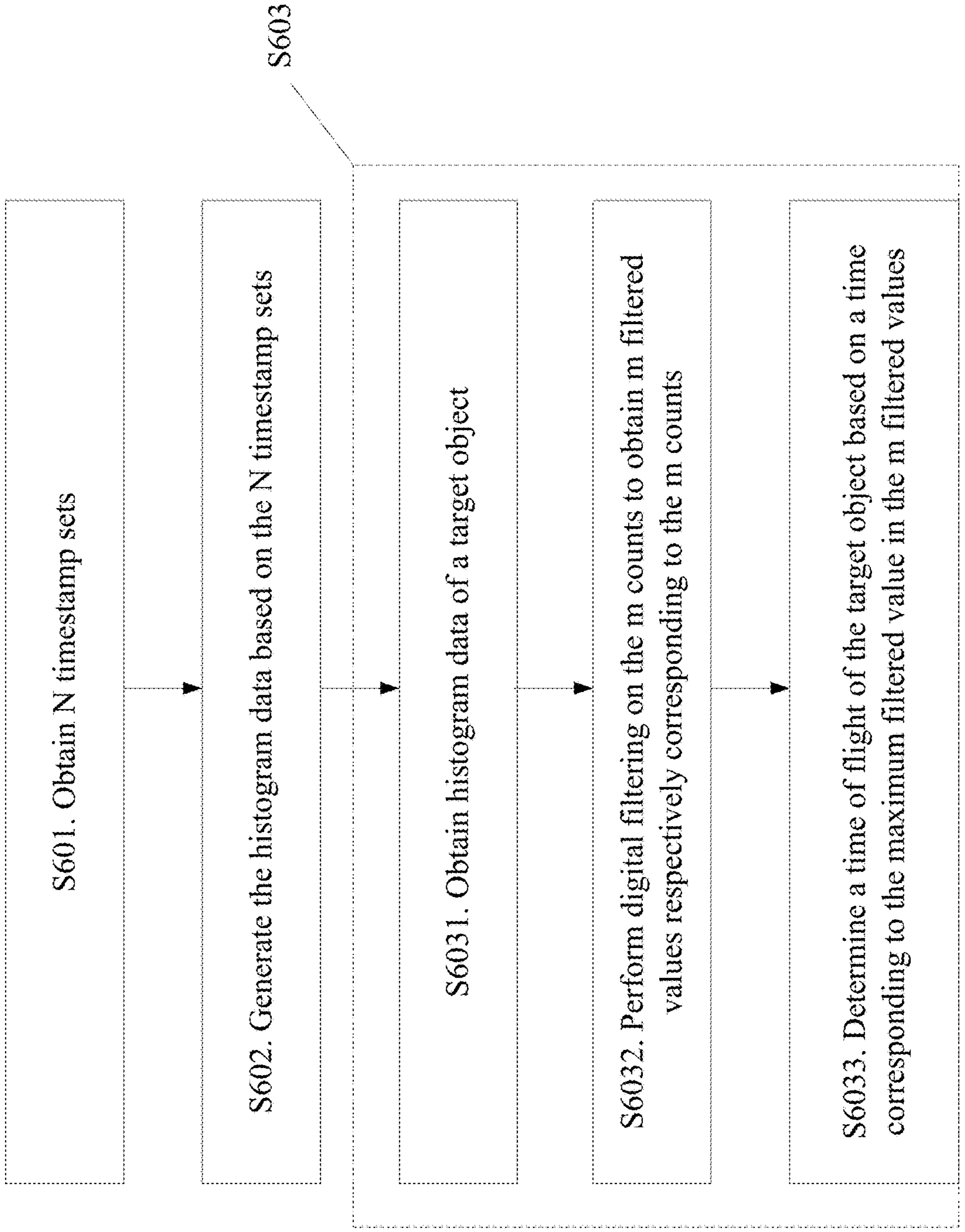
FIG. 31 is a schematic flowchart of a time-of-flight measurement method according to embodiments of this application.

FIG. 31 is a schematic flowchart of a time-of-flight measurement method according to embodiments of this application. The method includes, but is not limited to, the following steps.

S601. Obtain N timestamp sets.

Herein, 1 timestamp set is used to represent a photon event corresponding to 1 integration period, and may include a noise event and an echo signal event. The timestamp sets are corresponding to the same integration period, and the TDC records the receiving time of the echo photons (pulse signal reflected by the target object), and stores recorded timestamps of an echo signal in each integration period into a memory. Timestamps, recorded by the TDC, of multiple echo signals in one integration period form a timestamp set. For a specific process of recording the timestamp of the echo signal in the integration period, refer to FIG. 1A and FIG. 1B. Details are not described herein again. The measurement apparatus in this application obtains N timestamp sets recorded by the TDC within N integration periods, each timestamp set includes at least one timestamp, and timestamp sets may include the same number of timestamps or different numbers of timestamps.

For example, when N=4, a timestamp set corresponding to a first integration period includes 2 timestamps: $t_{11}$ and $t_{12}$, a timestamp set corresponding to a second integration period includes 4 timestamps: $t_{21}$, $t_{22}$, $t_{23}$, and $t_{24}$, a timestamp set corresponding to a third integration period includes 4 timestamps: $t_{31}$, $t_{32}$, $t_{33}$, and $t_{34}$, and a timestamp set corresponding to a fourth integration period includes 7 timestamps: $t_{41}$, $t_{42}$, $t_{43}$, $t_{44}$, $t_{45}$, $t_{46}$, and $t_{47}$.

It can be understood that a time interval between the two adjacent timestamps in the same timestamp set is greater than or equal to the minimum time resolution of the TDC, which depends on a hardware capacity of the TDC.

S602. Generate the histogram data based on the N timestamp sets.

The histogram may include multiple timestamps and the count of the timestamps, and the count represents the counted number of timestamps. For example, referring to the histogram shown in FIG. 36B, the histogram may include 16 timestamps: $t_1$ to $t_{16}$, and the timestamps correspond to their respective counts.

In a possible embodiment, obtaining a histogram based on the N timestamp sets may include the following manner:

Possibly, because the N integration periods in some embodiments are one detection period, the histogram can be obtained by accumulating the N timestamp sets, so that a histogram of a complete detection period of one frame can be obtained.

Possibly, in some embodiments, K3 timestamp sets can be further selected from the N timestamp sets, where K3<N and K3 is an integer greater than 2; and the selected K3 timestamp sets are further accumulated to obtain a histogram.

Specifically, in some embodiments, K3 timestamp sets are selected from the N timestamp sets, a value of K3 is less than N, and therefore, it is unnecessary to process all the timestamp sets, which can reduce accumulated data volume, thereby reducing duration required for operation.

It can be understood that, in some embodiments, the N integration periods have the same time length. In addition, when the K3 timestamp sets are selected, integration periods of the timestamp sets need to be aligned, that is, start moments of the integration periods are aligned, end moments of the integration periods are aligned, and then the K3 timestamp sets are accumulated. For a specific accumulation process, refer to description of FIG. 1B. Details are not described herein again.

Further, in an embodiment of this application, a method of selecting K3 timestamp sets from the N timestamp sets includes:

Method 1: Selecting K3 Timestamp Sets from the N Timestamp Sets Randomly.

Specifically, for a process of selecting K3 timestamp sets, the measurement apparatus obtains a current time value as an initial input parameter, the current measurement apparatus may alternatively obtain an initial input parameter of another type, for example, a variable such as latitude and longitude coordinates, then a hash operation is performed on the current time value to obtain a hash value, and then the hash value is used to perform modulo operation on the number N to obtain a remainder i. A value range of the remainder i is 0 to N−1, the remainder i is used as a sequence number of a timestamp set, the timestamp set corresponding to the remainder i is used as a reference timestamp set, and the reference timestamp set and previous K3−1 timestamp sets of the reference timestamp set is used as currently selected K3 timestamp sets. If the number of timestamp sets before the reference timestamp set is less than K3−1, other timestamp sets are selected from the rear of the N timestamp sets. Alternatively, the reference timestamp set and following K3−1 timestamp sets of the reference timestamp set is used as currently selected K3 timestamp sets. If the number of timestamp sets after the reference timestamp set is less than K3−1, other timestamp sets are selected from the head of the N timestamp sets.

Possibly, in a process of randomly selecting K3 timestamp sets, a currently obtained time value is Nov. 7, 2020, 13:39:00, and a hash operation is performed on the current time value to obtain a hash value of 65538. Assuming that N=10 and K3=4, sequence numbers of a timestamp set 1 to a timestamp set 10 are 0 to 9 respectively. A modulo operation is performed on the calculated hash value of 65538 against 10 to obtain a remainder of 8, that is, a sequence number of the reference timestamp set is 8, and the timestamp set with the sequence number of 8 and the 3 timestamp sets with sequence numbers of 5 to 7 respectively, namely, the timestamp set 6, the timestamp set 7, the timestamp set 8, and the timestamp set 9 are used as 4 currently selected timestamp sets.

Possibly, in a current random selection process, a currently obtained time value is Nov. 7, 2020, 13:44:01, and a hash operation is performed on the current time value to obtain 62539. Assuming that N=10 and K3=4, sequence numbers of timestamp sets 1 to 10 are 0 to 9 respectively. A modulo operation is performed on the hash value of 62539 against 10 to obtain a remainder of 9, that is, there are not 3 timestamp sets after a timestamp set with the sequence number of 9, and 3 other timestamp sets are selected from the head, that is, the timestamp set 10, the timestamp set 1, the timestamp set 2, and the timestamp set 3 are used as 4 currently selected timestamp sets.

It should be noted that the foregoing embodiments of randomly selecting K3 timestamp sets from N timestamp sets is only used as an example for description, and any method can also be used to randomly select K3 timestamp sets. For example, a numerical probability algorithm, Monte Carlow algorithm, Las Vegas algorithm, or Sherwood algorithm is used to randomly select a specified number of timestamp sets. This is not limited in these embodiments of this application.

Method 2: Selecting K3 Timestamp Sets with the Minimum Number of Timestamps from the N Timestamp Sets.

It can be understood that because a unique number of pulse signals are emitted in each integration period, when a timestamp set with a small number of timestamps in the integration period is selected, fewer timestamps of the noise signal are correspondingly included. For example, N=10, K3=4, the 10 timestamp sets are a timestamp set 1 to a timestamp set 10 respectively, 100 timestamps are included in the timestamp set 1, 122 timestamps are included in the timestamp set 2, 123 timestamps are included in the timestamp set 3, 102 timestamps are included in the timestamp set 4, 98 timestamps are included in the timestamp set 5, 90 timestamps are included in the timestamp set 6, 80 timestamps are included in the timestamp set 7, 85 timestamps are included in the timestamp set 8, 89 timestamps are included in the timestamp set 9, and 84 timestamps are included in the timestamp set 10. 4 timestamp sets of the timestamp set 7, the timestamp set 8, the timestamp set 9, and the timestamp set 10 with the minimum number of timestamps are selected from the 10 timestamp sets.

Method 3: Selecting K3 Timestamps with Odd Sequence Numbers from the N Timestamp Sets.

The N timestamp sets are numbered from 1, sequence numbers of the N timestamp sets are 1, 2, 3, . . . , N, and odd numbers are 1, 3, 5, 7, . . . .

For example, N=10, K3=4, the 10 timestamp sets are a timestamp set 1 to a timestamp set 10 respectively, and 4 timestamp sets of the timestamp set 1, the timestamp set 3, the timestamp set 5, and the timestamp set 7 with odd sequence numbers are selected from the 10 timestamp sets.

Method 4: Selecting K3 Timestamp Sets with Even Sequence Numbers from the N Timestamp Sets.

The N timestamp sets are numbered from 1, sequence numbers of the N timestamp sets are 1, 2, 3, . . . , N, and even numbers are 2, 4, 6, 8, . . . .

For example, N=10, K3=4, the 10 timestamp sets are a timestamp set 1 to a timestamp set 10 respectively, and 4 timestamp sets of the timestamp set 2, the timestamp set 4, the timestamp set 6, and the timestamp set 8 with even sequence numbers are selected from the 10 timestamp sets.

In another possible embodiment, obtaining a histogram based on the N timestamp sets may include:

smoothing the N timestamp sets respectively to obtain N processed timestamp sets; and accumulating the N processed timestamp sets to obtain a final histogram.

Integration periods of the N timestamp sets are aligned, that is, start moments of the integration periods are aligned, end moments of the integration periods are aligned, and then the N timestamp sets are accumulated, to obtain an intermediate histogram. For a specific accumulation process, refer to description of FIG. 1B. Details are not described herein again. Then the intermediate histogram is smoothed to obtain a final histogram.

Figure 32:
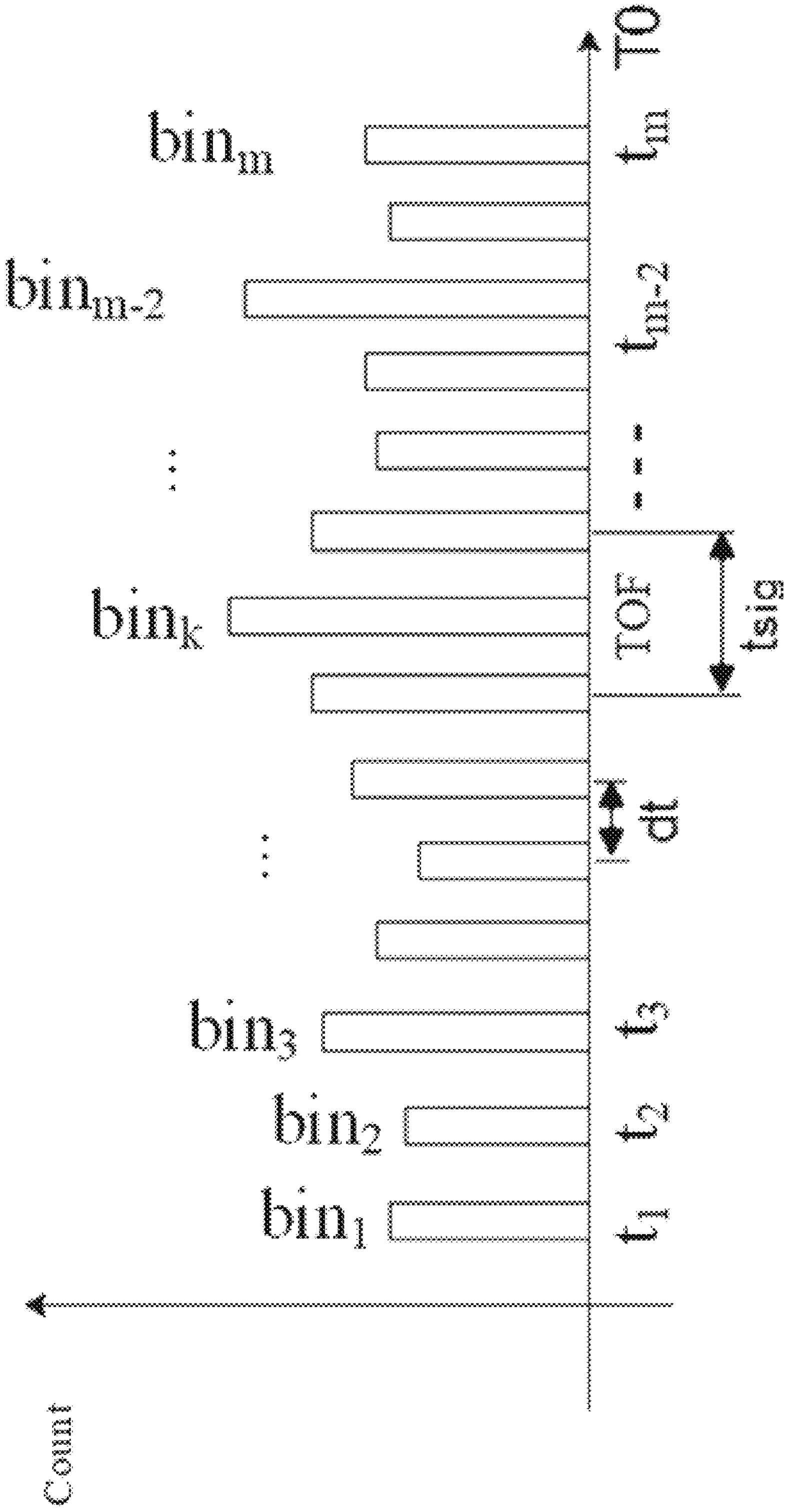
FIG. 32 is a schematic diagram of a histogram before smoothing within a group according to embodiments of this application.
Figure 33:
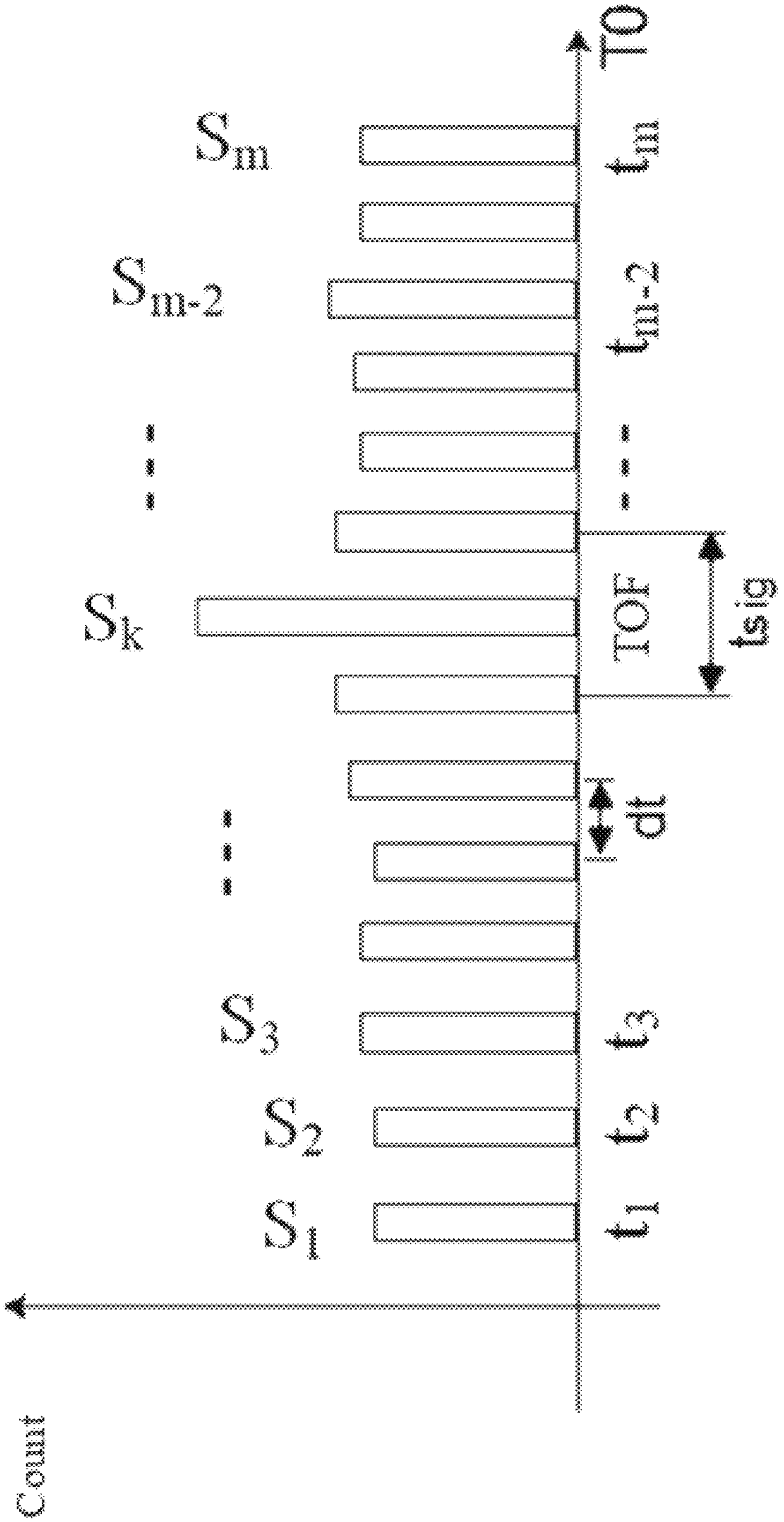
FIG. 33 is a stereogram of a histogram after smoothing according to embodiments of this application.

FIG. 32 shows a histogram obtained after accumulation of N timestamp sets when data in the N timestamp sets is not smoothed according to embodiments of this application. The histogram includes m timestamps and a count corresponding to each timestamp, wherein m is an integer greater than 2, an abscissa in the histogram represents a time, an ordinate represents the count, m counts are $bin_1$, $bin_2$, . . . , $bin_k$, . . . , $bin_m$, and timestamps corresponding to the m counts are $t_1$, $t_2$, . . . , $t_m$, respectively. A time interval between two adjacent counts in the histogram is greater than the minimum time resolution of the TDC. FIG. 33 shows m filtered values obtained after accumulation of histograms of N timestamp sets processed after data in the N timestamp sets is respectively smoothed according to embodiments of this application.

Possibly, as shown in FIG. 33, in some embodiments, a digital filter may be used for smoothing. When the digital filter is an FIR filter, an order of the FIR filter is n−1. Before smoothing, m counts are $bin_1$, $bin_2$, . . . , $bin_m$, respectively. After smoothing, the m counts are $S_{21}$, $S_{22}$, . . . , $S_{2m}$, respectively.

It can be understood that $S_{21}$ is data obtained by accumulating counts at a moment t1 in the N timestamp sets after the data in the N timestamp sets is respectively smoothed, . . . , and $S_{2m}$ is data obtained by accumulating counts at a moment $t_m$ in the N timestamp sets after the data in the N timestamp sets is respectively smoothed. The digital filter respectively performs digital filtering on m counts in N timestamp sets based on an equivalent sampling clock period, performs digital filtering once per clock period, and completes digital filtering of the m counts in the m clock periods. Therefore, in some embodiments, the timestamp of the noise signal can be suppressed through smoothing, so that the timestamp of the echo signal can be rapidly determined.

It can be understood that smoothing may include but not limited to FIR digital filtering, FIIR digital filtering, interpolation processing, and the like.

Figure 34:
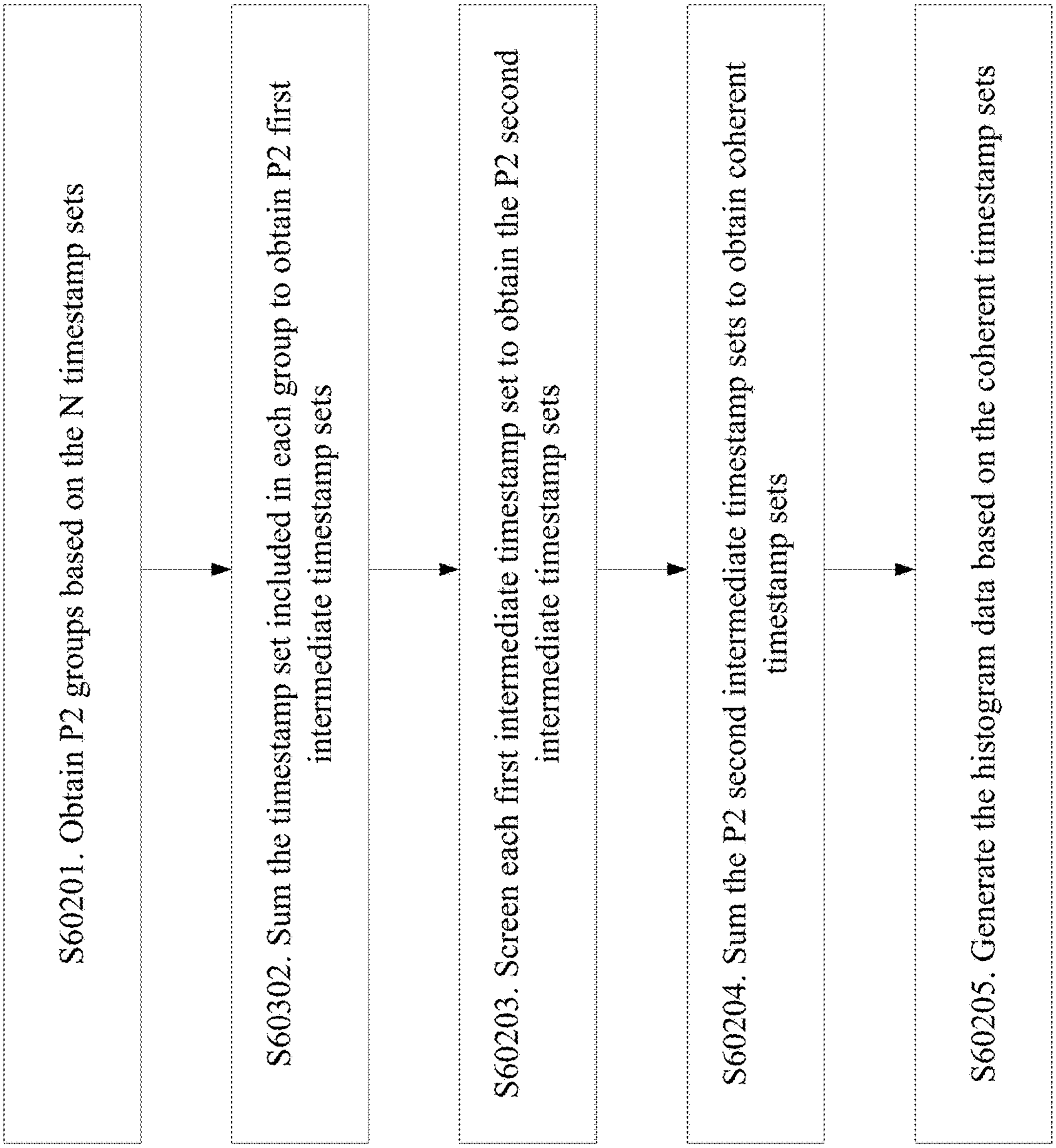
FIG. 34 is a schematic flowchart of step S602 according to embodiments of this application.

As shown in FIG. 34, in another possible embodiment, the following method may be used for generating histogram data based on the N timestamp sets. The method includes, but is not limited to, the following steps.

S60201. Obtain P2 groups based on the N timestamp sets.

N integration periods can belong to the same frame, that is, the measurement apparatus measures the N integration periods by a time unit of a frame. The echo signals received in the N integration periods are accumulated as per timestamps, and finally, the time of flight of the target object is obtained, where N is an integer greater than 1. A signal detected by the detector in the integration period may be a noise signal, or may be an echo signal generated after the pulse signal emitted by the emitter is reflected by the target object. The noise signal may be generated in the external environment, inside the device, or in another manner. Timestamps corresponding to the noise signals are randomly distributed in the integration period, and the timestamp of the echo signal is related to a distance between the emitter and the target object. When the distance basically remains unchanged within N integration periods, the echo signals are concentrated at a specific position of the integration period.

It can be understood that, in some embodiments, there is only one echo signal in each integration period. The N timestamp sets are divided into P2 groups, where P2<N, P2 is an integer, and each group includes at least two timestamp sets. The groups may include the same number of timestamp sets or different numbers of timestamp sets, and at least two timestamp sets included in each group may be consistent or inconsistent. This is not limited in these embodiments of this application.

Possibly, N=10, P2=5, the groups include the same number of timestamp sets and timestamp sets included in each group are inconsistent, and therefore, the 10 timestamp sets are a timestamp set 1, a timestamp set 2, a timestamp set 3, . . . , a timestamp set 10 respectively. Each group includes 2 timestamp sets, a group 1 includes the timestamp set 1 and the timestamp set 2, a group 2 includes the timestamp set 3 and the timestamp set 4, a group 3 includes the timestamp set 5 and the timestamp set 6, a group 4 includes the timestamp set 7 and the timestamp set 8, and a group 5 includes the timestamp set 9 and the timestamp set 10.

Possibly, N=10, P2=4, the groups include the same number of timestamp sets and timestamp sets included in each group are consistent. The 10 timestamp sets are a timestamp set 1, a timestamp set 2, . . . , a timestamp set 10 respectively. Each group includes 4 timestamp sets, a group 1 includes the timestamp set 1, the timestamp set 2, the timestamp set 3, and the timestamp set 4, a group 2 includes the timestamp set 2, the timestamp set 3, the timestamp set 4, and the timestamp set 5, a group 3 includes the timestamp set 5, the timestamp set 6, the timestamp set 7, and the timestamp set 8, and a group 4 includes the timestamp set 7, the timestamp set 8, the timestamp set 9, and the timestamp set 10.

Possibly, N=10, P2=3, the groups include different numbers of timestamp sets and timestamp sets included in each group are inconsistent. The 10 timestamp sets are a timestamp set 1, a timestamp set 2, . . . , a timestamp set 10 respectively. A group 1 includes 2 timestamp sets: the timestamp set 1 and the timestamp set 2; a group 2 includes 3 timestamp sets: the timestamp set 3, the timestamp set 4, and the timestamp set 5; and a group 3 includes 5 timestamp sets: the timestamp set 6, the timestamp set 7, the timestamp set 8, the timestamp set 9, and the timestamp set 10.

Possibly, N=10, P2=3, the groups include different numbers of timestamp sets and timestamp sets included in each group are consistent. The 10 timestamp sets are a timestamp set 1, a timestamp set 2, . . . , a timestamp set 10 respectively. A group 1 includes 3 timestamp sets: the timestamp set 1, the timestamp set 5, and the timestamp set 6; a group 2 includes 4 timestamp sets: the timestamp set 1, the timestamp set 2, the timestamp set 3, and the timestamp set 4; and a group 3 includes 5 timestamp sets: the timestamp set 2, the timestamp set 7, the timestamp set 8, the timestamp set 9, and the timestamp set 10.

In a possible embodiment, obtaining P2 groups based on the N timestamp sets may include:

selecting K2 timestamp sets (K2<N) from N timestamp sets P2 times randomly, to obtain P2 groups, where each group includes K2 timestamp sets, and each group includes K2 different timestamp sets.

For each process of selecting K2 timestamp sets, the measurement apparatus obtains a current time value, then a hash operation is performed on the current time value to obtain a hash value, and then the hash value is used to perform modulo operation on the number N to obtain a remainder i. A value range of the remainder i is 0 to N−1, the remainder i is used as a sequence number of a timestamp set, the timestamp set corresponding to the remainder i is used as a reference timestamp set, and the reference timestamp set and previous K2−1 timestamp sets of the reference timestamp set is used as currently selected K2 timestamps. If the number of timestamp sets before the reference timestamp set is less than K2−1, other timestamp sets are selected from the rear of the N timestamp sets. Alternatively, the reference timestamp set and following K2−1 timestamp sets of the reference timestamp set is used as currently selected K2 timestamps. If the number of timestamp sets after the reference timestamp set is less than K2−1, other timestamp sets are selected from the head of the N timestamp sets.

Possibly, in a current random selection process, a currently obtained time value is Nov. 7, 2020, 13:39:00, and a hash operation is performed on the current time value to obtain a hash value of 65538. Assuming that N=10 and K2=4, sequence numbers of a timestamp set 1 to a timestamp set 10 are 0 to 9 respectively. A modulo operation is performed on the calculated hash value of 65538 against 10 to obtain a remainder of 8, that is, a sequence number of the reference timestamp set is 8, and the timestamp set with the sequence number of 8 and the 3 timestamp sets with sequence numbers of 5 to 7 respectively, namely, the timestamp set 6, the timestamp set 7, the timestamp set 8, and the timestamp set 9 are used as 4 currently selected timestamp sets.

Possibly, in a current random selection process, a currently obtained time value is Nov. 7, 2020, 13:44:01, and a hash operation is performed on the current time value to obtain 62539. Assuming that N=10 and K2=4, sequence numbers of timestamp sets 1 to 10 are 0 to 9 respectively. A modulo operation is performed on the hash value of 62539 against 10 to obtain a remainder of 9, that is, there are not 3 timestamp sets after a timestamp set with the sequence number of 9, and thus 3 other timestamp sets are selected from the head, that is, the timestamp set 10, the timestamp set 1, the timestamp set 2, and the timestamp set 3 are used as 4 currently selected timestamp sets.

It should be noted that the foregoing embodiments of randomly selecting K2 timestamp sets from N timestamp sets is only used as an example for description, and any method can also be used to randomly select K2 timestamp sets. For example, a numerical probability algorithm, Monte Carlow algorithm, Las Vegas algorithm, or Sherwood algorithm is used to randomly select a specified number of timestamp sets. This is not limited in these embodiments of this application.

In a possible embodiment, P2 groups are obtained based on the N timestamp sets by using the following rule.

The P2 groups are a group 1, a group 2, . . . , a group P2, and the N timestamp sets are a timestamp set 1, a timestamp set 2, . . . , a timestamp set N, where P2=N−K2+1; and the group 1 includes a timestamp set 1, a timestamp set 2, . . . , a timestamp set K2, the group 2 includes a timestamp set 2, a timestamp set 3, . . . , a timestamp set K2+1, . . . , and a group N−K2+1 includes a timestamp set N−K2+1, a timestamp set N−K2+2, . . . , a timestamp set N.

For example, N=10, K2=4, P2=10−4+1=7, and therefore, the 10 timestamp sets are a timestamp set 1, a timestamp set 2, . . . , a timestamp set 10 respectively. Each group includes 4 timestamp sets, a group 1 includes a timestamp set 1 to a timestamp set 4, a group 2 includes a timestamp set 2 to a timestamp set 5, a group 3 includes a timestamp set 3 to a timestamp set 6, a group 4 includes a timestamp set 4 to a timestamp set 7, a group 5 includes a timestamp set 5 to a timestamp set 8, a group 6 includes a timestamp set 6 to a timestamp set 9, and a group 7 includes a timestamp set 7 to a timestamp set 10.

It can be understood that, in the foregoing embodiments, an interval between sequence numbers of first timestamp sets of two adjacent groups is 1, and in this application, the interval can be set to a value greater than 1 as required. For example, a group 1 includes a timestamp set 1 to a timestamp set 4, and a group 2 includes a timestamp set 3 to a timestamp set 6, . . . .

In the foregoing embodiments of this application, selection of identical timestamp sets in specific groups when P2>N−K2+1 may be avoided. Therefore, in some embodiments, the N timestamp sets can be divided into P2 groups, and processing such as integration processing is further performed on each group of timestamp sets to implement a multi-pulse integration process of the echo signal, which not only increases reuse of effective timestamp data, but also can reduce repetitive work caused when the selected timestamp sets in the group are completely the same, thereby effectively improving efficiency of obtaining the time of flight.

In a possible design, numbers of timestamps in the groups are equal or close.

The number of timestamps refers to the total number of timestamps in one timestamp set. In the process of obtaining the P2 groups based on the N timestamp sets, the number of timestamps in each timestamp set is counted, and numbers of timestamps in the groups should be made equal or as close as possible. When the numbers of timestamps are close, this means that numbers of timestamps in any two groups are not greater than a specified number threshold. Based on the foregoing rule, the P2 groups can be obtained from the N timestamp sets, which can balance data volumes of the groups and facilitate application of a parallel calculation structure.

In a possible embodiment, before obtaining P2 groups based on the N timestamp sets, the method further includes:

counting the number of timestamps corresponding to each of the N timestamp sets respectively; and sorting the N timestamp sets in descending order or ascending order based on the number of timestamps.

It can be understood that the N timestamp sets are sorted in ascending or descending order, making it easy to rapidly form required timestamp sets when the P2 groups are generated based on the rule that the numbers of timestamps are equal or close.

S60202. Accumulate the timestamp set included in each group to obtain P2 first intermediate timestamp sets.

For each group, integration periods of timestamp sets in the group are equal, and before the timestamp sets in the group are accumulated, the integration periods corresponding to the timestamp sets are aligned, that is, the integration periods corresponding to the timestamp sets have coincided start moments and coincided end moments. Then, the timestamp sets in the groups are combined to obtain a first intermediate timestamp set. For example, a specific group includes a timestamp set 1 and a timestamp set 2, the timestamp set 1 includes timestamps t0 and t1, the timestamp set 2 includes timestamps t4 and t6, and then the two timestamp sets in the first group are accumulated to obtain corresponding first intermediate timestamp sets t0, t1, t4, and t6.

In a possible embodiment, accumulating the timestamp set included in each group to obtain P2 first intermediate timestamp sets may include:

starting P2 accumulation processing threads and invoking the P2 accumulation processing threads, to accumulate the timestamp sets included in each group in parallel to obtain the P2 first intermediate timestamp sets.

When the timestamp sets in P2 groups are accumulated, P2 accumulation threads can be simultaneously performed in parallel, to reduce a calculation time.

Figure 35:
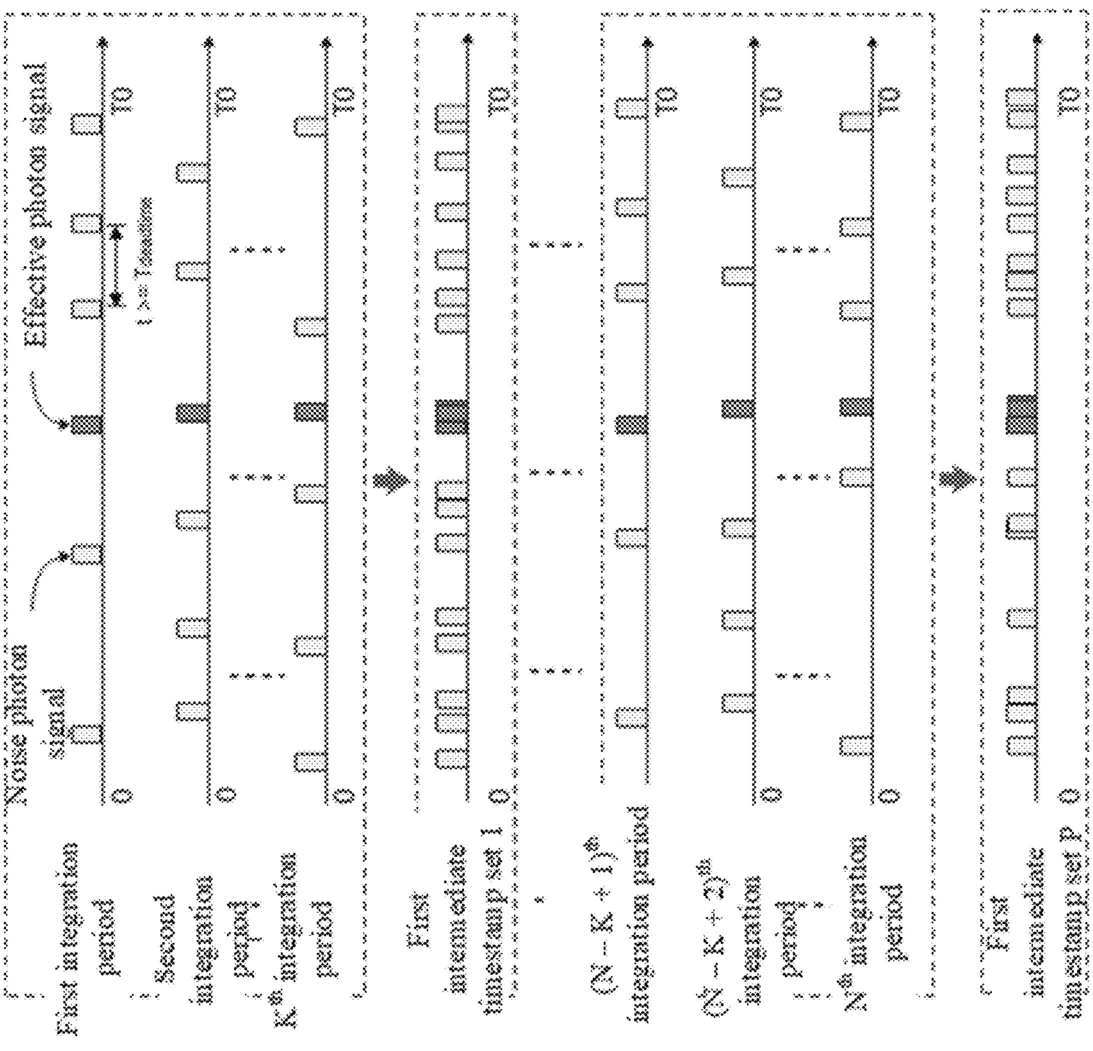
FIG. 35 is a schematic diagram of accumulating a timestamp set within a group according to embodiments of this application.

For example, as shown in FIG. 35, N timestamp sets are obtained, N integration periods are divided into P2 groups, each group includes K2 timestamp sets, each timestamp set corresponds to one integration period, the number P2 of groups satisfies that P2=N−K2+1, and the group 1 includes a timestamp set 1 (corresponding to a first integration period) to a timestamp set K2 (corresponding to a K2$^{th}$ integration period). A generation process of a first intermediate timestamp set 1 is as follows. A timestamp set (timestamp set 1) corresponding to the first integration period may include 6 timestamps, a time interval between two adjacent timestamps in any timestamp set is t, and specifically, width of the time interval t is an integral multiple of the time resolution of the TDC. A timestamp set (timestamp set 2) corresponding to the second integration period includes 6 timestamps, . . . , a timestamp set (timestamp set K2) corresponding to the K2$^{th}$ integration period includes 6 timestamps; start moments of the first integration period to the K2$^{th}$ integration period are 0, and end moments are T0. The first integration period to the K2$^{th}$ integration period are aligned, then the K2 timestamp sets in the group are accumulated to obtain the first intermediate timestamp set 1. By analogy, timestamp sets from that corresponding to an (N−K2+1)$^{th}$ integration period to that corresponding to an N$^{th}$ integration period are accumulated to obtain a first intermediate timestamp set P2.

S60203. Screen each first intermediate timestamp set to obtain the P2 second intermediate timestamp sets.

The screening process includes: moving, by a sliding window with preset width, on time length to implement screening. Specifically, from a start moment of the first intermediate timestamp set, the sliding window moves, and a step of each movement is the width of the sliding window; and then, the number of timestamps covered by each sliding window is counted, and if the number is less than the number threshold, a timestamp in a current sliding window is filtered out; or if the number is greater than or equal to the number threshold, the timestamp in the current sliding window is retained. In some embodiments, a number threshold corresponding to each group is related to the total number of timestamps in the timestamp set. For example, the total number of timestamps in the timestamp set in the group is equal to the number threshold, or the total number of timestamps in the timestamp set in the group minus 1 is equal to the number threshold. In addition, if total numbers of timestamps in timestamp sets in groups are equal, number thresholds of the groups are also equal. In some embodiments, the width of the sliding window is also related to the number of timestamp sets in the group, and the width of the sliding window can be an integer multiple of minimum time resolution of the TDC. For example, the width of the sliding window can be greater than or equal to K times the minimum time resolution of the TDC, where K is an integer greater than 1.

Figure 36:
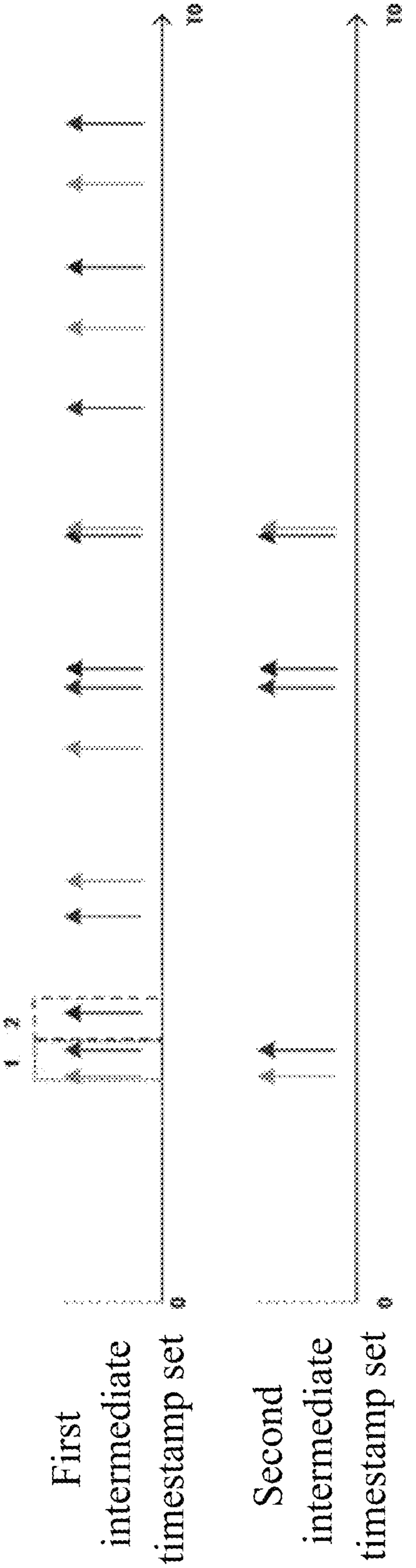
FIG. 36 is a schematic diagram of a principle of screening a first intermediate timestamp set according to embodiments of this application.

For example, referring to FIG. 36, the number threshold is 2, and the width of the sliding window is 4 times the minimum time resolution of the TDC. A first dashed box in FIG. 36 is a position of the sliding window at a current moment in an integration period of a first intermediate timestamp set, and can be denoted as a time window 1. The number of timestamps (corresponding to echo signals) in the time window 1 is 2, which satisfies the condition that the number of timestamps is greater than or equal to the number threshold of 2, and therefore, all the timestamps in the time window 1 are retained. A second dashed box in FIG. 36 is a position of a sliding window at the next moment, and can be denoted as a time window 2, the counted number of timestamps covered by the time window 2 is 1, which is less than the number threshold of 2, and therefore, all the timestamps within the time window 2 are filtered out. After the first intermediate timestamp set is screened through the sliding window, the second intermediate timestamp set at the bottom of FIG. 36 is obtained.

S60204. Accumulate the P2 second intermediate timestamp sets to obtain coherent timestamp sets.

P2 second intermediate timestamp sets are aligned and have the same time length, coherent timestamp sets are obtained after the P2 second intermediate timestamp sets are accumulated, and the coherent timestamp sets are a collection of all the timestamps in the P2 second intermediate timestamp sets.

Figure 37:
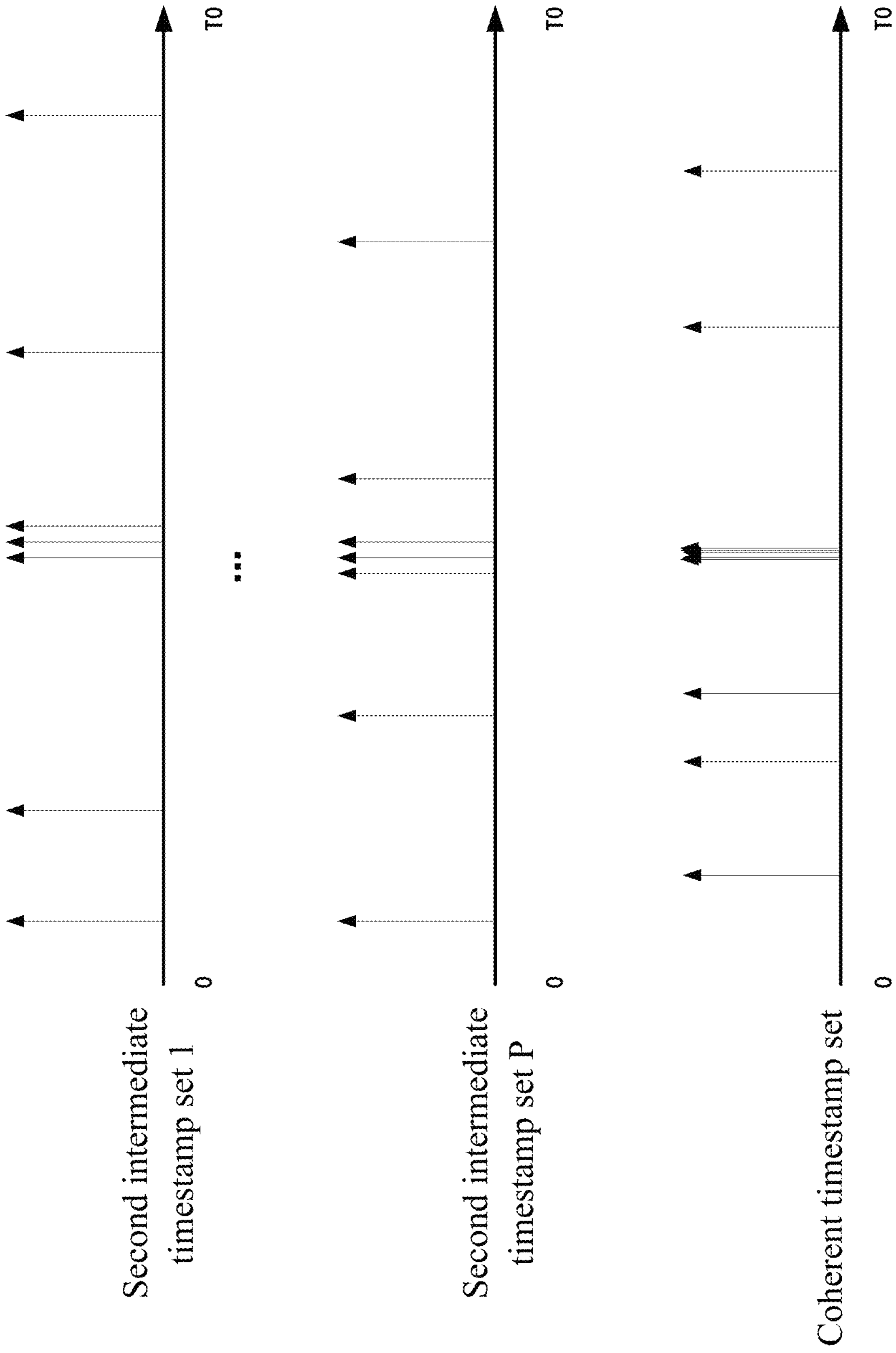
FIG. 37 is a schematic diagram of a principle of accumulating each second intermediate timestamp set according to embodiments of this application.

For example, referring to FIG. 37, the second intermediate timestamp set 1 to the second intermediate timestamp set P2 are accumulated. A specific accumulation process can be the same as the accumulation process in FIG. 35. For details, refer to description of FIG. 35. Details are not described herein again.

S60205. Generate the histogram data based on the coherent timestamp sets.

Counts of timestamps in the coherent timestamp sets are collected to generate histogram data. The histogram data includes two dimensions: the timestamps and the count of the timestamps (that is, the number of occurrences).

Figure 38:
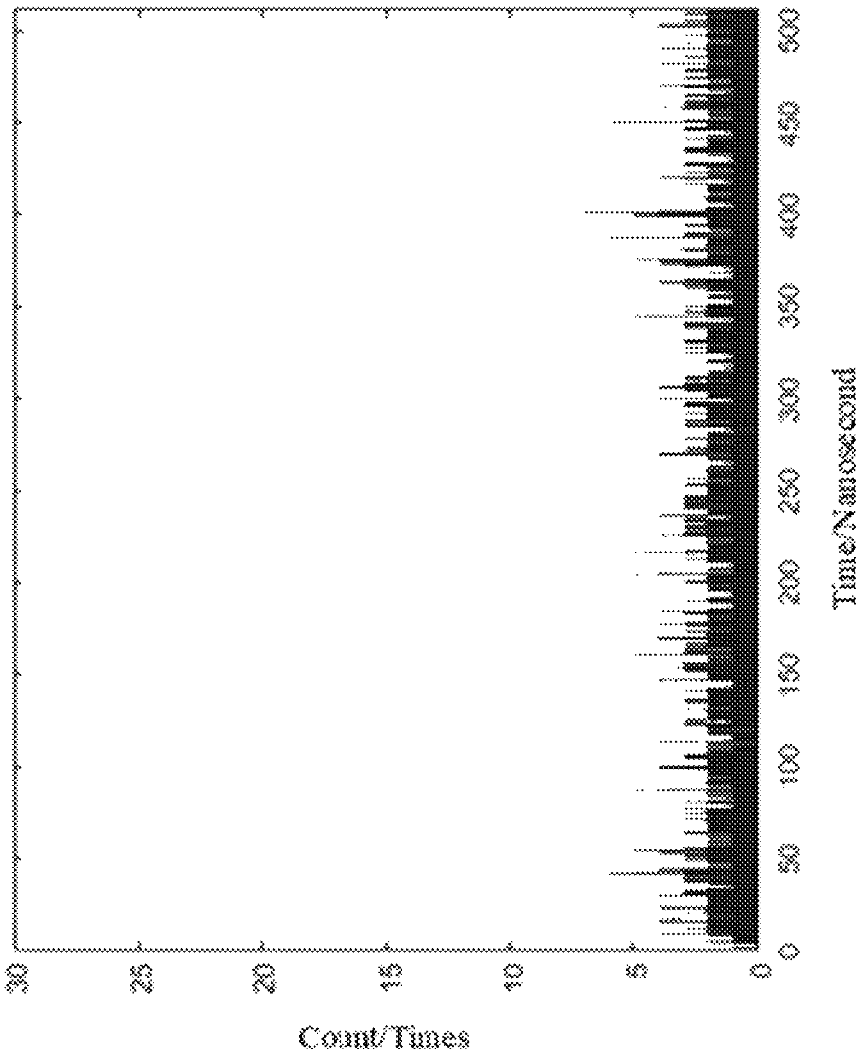
FIG. 38 shows histogram data before screening according to embodiments of this application.
Figure 39:
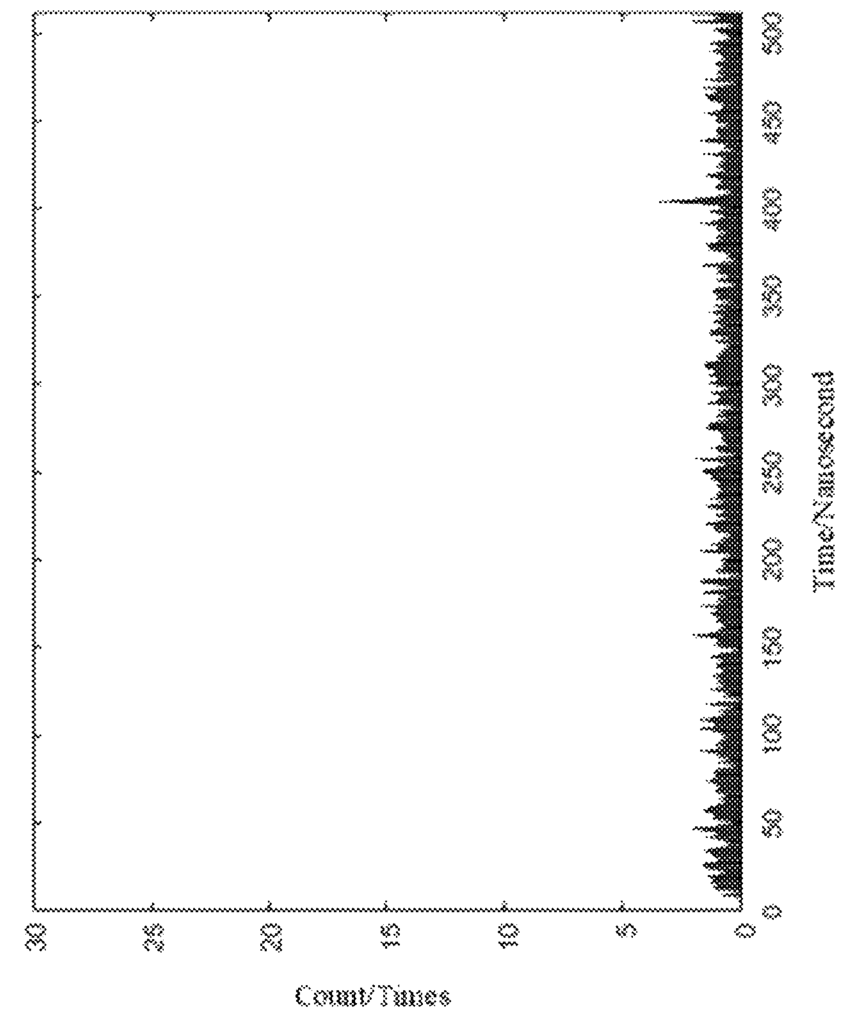
FIG. 39 shows histogram data after screening according to embodiments of this application.

For example, referring to histogram data shown in FIG. 38 and FIG. 39, FIG. 38 shows a histogram before coherent processing. A peak value in counts in the histogram is not sufficiently significant due to impact of the noise signal. FIG. 39 shows histogram data obtained after coherent processing based on multiple-pulse integration. It can be learned that a count other than the peak value in FIG. 39 is suppressed, the peak value is more significant, and time corresponding to the peak value is about 400 ns.

Figure 40:
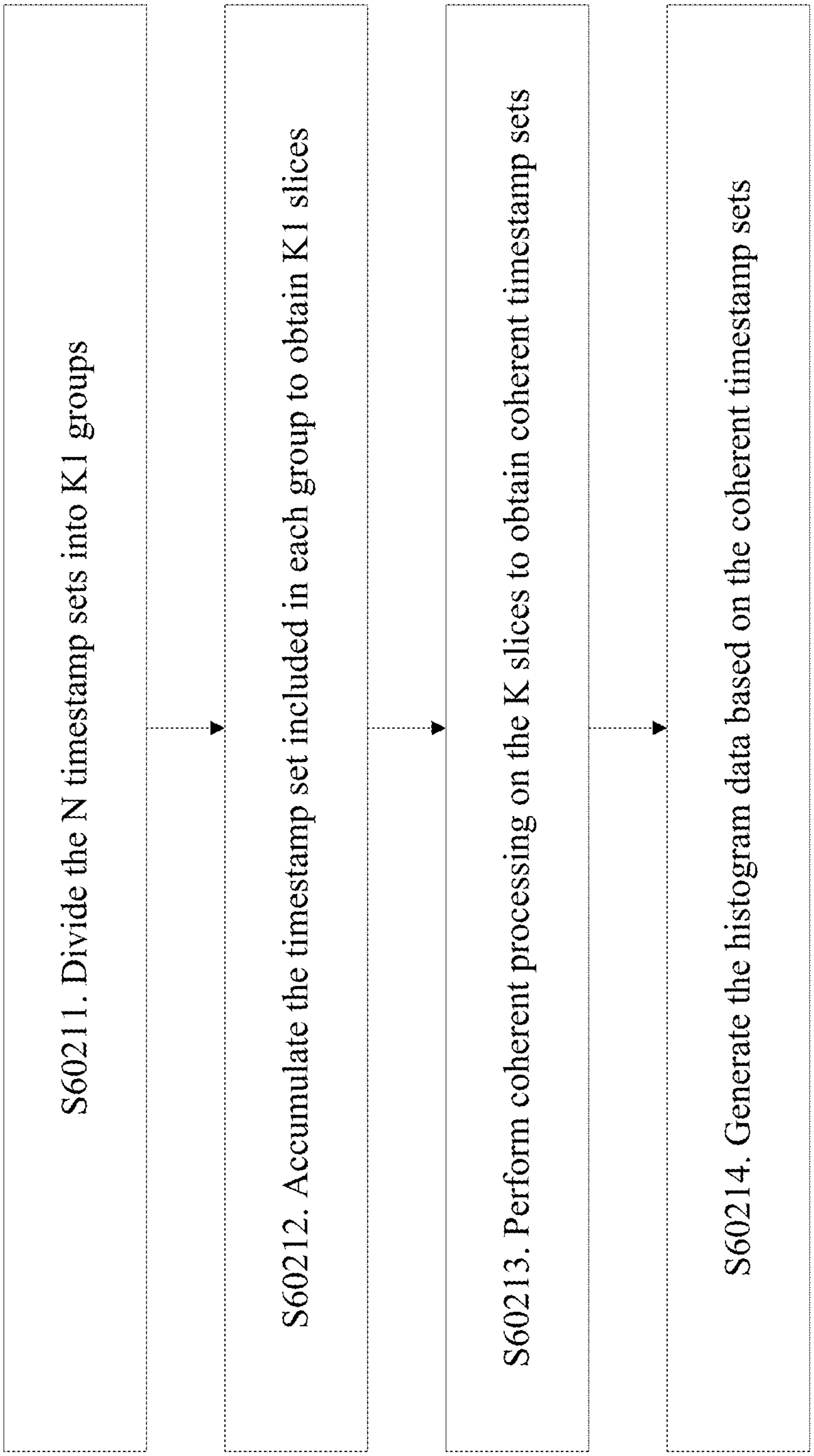
FIG. 40 is another schematic flowchart of step S602 according to embodiments of this application.

As shown in FIG. 40, in another possible embodiment, the following method may be used for generating histogram data based on the N timestamp sets. The method includes, but is not limited to, the following steps.

S60211. Divide the N timestamp sets into K1 groups.

Herein, the N integration periods can belong to the same frame, that is, the measurement apparatus measures the time of flight of the target object by a time unit of a frame, N is an integer greater than 1, and a signal detected by the detector during the integration period may be the noise signal or the echo signal. The noise signal may be generated in the external environment, inside the device, or in another manner. Timestamps corresponding to the noise signals are randomly distributed in the integration period, and the timestamp of the echo signal is related to a distance between the emitter and the target object. Distance measurement results within N integration periods are similar, and therefore, the echo signals are concentrated at a specific position of the integration period. At a start moment of each integration period, the emitter emits a pulse signal to the target object, so that there is only one echo signal in each integration period. In some embodiments, N timestamp sets are divided into K1 groups, each group includes one or more timestamp sets, and the groups may include the same number of timestamp sets or different numbers of timestamp sets.

For example, when N=10, 10 timestamp sets are a timestamp set 1, a timestamp set 2, a timestamp set 3, . . . , a timestamp set 10, and the 10 timestamp sets are divided into 4 groups. The first group includes 3 timestamp sets: the timestamp set 1 to the timestamp set 3; the second group includes 3 timestamp sets: the timestamp set 4 to the timestamp set 6; the third group includes 2 timestamp sets: the timestamp set 7 and the timestamp set 8; and the fourth group includes 2 timestamp sets: the timestamp set 9 and the timestamp set 10.

It can be understood that, when the groups include the same number of timestamp sets, each group includes M timestamp sets, and therefore, K1=N/M, that is, the N timestamp sets are divided into K1 groups.

Possibly, when each group includes more than 1 timestamp set, sequence numbers of multiple timestamp sets are not necessarily continuous.

S60212. Accumulate the timestamp set included in each group to obtain K1 slices.

For each group, integration periods of timestamp sets in the group are equal, and before the timestamp sets in the group are accumulated, the integration periods corresponding to the timestamp sets are aligned, that is, the integration periods corresponding to the timestamp sets have coincided start moments and coincided end moments. Then the timestamp sets in the group are combined to obtain a slice. For example, a specific group includes a timestamp set 1 and a timestamp set 2, the timestamp set 1 includes timestamps t0 and t1, the timestamp set 2 includes timestamp sets t3, t1, t4, and t6, and then the two timestamp sets in the first group are accumulated to obtain corresponding slices t0, t1, t1, t3, t4, and t6. It should be noted that when the timestamp sets in K2 groups are accumulated, K2 accumulation processes can be simultaneously performed in parallel, to reduce a calculation time.

Figure 41:
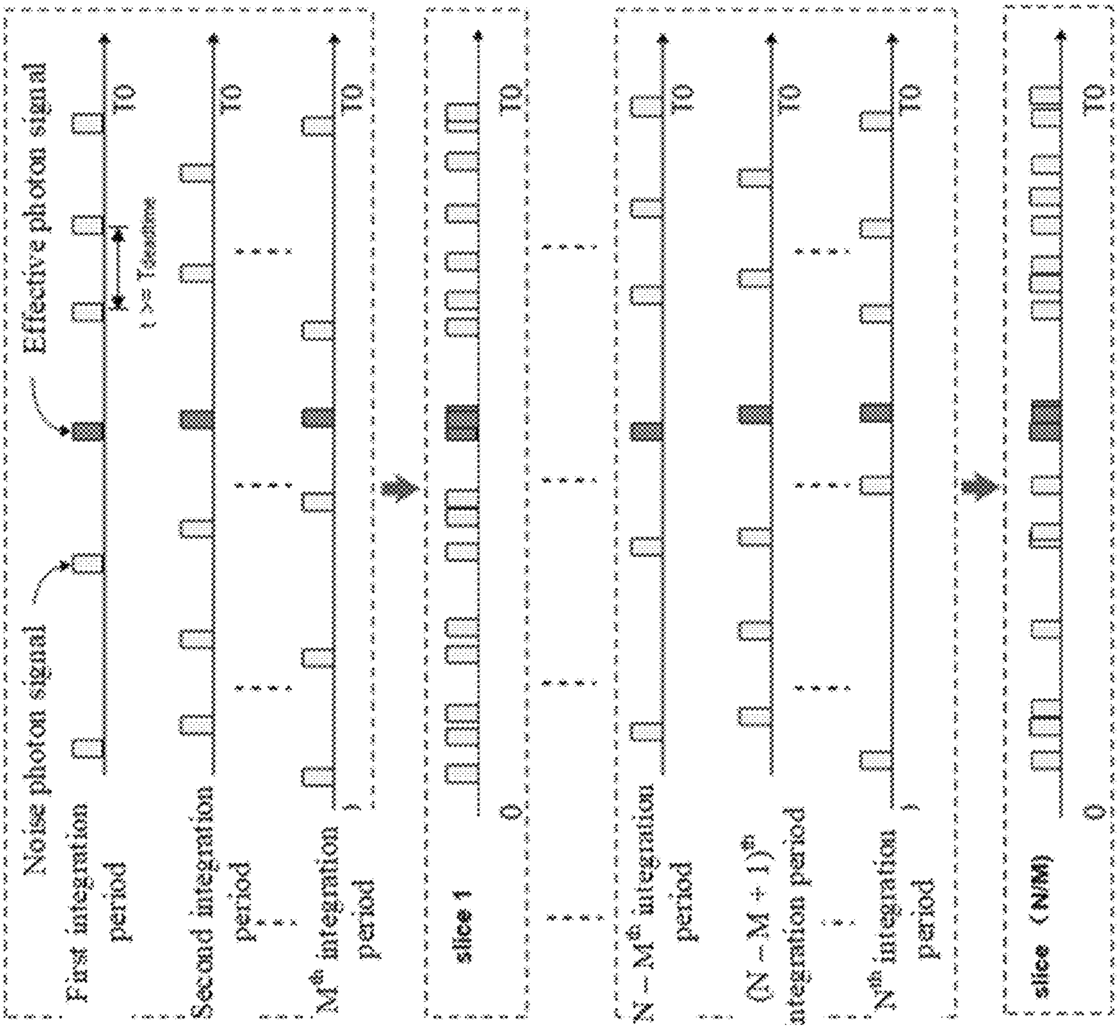
FIG. 41 is a schematic diagram of accumulating a timestamp set within a group according to embodiments of this application.

For example, referring to FIG. 41, N timestamp sets are obtained, N integration periods are divided into multiple groups, each group includes M integration periods, and therefore, the number of groups is N/M. A generation process of a slice 1 is as follows. A timestamp set corresponding to the first integration period includes 6 timestamps, and a time interval t between two adjacent timestamps in any timestamp set is at least a dead time ($T_{deadtime}$) of a SPAD, and the time interval t is generally much greater than the time resolution of the TDC. A timestamp set corresponding to the second integration period includes 6 timestamps, . . . , a timestamp set corresponding to the $M^{th}$ integration period includes 6 timestamps; start moments of the first integration period to the $M^{th}$ integration period are 0, and end moments are T0. The first integration period to the $M^{th}$ integration period are aligned, then the M timestamp sets in the group are accumulated to obtain the slice 1, and time length of the slice 1 is from 0 to T0. By analogy, a timestamp set corresponding to an $(N-M)^{th}$ integration period to a timestamp set corresponding to an $N^{th}$ integration period are accumulated to obtain a slice (N/M) (slice (N/M)).

S60213. Perform coherent processing on the K1 slices to obtain coherent timestamp sets.

The coherent processing is performed with the slice as a basic granularity to obtain coherent timestamp sets. Coherent processing is intended to concentrate the timestamps of the echo signals and randomize the timestamps of the noise signals to enhance the echo signals and suppress the noise signals.

In a possible embodiment, all the K1 slices can be subject to coherent processing to obtain coherent timestamp sets, to improve accuracy of coherent processing; or L slices can be selected from the K1 slices to be subject to coherent processing, to obtain coherent timestamp sets.

A rule for selecting L slices from K1 slices is as follows.

1. L odd-numbered slices are selected from the K1 slices.

For example, K1=10, L=5, 10 slices are a slice 1, a slice 2, a slice 3, a slice 4, a slice 5, a slice 6, a slice 7, a slice 8, a slice 9, and a slice 10 respectively, odd-numbered slices of the slice 1, the slice 3, the slice 5, the slice 7, and the slice 9 are selected from the 10 slices, and the 5 odd-numbered slices are subject to coherent processing, to obtain coherent timestamp sets.

2. L even-numbered slices are selected from the K1 slices.

For example, K1=10, L=3, 10 slices are a slice 1, a slice 2, a slice 3, a slice 4, a slice 5, a slice 6, a slice 7, a slice 8, a slice 9, and a slice 10 respectively, even-numbered slices of the slice 6, the slice 8, and the slice 10 are selected from the 10 slices, and the 3 even-numbered slices are subject to coherent processing, to obtain coherent timestamp sets.

3. L slices are selected from the K1 slices randomly.

For example, K1=10, L=7, 10 slices are a slice 1, a slice 2, a slice 3, a slice 4, a slice 5, a slice 6, a slice 7, a slice 8, a slice 9, and a slice 10 respectively, 7 slices of the slice 1, the slice 2, the slice 3, the slice 6, the slice 7, the slice 9, and the slice 10 are selected from the 10 slices randomly, and the 7 slices are subject to coherent processing, to obtain coherent timestamp sets.

4. K1 slices are sorted in ascending order of numbers of timestamps, where the number of timestamps indicates the number of timestamps included in the slice, then first L slices are selected, the selected L slices are subject to coherent processing, and calculation load of coherent processing can be reduced by selecting a slice with fewer timestamps for coherent processing.

For example, K1=10, L=5, 10 slices are a slice 1, a slice 2, a slice 3, a slice 4, a slice 5, a slice 6, a slice 7, a slice 8, a slice 9, and a slice 10 respectively. The slice 1 includes 11 timestamps, the slice 2 includes 10 timestamps, the slice 3 includes 9 timestamps, the slice 4 includes 8 timestamps, the slice 5 includes 7 timestamps, the slice 6 includes 6 timestamps, the slice 7 includes 5 timestamps, the slice 8 includes 4 timestamps, the slice 9 includes 3 timestamps, and the slice 10 includes 2 timestamps. The 10 slices are sorted in ascending order of the numbers of timestamps into a sequence: the slice 10, the slice 9, the slice 8, the slice 7, the slice 6, the slice 5, the slice 4, the slice 3, the slice 2, and the slice 1. First 5 slices of the slice 10, the slice 9, the slice 8, the slice 7, and the slice 6 are selected from the foregoing 10 slices to be subject to coherent processing to obtain coherent timestamp sets.

5. K1 slices are sorted in descending order based on numbers of timestamps, where then last L slices are selected, the selected L slices are subject to coherent processing, and calculation load of coherent processing can be reduced by selecting a slice with fewer timestamps for coherent processing.

For example, K1=10, L=5, 10 slices are a slice 1, a slice 2, a slice 3, a slice 4, a slice 5, a slice 6, a slice 7, a slice 8, a slice 9, and a slice 10 respectively. The slice 1 includes 20 timestamps, the slice 2 includes 21 timestamps, the slice 3 includes 22 timestamps, the slice 4 includes 23 timestamps, the slice 5 includes 27 timestamps, the slice 6 includes 28 timestamps, the slice 7 includes 30 timestamps, the slice 8 includes 31 timestamps, the slice 9 includes 33 timestamps, and the slice 10 includes 36 timestamps. The 10 slices are sorted in descending order of the numbers of timestamps into a sequence: the slice 10, the slice 9, the slice 8, the slice 7, the slice 6, the slice 5, the slice 4, the slice 3, the slice 2, and the slice 1. Last 5 slices of the slice 5, the slice 4, the slice 3, the slice 2, and the slice 1 are selected from the foregoing 10 slices to be subject to coherent processing to obtain coherent timestamp sets.

In a possible embodiment, steps of performing coherent processing on L slices selected from the K1 slices to obtain coherent timestamp sets include:

dividing time length of the L slices into PT consecutively distributed time windows respectively; and obtaining the coherent timestamp sets based on time windows of the L slices.

Time length of each of the L slices are equally divided into P1 consecutively distributed time windows, the L slices have the same integration period, P1 time windows on the L slices are distributed at the same position on the time axis, that is, abscissa, time windows corresponding to a first slice are $W_{11}$, $W_{12}$, . . . , $W_{1P1}$, time windows corresponding to a second slice are $W_{21}$, $W_{22}$, . . . , $W_{2P1}$, and time windows corresponding to an $L^{th}$ slice are $W_{L1}$, $W_{L2}$, . . . , $W_{LP1}$. The integration period of the coherent timestamp sets is also divided into P1 consecutive time windows, that is, distribution positions of time windows of the coherent timestamp sets are completely the same as distribution positions of time windows of the L slices. A timestamp in each time window of the coherent timestamp set is determined based on the following rule. For any time window in the coherent timestamp set, an $i^{th}$ time window is set, $1 \le i \le P1$, and timestamps at the same time window position in the L slices are processed. If at least one of time windows $W_{1i}$, $W_{2i}$, . . . , $W_{Li}$ does not cover the timestamp, no timestamp is set in the $i^{th}$ time window in the coherent timestamp set; or if the L time windows all cover timestamps, the timestamps in the L time windows are accumulated to obtain a timestamp in the $i^{th}$ time window in the coherent timestamp set.

Figure 42:
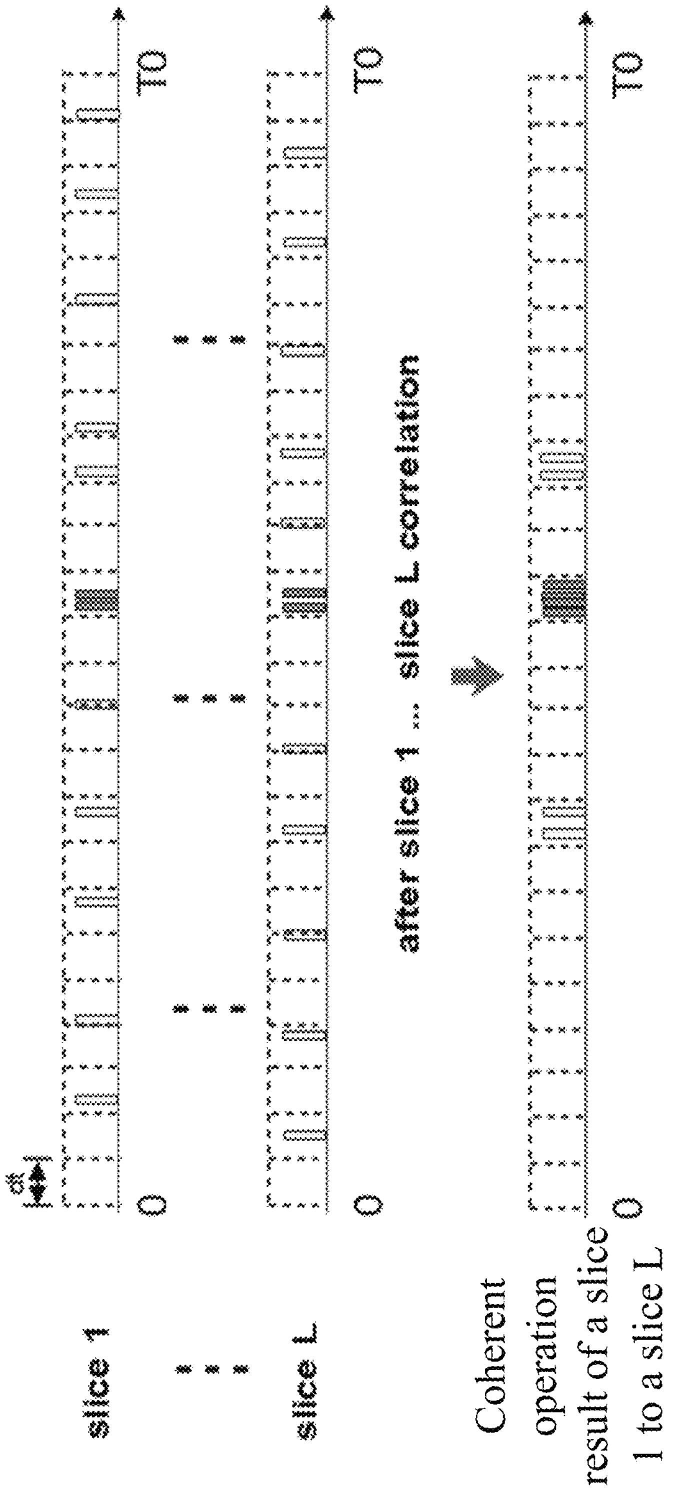
FIG. 42 and FIG. 43 are schematic diagrams of a principle of performing coherent processing on a slice according to embodiments of this application.

For example, FIG. 42 is a schematic diagram of a principle of performing coherent processing on multiple slices. The L slices are a slice 1, a slice 2, . . . , a slice L, the slice 1 to the slice L have the same integration period, a start moment of the integration period is 0, and an end moment is T0. As shown in FIG. 42, an integration period of each of the slice 1 to the slice L is divided into 25 time windows, and length of the time window is dt. For example, the length of the time window is twice the minimum time resolution of the TDC. Because the slice 1 to the slice L have the same integration period, distribution positions of time windows in the slice 1 to the slice L are also completely the same. A coherent operation is performed on the slice 1 to the slice L to obtain coherent timestamp sets, that is, coherent operation results corresponding to the slice 1 to the slice L in FIG. 42. Integration periods of the coherent timestamp sets are the same as integration periods of the slice 1 to the slice L. An integration period on the coherent timestamp sets is also divided into 25 time windows, and distribution positions of the time windows of the coherent timestamp sets are completely the same as the distribution positions of the time windows of the slice 1 to the slice L. For first time windows on the coherent timestamp sets, a first time window of the slice 1 and a first time window of the slice L do not cover the timestamp, and therefore, no timestamp is set in the first time windows of the coherent timestamp sets. For $9^{th}$ time windows on the coherent timestamp sets, $9^{th}$ time windows of the slice 1 to the slice L all cover timestamps, and timestamps in the foregoing $9^{th}$ time windows are accumulated to obtain timestamps in the $9^{th}$ time windows of the coherent timestamp sets. By analogy, distribution of timestamps in 25 time windows on the coherent timestamp sets shown in FIG. 42 can be obtained. In other words, a coherent processing procedure in this application can be summarized as follows. For each time window on the slice 1 to the slice L, a time window covering the timestamp is denoted as “1”, a time window covering no timestamp is denoted as “0”, AND operation is performed on L time windows at the same position on the slice 1 to the slice L to obtain an operation result of the time windows at corresponding positions of the coherent timestamp sets. If the operation result is 0, no timestamp is output in the corresponding time window; or if the operation result is 1, the timestamps in all the time windows are accumulated and output.

In another possible embodiment, performing coherent processing on the K1 slices to obtain coherent timestamp sets includes:

setting a time window for each timestamp in an $X^{th}$ slice, where the time window needs to cover the timestamp, and in some embodiments, the timestamp can be located at a center of the corresponding time window;

setting time windows for L slices before the $X^{th}$ slice based on a time window position of the $X^{th}$ slice, where distribution positions of time windows of the previous L slices and the $X^{th}$ slice are completely identical;

obtaining intermediate coherent timestamp sets corresponding to the $X^{th}$ slice based on the $X^{th}$ slice and the previous L slices;

determining K1−X+1 corresponding intermediate coherent timestamp sets of the $X^{th}$ slice to the $K1^{th}$ slice; and accumulating K1−X+1 intermediate coherent timestamp sets to obtain coherent timestamp sets.

The $X^{th}$ slice is any one of the K1 slices. Because previous L slices of the $X^{th}$ slice need to be processed, X needs to satisfy a condition that $X \ge L+1$, X=L+1, L+2, . . . , K1, and X and L are integers greater than 1. A time window is set for each timestamp in the $X^{th}$ slice, and then corresponding time windows are respectively set for the previous L slices based on a time window position of the $X^{th}$ slice, that is, positions and the number of time windows set in the $X^{th}$ slice are the same as positions and the number of time windows set in the previous L slices. Because positions and numbers of timestamps corresponding to different slices may be different, timestamps in the corresponding time windows of different slices may have different positional relationships. Assuming that the number of time windows of the $X^{th}$ slice is $P_X$ and the number of time windows of corresponding previous L slices is also $P_X$, time windows corresponding to the $X^{th}$ slice are $W_{X1}$, $W_{X2}$, . . . , $W_{XP_X}$, corresponding time windows of a corresponding $(X-1)^{th}$ slice are $W_{(X-1)1}$, $W_{(X-1)2}$, . . . , $W_{(X-1)P_X}$ respectively, and time windows corresponding to the $(X-L)^{th}$ slice are $W_{(X-L)1}$, $W_{(X-L)2}$, . . . , $W_{(X-L)P_X}$ respectively.

It can be understood that, because intermediate coherent timestamp sets corresponding to the $X^{th}$ slice and the $X^{th}$ slice have the same time length and are aligned, the time length of the intermediate coherent timestamp sets is also divided into $P_X$ slices. For example, 10 (K1=10) slices in some embodiments, a $5^{th}$ (X=5) slice includes 9 timestamps, and therefore, 9 time windows are set. Correspondingly, 9 time windows are also set for first 4 (L=4) slices. For another example, if a $6^{th}$ slice includes 5 timestamps, 5 time windows are set, and 5 time windows are also set for first 5 slices. For any time window of intermediate coherent timestamp sets corresponding to the $X^{th}$ slice, any time window is set as an $i^{th}$ time window, $1 \leq i \leq P_X$, and if at least one of time windows $W_{Xi}$, $W_{(X-1)i}$, . . . , $W_{(X-L)i}$ does not cover the timestamp, no timestamp is set in the $i^{th}$ time window; or if the time windows $W_{Xi}$, $W_{(X-1)i}$, . . . , $W_{(X-L)i}$ all cover timestamps, the timestamps in the time windows $W_{Xi}$, $W_{(X-1)i}$, . . . , $W_{(X-L)i}$ are accumulated to obtain a timestamp in the $i^{th}$ time window. In other words, herein, a procedure of determining intermediate coherent timestamp sets is as follows. For each time window on the slice X to the slice X−L, a timestamp covering a timestamp is denoted as "1", a timestamp covering no timestamp is denoted as "0", AND operation is performed on L+1 time windows at the same position on the slice X to the slice X−L to obtain an operation result of the time windows at corresponding positions of the intermediate coherent timestamp sets. If the operation result is 0, no timestamp is output in the corresponding time window; or if the operation result is 1, the timestamps in all the time windows are output.

Figure 43:
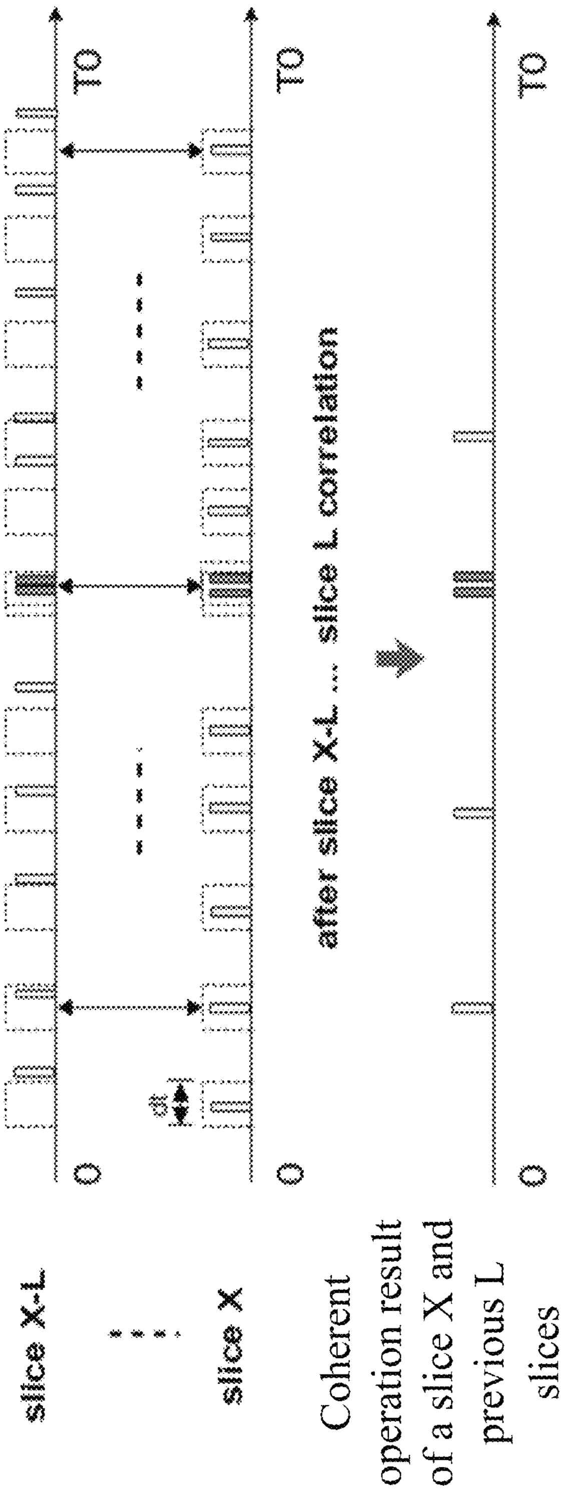

For example, referring to FIG. 43, a position of each timestamp in the slice X on the integration period is first determined, then a time window is set with each timestamp as a center point, and the time windows may be inconsecutive. In FIG. 43, the slice X corresponds to 12 time windows, and 12 time windows are also set for a slice X−1 to a slice X−L, then timestamps in time windows at the same position in the slice X to the slice X−L are compared, and if at least one of the L+1 time windows at the same position does not cover a timestamp, no timestamp is output; or if all L+1 time windows at the same position cover the timestamp, all the timestamps in the L+1 time windows are accumulated and then output.

A total of K1−X+1 intermediate coherent timestamp sets respectively corresponding to the $X^{th}$ slice to a $K1^{th}$ slice can be obtained in the method in FIG. 43, and then the K1−X+1 intermediate coherent timestamp sets are accumulated to obtain final coherent timestamp sets. For an accumulation method, refer to an accumulation process of the timestamp sets in the group. Details are not described herein again.

It should be noted that when intermediate coherent timestamp sets respectively corresponding to the $X^{th}$ slice to the $K1^{th}$ slice are calculated, a method can be performed to simultaneously divide the time windows for the K1−X+1 slices. For example, K1−X+1 calculation threads are simultaneously invoked to respectively calculate the intermediate coherent timestamp sets corresponding to each slice, thereby improving an operation speed of coherent processing.

S60214. Generate the histogram data based on the coherent timestamp sets.

An abscissa in the histogram data represents the time length of the coherent timestamp set and a time window divided on the time length, and an ordinate represents the number of timestamps corresponding to each time window in the timestamp set.

Figure 44:
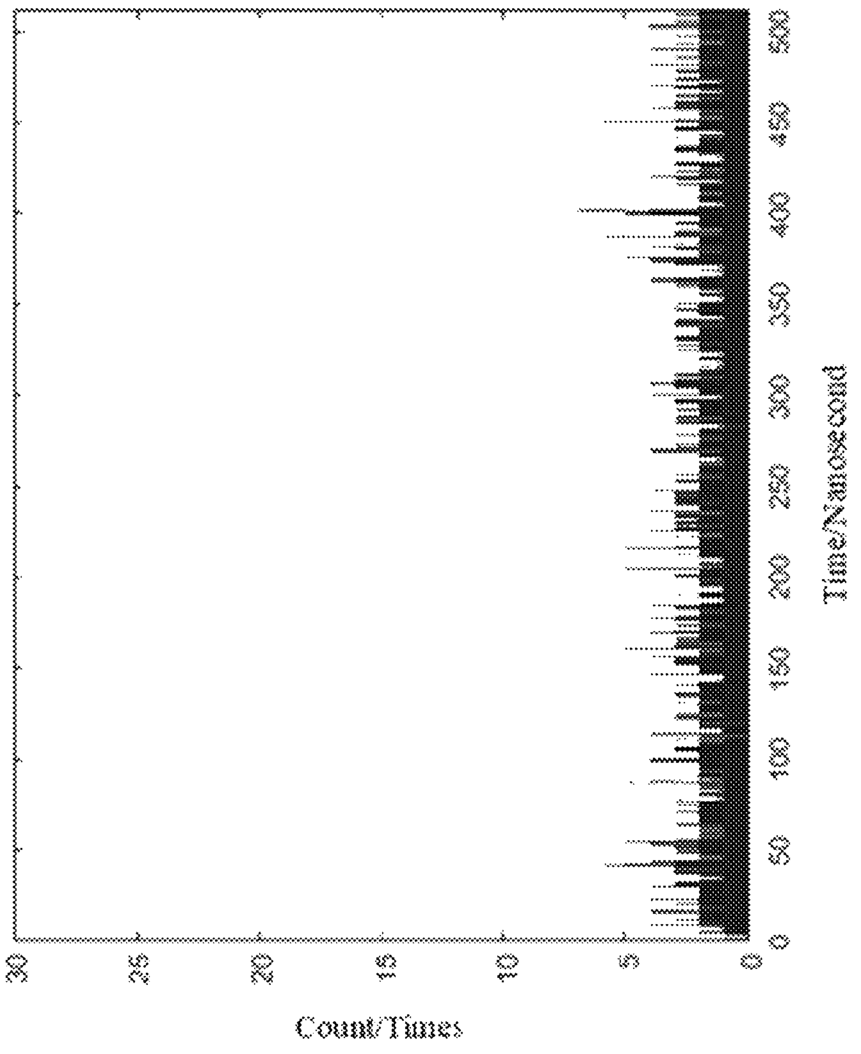
FIG. 44 shows histogram data before coherent processing according to embodiments of this application.
Figure 45:
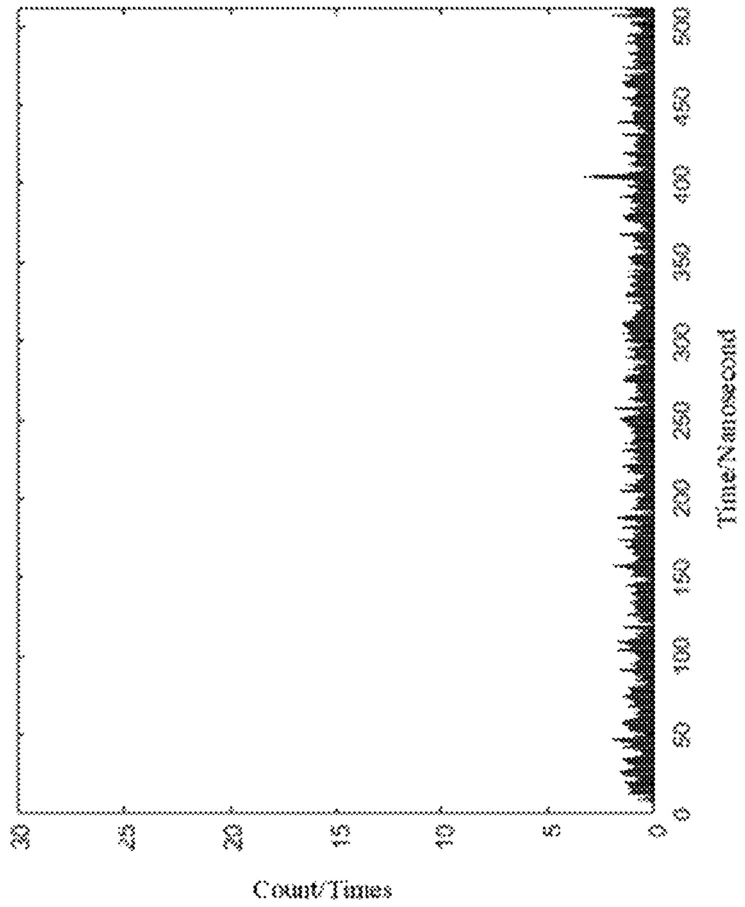
FIG. 45 shows histogram data after coherent processing according to embodiments of this application.

For example, referring to histogram data shown in FIG. 44 and FIG. 45, FIG. 44 shows a histogram before coherent processing. A peak value in counts in the histogram is not sufficiently significant due to impact of the noise signal. FIG. 45 shows histogram data obtained after coherent processing with a slice as granularity. It can be learned that a count other than the peak value in FIG. 45 is suppressed, the peak value is more significant, and time corresponding to the peak value is about 400 ns.

S603. Determine a time of flight based on the histogram data.

Further, determining a time of flight based on the histogram data includes the following step.

S6031. Obtain histogram data of a target object.

The histogram data is generated based on the N laser pulses emitted by the emitter. Because one echo signal is reflected back each time the laser pulse reaches the target object, N pulses correspond to N echo signals. Each pulse corresponds to one integration period, and the N pulses correspond to the N integration periods. Further, in some embodiments, N echo signals and noise signals may be accumulated to generate the histogram, and each echo signal corresponds to m counts. Specifically, N is an integer greater than 1, m is an integer greater than 1, the histogram data is used to characterize the histogram of the time of flight, each of the m counts is associated with one time, and the histogram data is generated based on the DTOF measurement method in FIG. 1A and FIG. 1B. For the specific process, refer to description of FIG. 1A and FIG. 1B. Details are not described herein again.

Figure 46:
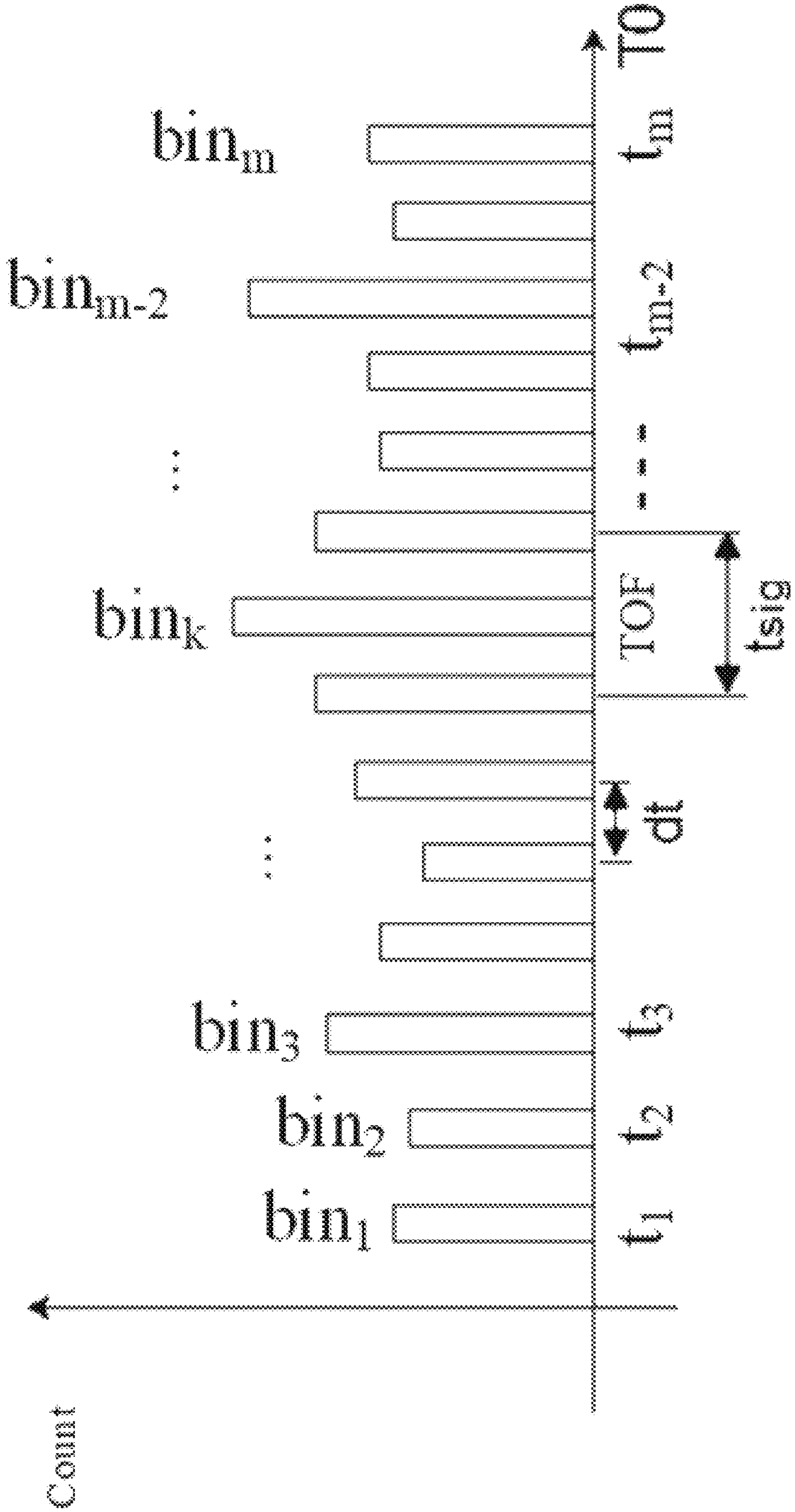
FIG. 46 to FIG. 49 are schematic diagrams of a principle of performing digital filtering on histogram data according to embodiments of this application.
Figure 47:
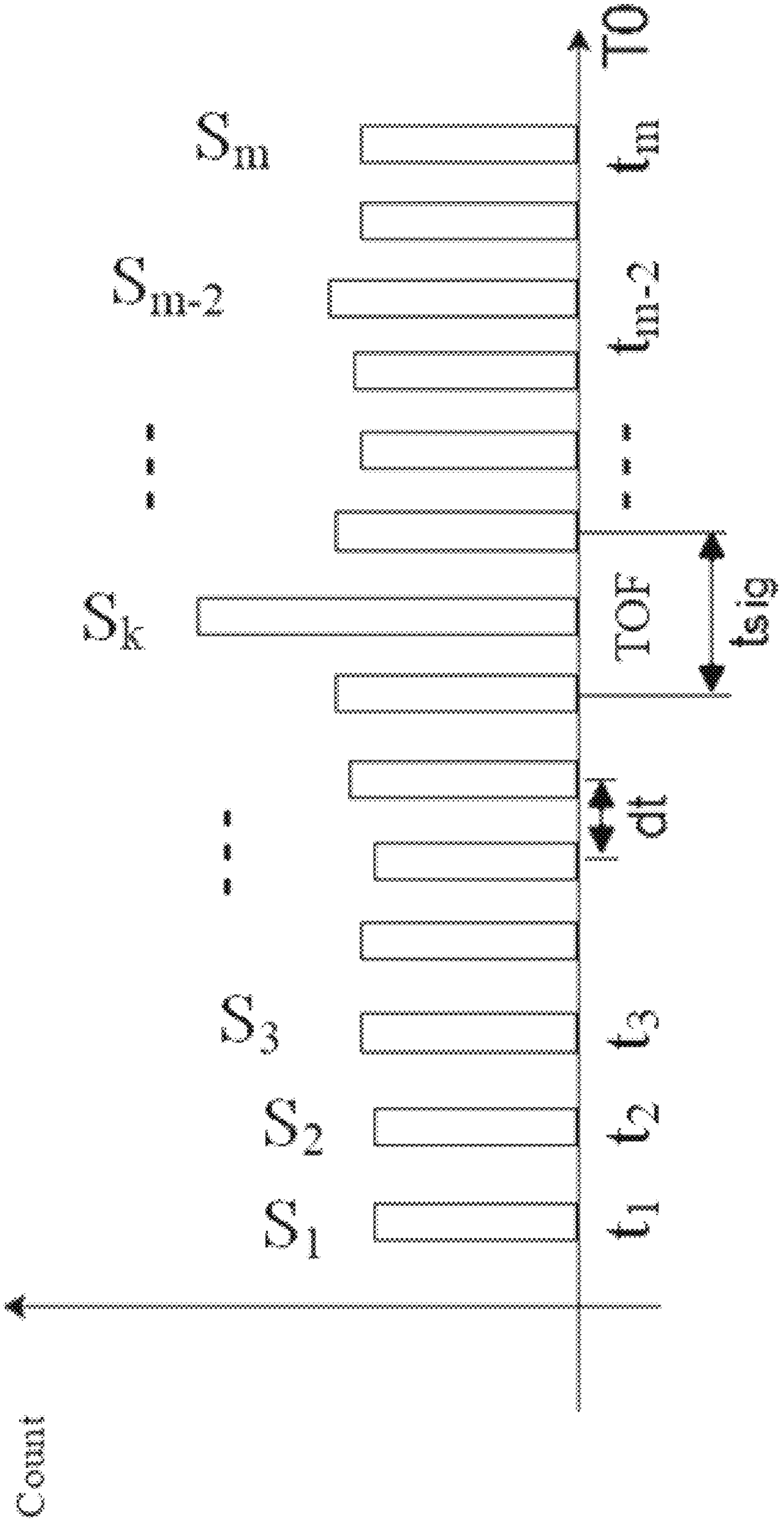

FIG. 46 shows a histogram generated based on the DTOF method in FIG. 1A and FIG. 1B. Histogram data corresponding to the histogram includes a count and a time associated with the count, an abscissa in the histogram represents the time, and an ordinate represents the count. The m counts are $bin_1$, $bin_2$, . . . , $bin_k$, . . . , $bin_m$, and times corresponding to the m counts are $t_1$, $t_2$, . . . , $t_m$. A time interval between the two adjacent counts in the histogram is greater than the minimum time resolution of the TDC.

In one or more embodiments, obtaining histogram data includes:

reading the m counts included in the histogram data and the time associated with the m counts from a first RAM based on a preset clock period.

The histogram data is stored in the first RAM, the histogram data includes the count and time, the histogram data is used to characterize the histogram of the time of flight, and a time interval between the two adjacent counts in the histogram is greater than or equal to the minimum time resolution of the TDC, which depends on a hardware capacity of the TDC. For example, referring to FIG. 50, the time interval between two adjacent counts is dt, and m counts and times associated with the m counts are read from the first RAM with dt as the clock period.

S6032. Perform digital filtering on the m counts to obtain m filtered values respectively corresponding to the m counts.

The m counts are discrete data, the m counts can be subject to digital filtering through a digital filter to obtain the m filtered values, and the digital filter is configured to suppress or reduce an interference parameter caused by the noise signal in the m counts. Based on a band characteristic of the digital filter, the digital filter can be a low-pass filter, a high-pass filter, a band-pass filter, or a band-stop filter; or based on an impulse response type of the digital filter, the digital filter can be an FIR filter or an IIR filter. An order of the digital filter is related to filtering precision. The higher the order of the digital filter, the higher the filtering precision, but the slower the convergence speed of the digital filter. The lower the order of the digital filter, the lower the filtering precision, but the greater the convergence speed of the digital filter. In some embodiments, an appropriate order can be selected based on the ranging precision. For higher ranging precision, a higher-order digital filter can be selected; or for lower ranging precision, a lower-order digital filter can be selected.

In one or more embodiments, performing digital filtering on the m counts to obtain m filtered values respectively corresponding to the m counts includes:

allocating storage addresses based on the m filtered values and times respectively corresponding to the m filtered values; and storing the m filtered values and the times respectively corresponding to the m filtered values in a second RAM based on the storage addresses.

The m filtered values and the corresponding times are periodically stored in the second RAM, a reading period of the counts and a storage period of the filtered values are kept different, and in this way, the m filtered values and the corresponding times are stored in the second RAM in m clock periods. For example, referring to FIG. 51, in a first clock period, a count $bin_1$ and a time $t_1$ are read from the first RAM, then the count $bin_1$ is subject to digital filtering to obtain a filtered value $S_1$, a storage address 1 is assigned to the filtered value $S_1$ and the time $t_1$, and the filtered value $S_1$ and the time $t_1$ are stored in a storage unit indicated by the storage address 1 in the second RAM; in a second clock period, a count $bin_2$ and a time $t_2$ are read from the first RAM, then the count $bin_2$ is subject to digital filtering to obtain a filtered value $S_2$, a storage address 2 is assigned to the filtered value $S_2$ and the time $t_2$, and the filtered value $S_2$ and the time $t_2$ are stored in a storage unit indicated by the storage address 2 in the second RAM, and so on; and in an $m^{th}$ clock period, a count $bin_m$ and a time $t_m$ are read from the first RAM, then the count $bin_m$ is subject to digital filtering to obtain a filtered value $S_m$, a storage address m is assigned to the filtered value $S_m$ and the time $t_m$, and the filtered value $S_m$ and the time $t_m$ are stored in a storage unit indicated by the storage address m in the second RAM.

In a possible embodiment, a method for performing frequency-domain digital filtering includes:

when the digital filter is the FIR filter, an order of the FIR filter is n−1, the m counts are $bin_1, bin_2, \ldots, bin_m$, the m filtered values are $S_1, S_2, \ldots, S_m$, and coefficients of the FIR filter are $\alpha_1, \alpha_2, \ldots, \alpha_n$, where n is an integer greater than or equal to 1, and m>n; and $S_m=\alpha_1\times bin_m+\alpha_2\times bin_{m-1}+\alpha_3\times bin_{m-2}+\ldots+\alpha_n\times bin_{m-n}$.

Herein, $S_1=\alpha_1\times bin_1$, $S_2=\alpha_1\times bin_2+\alpha_2\times bin_1$, $S_3=\alpha_1\times bin_3+\alpha_2\times bin_2+\alpha_3\times bin_1$, and so on, $S_m=\alpha_1\times bin_m+\alpha_2\times bin_{m-1}+\alpha_3\times bin_{m-2}+\ldots+\alpha_n\times bin_{m-n}$. The digital filter performs digital filtering on m counts based on an equivalent sampling clock period, performs digital filtering once per clock period, and completes digital filtering of the m counts in the m clock periods.

In one or more embodiments, one or more of a configured order, equivalent sampling clock frequency, window function, and equivalent signal frequency are obtained.

In one or more embodiments, a coefficient of an FIR filter is obtained based on the order, the equivalent sampling clock frequency, the window function, and the equivalent signal frequency by using a MATLAB toolbox.

Figure 51:
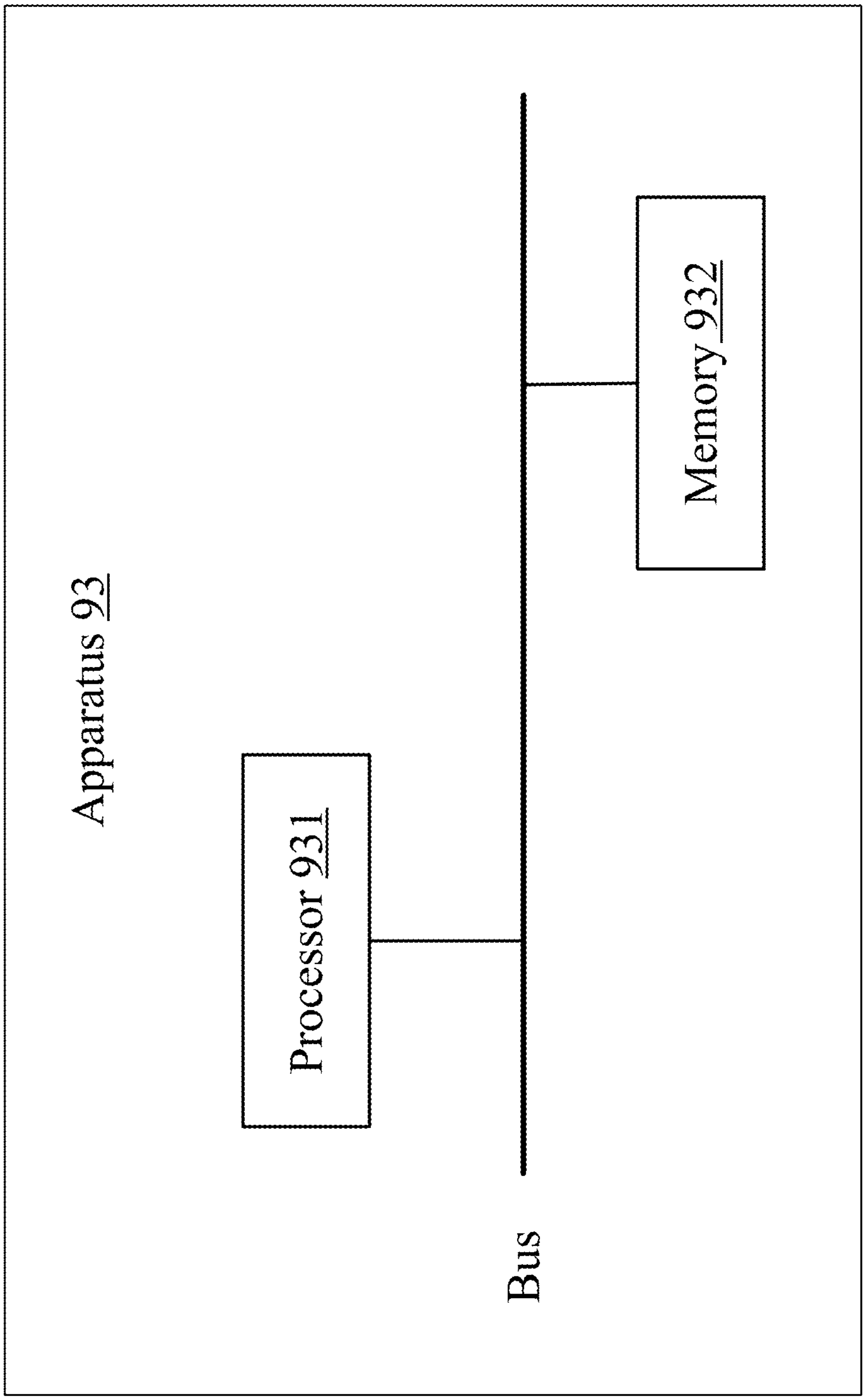
FIG. 51 is another schematic structural diagram of a time-of-flight measurement apparatus according to embodiments of this application.

When the digital filter is the FIR filter, a coefficient of the FIR filter is determined based on the equivalent sampling clock frequency, the equivalent signal frequency, the order, and the window function. The equivalent sampling clock frequency represents sampling frequency of discrete digital signals input by the FIR filter, and the equivalent signal frequency represents signal frequency of the discrete digital signals input by the FIR filter; and the window function includes, but is not limited to, a rectangular window function, a Hanning window function, a Hamming window function, or a triangular window function. The window function can be selected based on an actual need. In some embodiments, the MATLAB toolbox can be invoked to input the equivalent sampling clock frequency, the equivalent signal frequency, the order, and the window function to generate the coefficient of the FIR filter. In some embodiments, the equivalent sampling clock frequency can be calculated based on the resolution of the TDC, that is, based on the time interval between two adjacent counts in the histogram. Referring to FIG. 51, a time interval between two adjacent counts is dt, $T_{sample}$=dt, $$f_{sample}=\frac{1}{T_{sample}},$$

and $f_{sample}$ is the equivalent sampling clock frequency; and the equivalent signal period is equal to half-peak width in the histogram. Referring to FIG. 46, the half-peak width in the histogram is $t_{sig}$, $$T_{si}=t_{sig},\ f_{si}=\frac{1}{t_{sig}},$$

and $f_{si}$ is the equivalent signal period.

For example, the FIR filter is 32-order, the equivalent sampling clock period is 2 ns, the equivalent signal period is 10 ns, the window function is the rectangular window function, and the foregoing parameters are input into the MATLAB toolbox, to obtain coefficients of the FIR filter: $\alpha_1$=0.018, $\alpha_2$=0.014, $\alpha_3$=0.007, $\alpha_4$=−0.004, $\alpha_5$=−0.015, $\alpha_6$=−0.025, $\alpha_7$=−0.032, $\alpha_8$=−0.031, $\alpha_9$=−0.023, $\alpha_{10}$=−0.007, $\alpha_{11}$=0.017, $\alpha_{12}$=0.045, $\alpha_{13}$=0.077, $\alpha_{14}$=0.106, $\alpha_{15}$=0.131, $\alpha_{16}$=0.147, $\alpha_{17}$=0.152, $\alpha_{18}$=0.147, $\alpha_{19}$=0.131, $\alpha_{20}$=0.106, $\alpha_{21}$=0.077, $\alpha_{22}$=0.045, $\alpha_{23}$=0.017, $\alpha_{24}$=−0.007, $\alpha_{25}$=−0.023, $\alpha_{26}$=−0.031, $\alpha_{27}$=−0.032, $\alpha_{28}$=−0.025, $\alpha_{29}$=−0.015, $\alpha_{30}$=−0.004, $\alpha_{31}$=0.007, $\alpha_{32}$=0.014, and $\alpha_{33}$=0.018.

S6033. Determine a time of flight of the target object based on a time corresponding to a peak value in the m filtered values.

Herein, m filtered values are obtained after m counts are subject to digital filtering, m filtered values and m counts are in a one-to-one mapping relationship. A peak value (maximum value) is determined from the m filtered values, and then based on the time corresponding to the peak value, the time of flight of the target object is determined. The m filtered values are respectively $S_1, S_2, \ldots, S_k, \ldots, S_m$, where $S_k$ is the peak value in the m filtered values, and time corresponding to $S_k$ is the time of flight of the target object.

Figure 48:
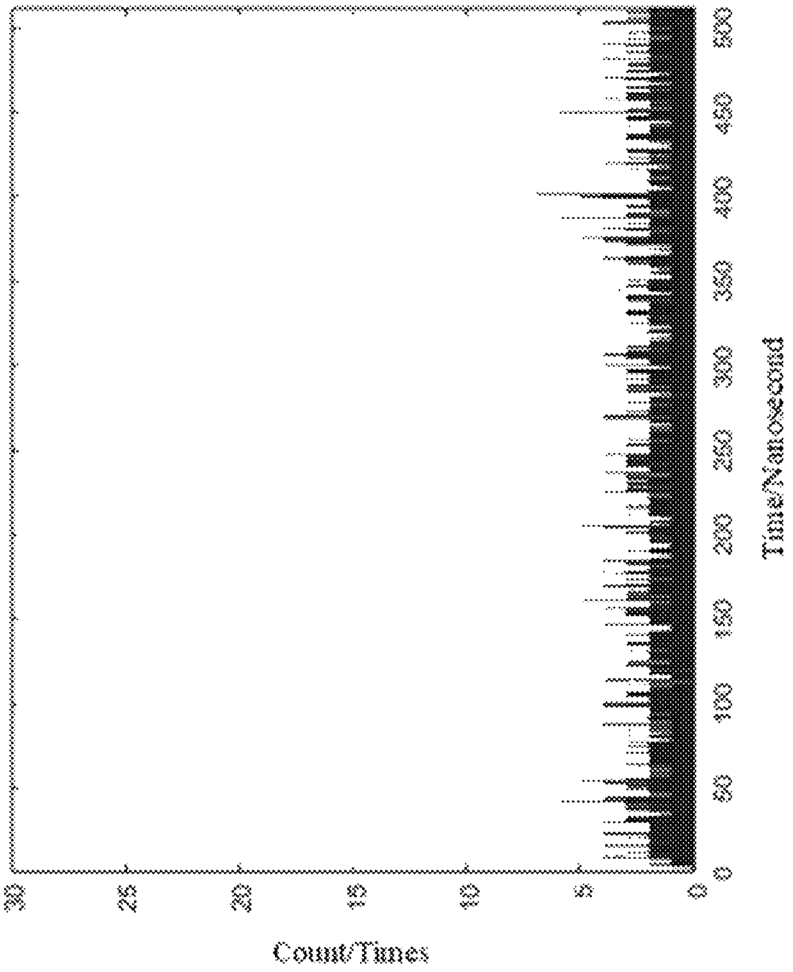
Figure 49:
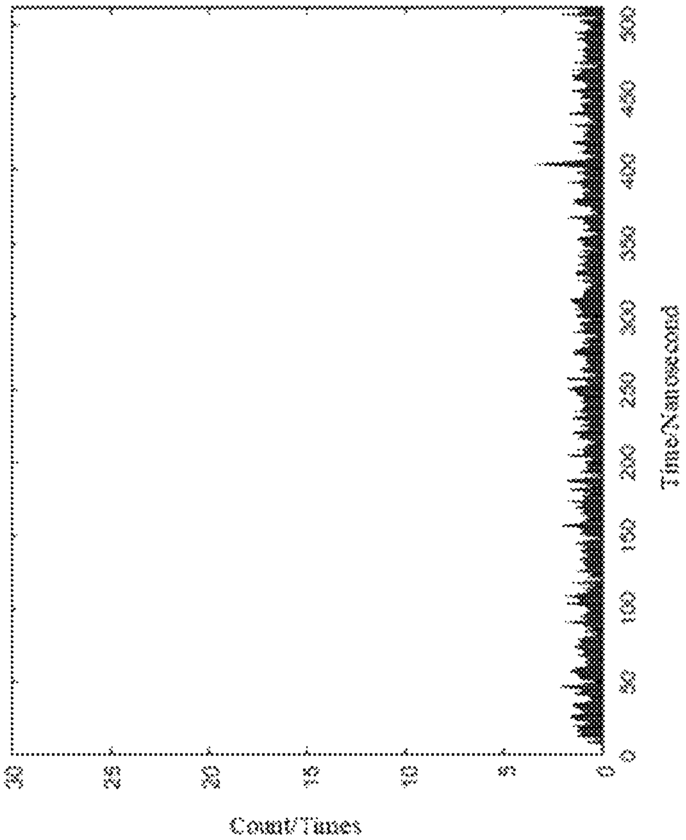

FIG. 48 shows a histogram before digital filtering. A peak value in counts in the histogram is not sufficiently significant due to impact of the noise signal. FIG. 49 shows a histogram obtained after the histogram in FIG. 48 is subject to digital filtering. It can be learned that a count other than the peak value in FIG. 49 is suppressed, the peak value is more significant, time corresponding to the peak value is about 400 ns, and the time is the correct time of flight of the target object.

Based on description of FIG. 31, the histogram data are obtained based on the DTOF measurement method. The count representing the number of echo signals in the histogram data is subject to digital filtering to obtain multiple filtered values, and then the correct time of flight of the target object is determined based on the time corresponding to the peak position in the filtered value, so that the count of the echo signal in the histogram data can basically remain unchanged and the noise signal is effectively suppressed, thereby improving a SBNR of a distance detector and effectively improving measurement accuracy of time of flight of the distance detector.

In another possible embodiment, determining a time of flight based on the histogram data includes the following steps.

S60331. Obtain the multiple total numbers of timestamps based on a preset time window and the histogram.

A time interval of the histogram is the same as the integration period of the N timestamp sets. Length of the time window is greater than the minimum time resolution of the TDC, and is generally an integer multiple of the minimum time resolution of the TDC. For example, the minimum time resolution of the TDC is 1 ns, and the length of the time window is 3 ns.

Possibly, multiple consecutive time windows of the same width are set between a start moment and an end moment of the histogram based on the preset time window; and the counts of all the timestamps covered by the time windows are summed to obtain multiple total numbers of timestamps.

Specifically, in some embodiments, the time length between the start moment and the end moment of the histogram can be divided into multiple time windows, and two adjacent time windows are not overlapped. That is, a start moment of a current time window is an end moment of a previous time window, and an end moment of the current time window is a start moment of the next time window. For each time window, the number of timestamps covered by the time window is counted to obtain multiple total numbers of timestamps.

Possibly, the time window is controlled to slide by a preset sliding step between the start moment and the end moment of the histogram; and the counts of all the timestamps covered by the time window at each sliding position are summed to obtain multiple total numbers of timestamps.

In some embodiments, length of the time window can be equal to width of the laser pulse, the emitter emits laser pulses within respective integration periods of the N timestamp sets, the laser pulse lasts for specific duration, and the duration is the width of the laser pulse. Further, because the length of the time window in some embodiments is equal to the width of the laser pulse, the slidable time window can concentrate the echo signals in the same time window, which not only reduces the time of searching for peak timestamps, but also improves searching accuracy of peak timestamps.

It can be understood that the sliding step represents the time interval between two adjacent sliding positions, and the sliding step may be greater than or equal to K times the minimum time resolution of the TDC, where K is an integer greater than 1. In this way, in some embodiments, the TDC can be used to effectively identify each time window in the N timestamp sets. The measurement apparatus controls the time window to slide from the start moment to the end moment of the histogram, and the time window is at multiple different sliding positions during the sliding process. Further, for each sliding position of the time window, the counts of all the timestamps covered by the time window are collected, and then the counts of all the timestamps are summed to obtain the total number of timestamps corresponding to the sliding position.

S60332. Use a position with the maximum total number of timestamps as a target position.

After the time window slides from the start moment to the end moment of the histogram, total numbers of timestamps at the sliding positions are obtained, and the sliding position with the maximum total number of timestamps is determined. For example, the time window slides 5 times between the start moment and the end moment of the histogram, the counted total number of timestamps covered by the time window at a first sliding position is 12, the counted total number of timestamps covered by the time window at a second sliding position is 15, a counted total number of timestamps covered by the time window at a third sliding position is 27, the counted total number of timestamps covered by the time window at a fourth sliding position is 10, and the counted total number of timestamps covered by the time window at a fifth sliding position is 8. Therefore, the total number of timestamps at the third sliding position is the maximum, and the third sliding position is determined as the target position.

For example, a start moment of the histogram is 450 nanoseconds, an end moment is 490 nanoseconds, and length of a time window is 3 nanoseconds. Specifically, the first sliding position of the time window is 450 nanoseconds to 453 nanoseconds, the second sliding position is 451 nanoseconds to 454 nanoseconds, and so on, so that all sliding positions in the histogram can be determined. Counts of all the timestamps covered by the time window at the sliding positions are summed. For example, counts of all the timestamps covered by the time window at the first sliding position are summed, and the obtained total number of timestamps is 13. The sliding position with the maximum total number of timestamps is determined. As shown in FIG. 45, the sliding position with the maximum total number of timestamps is 466 nanoseconds to 469 nanoseconds, the time window covers 11 timestamps at the sliding position, and the 11 timestamps are denoted as a timestamp 1 to a timestamp 11. A count of the timestamp 1 is 2, a count of the timestamp 2 is 3, a count of the timestamp 3 is 3, a count of the timestamp 4 is 2, a count of the timestamp 5 is 3, a count of the timestamp 6 is 2, a count of the timestamp 7 is 2, a count of the timestamp 8 is 4, a count of the timestamp 9 is 2, a count of the timestamp 10 is 2, and a count of the timestamp 11 is 2. The counts of the foregoing 11 timestamps are summed to obtain the total number of timestamps, namely, 27.

S60333. Determine a time of flight based on the target position.

In this embodiment, the count of all the timestamps covered by the time window can be collected at each sliding position, the position with the maximum total number of timestamps is the target position, that is, the time of receiving the echo signal is within a range of the time window at the target position, and the time of flight is calculated accordingly. A method of determining a time of flight based on the target position includes:

obtaining a count of each timestamp covered by the time window at the target position;

using a timestamp with the maximum count as a peak timestamp; and calculating the time of flight based on the peak timestamp.

For example, the time window covers 11 timestamps at the target position, and the 11 timestamps are denoted as a timestamp 1 to a timestamp 11. A count of the timestamp 1 is 2, a count of the timestamp 2 is 3, a count of the timestamp 3 is 3, a count of the timestamp 4 is 2, a count of the timestamp 5 is 3, a count of the timestamp 6 is 2, a count of the timestamp 7 is 2, a count of the timestamp 8 is 4, a count of the timestamp 9 is 2, a count of the timestamp 10 is 2, and a count of the timestamp 11 is 2. Therefore, the count of the timestamp 8 is the maximum, the timestamp 8 is used as the peak timestamp, and the peak time is a detected signal receiving time. Then, the time of flight is calculated based on an emission moment of a photon signal and the peak timestamp. For example, a peak timestamp is t1, a preset signal emission moment is t0, then the time of flight is from t1 to t0, and then the distance between the detector and the target object can be calculated based on the time of flight and the speed of light.

In another possible embodiment, determining a time of flight based on the histogram data includes the following steps.

A timestamp with the maximum count in the histogram data is used as a signal receiving moment, and the time of flight is calculated based on the emission moment of the pulse signal and the receiving moment of the echo signal. For example, the timestamp with the maximum count in the histogram data is t1, an emission moment of the pulse signal is t0, then an obtained time of flight may be from t1 to t0, and then the distance between the detector and the target object can be calculated based on the time of flight and the speed of light.

The time-of-flight measurement method in some embodiments is described in detail above, and a time-of-flight measurement apparatus (referred to as an apparatus 84 below) according to some embodiments is provided below.

Figure 50:
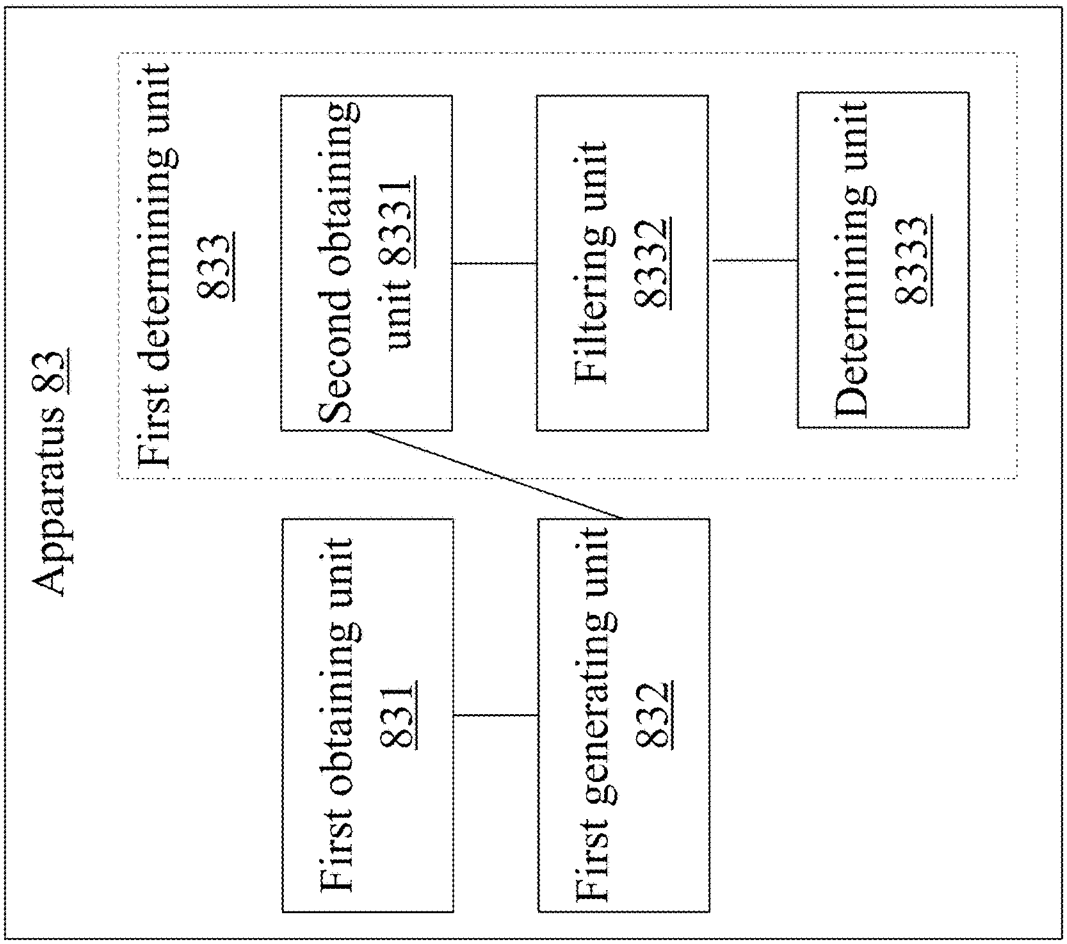
FIG. 50 is a schematic structural diagram of a time-of-flight measurement apparatus according to embodiments of this application.

The apparatus 83 shown in FIG. 50 can implement the time-of-flight measurement method in the embodiment shown in FIG. 31. The apparatus 83 includes a first obtaining unit 831, a generating unit 832, a second obtaining unit 833, a filtering unit 834, and a determining unit 835.

The first obtaining unit 831 is configured to obtain N timestamp sets, where N is an integer greater than 1, each timestamp set includes multiple timestamps, and integration periods of the timestamp sets are equal.

The first generating unit 832 is configured to obtain a histogram based on the N timestamp sets, where an abscissa of the histogram includes multiple timestamps, and an ordinate of the histogram includes counts corresponding to the timestamps.

The first determining unit 833 is configured to determine a time of flight based on the histogram data.

Further, the first determining unit 833 includes:

a second obtaining unit 8331, configured to obtain histogram data of a target object, where the histogram data includes m counts, m is an integer greater than 1, and each of the m counts is associated with a time;

a filtering unit 8332, configured to perform digital filtering on the m counts to obtain m filtered values respectively corresponding to the m counts; and a determining unit 8333, configured to determine a time of flight of the target object based on a time corresponding to a peak value in the m filtered values.

In one or more embodiments, performing digital filtering on the m counts includes:

performing, by a digital filter, digital filtering on the m counts, where the digital filter includes an FIR filter or an IIR filter.

In one or more embodiments, when the digital filter is the FIR filter, an order of the FIR filter is n−1, coefficients of the FIR filter are $\alpha_1, \alpha_2, \ldots, \alpha_n$, the m counts are $bin_1, bin_2, \ldots, bin_m$, and the m filtered values are $S_1, S_2, \ldots, S_m$, where n is an integer greater than or equal to 1, and m>n; and $S_m=\alpha_1\times bin_m+\alpha_2\times bin_{m-1}+\alpha_3\times bin_{m-2}+\ldots+\alpha_n\times bin_{m-n}$.

In one or more embodiments, obtaining histogram data of a target object includes: reading the m counts included in the histogram data and the time associated with the m counts from a first RAM based on a preset period, where the preset period is a time interval between two adjacent counts in the histogram data.

In one or more embodiments, performing digital filtering on the m counts to obtain m filtered values respectively corresponding to the m counts includes:

generating m storage addresses based on times respectively corresponding to the m filtered values; and storing the m filtered values in a second RAM based on the m storage addresses.

In one or more embodiments, the controller further includes:

a coefficient generating unit, configured to obtain one or more of a configured order, equivalent sampling clock frequency, window function, and equivalent signal frequency.

In one or more embodiments, a coefficient of an FIR filter is obtained based on the order, the equivalent sampling clock frequency, the window function, and the equivalent signal frequency by using a MATLAB toolbox.

In one or more embodiments, an equivalent signal period is equal to half-peak width corresponding to the histogram data.

In one or more embodiments, the sampling clock frequency is equal to a time interval between two adjacent counts in the histogram data.

In one possible embodiment, the determining unit further includes:

an acquiring unit, configured to obtain the multiple total numbers of timestamps based on a preset time window and the histogram;

a second determining unit, configured to use a position with the maximum total number of timestamps as a target position; and a third determining unit, configured to determine a time of flight based on the target position.

In one or more embodiments, the acquiring unit includes:

a first setting subunit, configured to set multiple consecutive time windows of the same width from a start moment to an end moment in the histogram based on the preset time window; and a second setting subunit, configured to sum timestamp counts of all the timestamps covered by each time window to obtain the multiple total numbers of timestamps, where the second determining unit is specifically configured to use a time window position with the maximum total number of timestamps as a target position.

In one or more embodiments, the acquiring unit includes:

a third setting subunit, configured to control the time window to slide between the start moment and the end moment in the histogram with a preset sliding step; and a fourth setting subunit, configured to sum counts of all the timestamps covered by the time window at each sliding position to obtain the multiple total numbers of timestamps, where the second determining unit is specifically configured to use a sliding position with the maximum total number of timestamps as a target position.

In one or more embodiments, the third determining unit includes:

a first obtaining subunit, configured to obtain a count of each timestamp covered by the time window at the target position;

a first peak timestamp determining subunit, configured to use a timestamp with the maximum count as a peak timestamp; and a first calculating subunit, configured to calculate the time of flight based on the peak timestamp.

In another possible embodiment, the first determining unit is specifically configured to use a timestamp with the maximum count in the histogram data as a signal receiving moment, and calculate the time of flight based on the emission moment of the pulse signal and the receiving moment of the echo signal. For example, the timestamp with the maximum count in the histogram data is t1, an emission moment of the pulse signal is t0, then an obtained time of flight may be from t1−t0, and then the distance between the detector and the target object can be calculated based on the time of flight and the speed of light.

In one or more embodiments, the first generating unit 832 includes:

a dividing unit, configured to divide the N timestamp sets into K1 groups, where K1 is an integer greater than 1, and each group includes one or more timestamp sets;

an accumulating unit, configured to accumulate the timestamp set included in each group to obtain K1 slices, where each slice includes multiple timestamps;

a coherence unit, configured to perform coherent processing on the K1 slices to obtain coherent timestamp sets;

a second generating unit, configured to generate the histogram data based on the coherent timestamp sets.

In one or more embodiments, the first generating unit 832 includes:

a grouping unit, configured to obtain P2 groups based on the N timestamp sets, where P2<N, P2 is a positive integer, and each group includes at least two timestamp sets;

an accumulating unit, configured to accumulate the timestamp set included in each group to obtain P2 first intermediate timestamp sets;

a screening unit, configured to screen each first intermediate timestamp set to obtain P2 second intermediate timestamp sets, where a screening process includes: moving, by a sliding window with preset width, on time length to implement screening; and if the number of timestamps covered by the sliding window is less than a number threshold, filtering out the timestamp in the sliding window; or if the number of timestamps covered by the sliding window is greater than or equal to the number threshold, retaining the timestamp in the sliding window, where the accumulating unit is further configured to accumulate the P2 second intermediate timestamp sets to obtain coherent timestamp sets; and a third generating unit, configured to obtain the histogram data based on the coherent timestamp sets.

In one or more embodiments, the first generating unit 832 includes:

a selecting subunit, configured to select K3 timestamp sets from the N timestamp sets, where K3<N, and K3 is an integer greater than 2; and a second accumulating unit, configured to accumulate the selected K3 timestamp sets to obtain a histogram.

In one or more embodiments, the selecting subunit is specifically configured to:

select K3 timestamp sets from the N timestamp sets randomly;

select K3 timestamp sets with the minimum number of timestamps from the N timestamp sets;

select K3 timestamp sets with odd sequence numbers from the N timestamp sets; or select K3 timestamp sets with even sequence numbers from the N timestamp sets.

In one or more embodiments, the generating unit 832 includes:

a smoothing subunit, configured to smooth the N timestamp sets to obtain N processed timestamp sets; and a histogram acquiring unit, configured to accumulate the N processed timestamp sets to obtain a final histogram.

These embodiments of this application and the method embodiments in FIG. 1A to FIG. 1D and FIG. 31 to FIG. 49 are based on the same concept, and also have the same technical effects. For a specific process, refer to the description of the method embodiments in FIG. 1A to FIG. 1D and FIG. 31 to FIG. 49. Details are not described herein again.

The apparatus 83 may be a FPGA, a dedicated integrated chip, an SoC, a CPU, an NP, a digital signal processing circuit, an MCU, a PLD or other integrated chips that realize related functions.

The time-of-flight measurement method in some embodiments is described in detail above, and a time-of-flight measurement apparatus (referred to as an apparatus 93 below) according to some embodiments is provided below.

FIG. 51 is a schematic structural diagram of an apparatus according to embodiments of this application. The apparatus is referred to as an apparatus 93 below. The apparatus 93 can be integrated into the LiDAR in the foregoing embodiments or a supporting platform. As shown in FIG. 51, the apparatus includes a memory 932 and a processor 931.

The memory 932 may be an independent physical unit, and may be connected to the processor 931 through a bus. The memory 932 and the processor 931 can also be integrated together, or implemented through hardware or the like.

In some embodiments, the apparatus 93 may also include an emitter and a receiver, the emitter is configured to emit a laser signal, and the receiver is configured to receive the laser signal.

The memory 932 is configured to store a program for implementing the foregoing method embodiments or each module in the apparatus embodiments, and the processor 931 invokes the program to perform operations in the foregoing method embodiments.

In some embodiments, when a part or all of the time-of-flight measurement methods in the foregoing embodiments is implemented through software, the apparatus may also only include a processor. The memory for storing the program is located outside the apparatus, and the processor is connected to the memory through a circuit or a wire, and is configured to read and execute the program stored in the memory.

The processor may be a CPU, an NP or a combination of the CPU and the NP.

The processor can further include a hardware chip. The forgoing hardware chip can be an ASIC, a PLD, or a combination thereof. The forgoing PLD may be a CPLD, a FPGA, a GAL or any combination thereof.

A memory can include a volatile memory, such as a RAM. The memory can also include a non-volatile memory, such as a flash memory, an HDD or an SSD. The memory can also include a combination of the above types of memories.

In the foregoing embodiments, a sending unit or the emitter performs a sending step in the foregoing method embodiments, a receiving unit or the receiver performs a receiving step in the foregoing method embodiments, and another step is performed by another unit or processor. The sending unit and the receiving unit can form a transceiver unit, and the receiver and the emitter can form a transceiver.

An embodiment of this application further provides a computer storage medium that stores a computer program, where the computer program is used to perform the time-of-flight measurement method provided in the foregoing embodiments.

An embodiment of this application further provides a computer program product including an instruction, and when executed on the computer, the instruction enables the computer to perform the time-of-flight measurement method provided in the foregoing embodiments.

The person skilled in the art should understand that the embodiments of this application can be provided as methods, systems, or computer program products. Therefore, this application can use forms of a complete hardware embodiment, a complete software embodiment, or an embodiment combining software and hardware. Moreover, this application can use a form of a computer program product implemented on one or more computer-usable storage media (including but not limited to a disk storage, CD-ROM, an optical storage, etc.) containing computer-usable program codes.

This application is described with reference to flowcharts and/or block diagrams of methods, devices (systems), and computer program products according to embodiments of this application. It should be understood that each process and/or block in the flowchart and/or the block diagram, and combinations of the processes and/or the blocks in the flowchart and/or the block diagram can be realized by computer program instructions. These computer program instructions can be provided to a processor of a general-purpose computer, a special-purpose computer, an embedded processor, or other programmable data processing equipment to generate a machine, so that the instructions executed by the processor of the computer or the other programmable data processing equipment generate a device that realizes functions specified in one process or a plurality of processes in the flowchart and/or one block or a plurality of blocks in the block diagram.

These computer program instructions can also be stored in a computer-readable memory that can direct the computer or the other programmable data processing equipment to work in a specific manner, so that the instructions stored in the computer-readable memory produce an article of manufacture including an instruction device. The instruction device implements the functions specified in one process or the plurality of processes in the flowchart and/or one block or the plurality of blocks in the block diagram.

These computer program instructions can also be loaded on the computer or the other programmable data processing equipment, so that a series of operation steps are executed on the computer or the other programmable equipment to produce computer-implemented processing. Therefore, the instructions executed on the computer or the other programmable equipment provide steps for implementing functions specified in one process or the plurality of processes in the flowchart and/or one block or the plurality of blocks in the block diagram.

What is claimed is:

1. A time-of-flight measurement method, comprising:

obtaining histogram data of a target object, wherein the histogram data is generated based on N laser pulses emitted by an emitter, wherein the histogram data comprises m counts, N laser pulses correspond to N echo signals, each echo signal corresponds to the m counts in the histogram data, m is an integer greater than 1, and each of the m counts is associated with a time;

performing digital filtering on the m counts to obtain m filtered values respectively corresponding to the m counts; and determining a time of flight of the target object based on a time corresponding to a peak value in the m filtered values, wherein before obtaining histogram data of a target object, the method comprising:

obtaining N timestamp sets, wherein N is an integer greater than 1, each timestamp set represents a photon event corresponding to an integration period, each timestamp set comprises multiple timestamps, and integration periods corresponding to the timestamp sets are equal; and generating the histogram data based on the N timestamp sets, wherein an abscissa of the histogram comprises multiple timestamps, and an ordinate of the histogram comprises counts corresponding to the timestamps, wherein generating the histogram data based on the N timestamp sets comprises:

selecting K3 timestamp sets from the N timestamp sets, wherein K3<N and K3 is an integer greater than 2; and accumulating the selected K3 timestamp sets to obtain a histogram; or wherein generating the histogram data based on the N timestamp sets comprises:

obtaining P2 groups based on the N timestamp sets, wherein P2<N, P2 is a positive integer, and each group comprises at least two timestamp sets; accumulating the at least two timestamp sets comprised in each group to obtain P2 first intermediate timestamp sets; and screening each first intermediate timestamp set to obtain P2 second intermediate timestamp sets, wherein the screening comprises:

moving a sliding window with preset width on time length to implement screening, and in response to the number of timestamps covered by the sliding window being less than a number threshold, filtering out the timestamps in the sliding window, or in response to the number of timestamps covered by the sliding window being greater than or equal to the number threshold, retaining the timestamps in the sliding window; accumulating the P2 second intermediate timestamp sets to obtain coherent timestamp sets; and obtaining the histogram data based on the coherent timestamp sets.

2. The method according to claim 1, wherein performing digital filtering on the m counts comprises:

performing, by a digital filter, digital filtering on the m counts, wherein the digital filter comprises a finite impulse response (FIR) filter or an infinite impulse response (IIR) filter.

3. The method according to claim 2, wherein when the digital filter is the FIR filter, an order of the FIR filter is n−1, coefficients of the FIR filter are $\alpha_1$, $\alpha_2$, . . . , $\alpha_n$, the m counts are $bin_1$, $bin_2$, . . . , $bin_m$, and the m filtered values are S, $S_2$, . . . , $S_m$, wherein n is an integer greater than or equal to 1, and m>n; and $$S_m = \alpha_1 \times \text{bin}_m + \alpha_2 \times \text{bin}_{m-1} + \alpha_3 \times \text{bin}_{m-2} + \ldots + \alpha_n \times \text{bin}_{m-n}.$$

4. The method according to claim 1, wherein obtaining histogram data of a target object comprises:

reading the m counts comprised in the histogram data and the times associated with the m counts from a first random access memory (RAM) based on a preset period.

5. The method according to claim 1, wherein performing digital filtering on the m counts to obtain m filtered values respectively corresponding to the m counts comprises:

generating m storage addresses based on times respectively corresponding to the m filtered values; and storing the m filtered values in a second RAM based on the m storage addresses.

6. The method according to claim 1, further comprising:

obtaining one or more of a configured order, equivalent sampling clock frequency, window function, and equivalent signal frequency; and obtaining a coefficient of an FIR filter based on one or more of the order, the equivalent sampling clock frequency, the window function, and the equivalent signal frequency.

7. The method according to claim 6, wherein an equivalent signal period is equal to half-peak width corresponding to the histogram data.

8. The method according to claim 6, wherein the sampling clock frequency is equal to a time interval between two adjacent counts in the histogram data.

9. A time-of-flight measurement apparatus, comprising:

an obtaining unit, configured to obtain histogram data of a target object, wherein the histogram data is generated based on N laser pulses emitted by an emitter, wherein the histogram data comprises m counts, N laser pulses correspond to N echo signals, each echo signal corresponds to the m counts in the histogram data, m is an integer greater than 1, and each of the m counts is associated with a time;

a filtering unit, configured to perform digital filtering on the m counts to obtain m filtered values respectively corresponding to the m counts; and a determining unit, configured to determine a time of flight of the target object based on a time corresponding to a peak value in the m filtered values, wherein the apparatus further comprising:

a first obtaining unit, configured to obtain N timestamp sets, wherein N is an integer greater than 1, each timestamp set represents a photon event corresponding to an integration period, each timestamp set comprises multiple timestamps, and integration periods corresponding to the timestamp sets are equal; and a first generating unit, configured to generate the histogram data based on the N timestamp sets, wherein an abscissa of the histogram comprises multiple timestamps, and an ordinate of the histogram comprises counts corresponding to the timestamps, wherein the first generating unit comprises:

a selecting subunit, configured to select K3 timestamp sets from the N timestamp sets, where K3<N, and K3 is an integer greater than 2; and a second accumulating unit, configured to accumulate the selected K3 timestamp sets to obtain a histogram; or wherein the first generating unit comprises:

a grouping unit, configured to obtain P2 groups based on the N timestamp sets, where P2<N, P2 is a positive integer, and each group comprises at least two timestamp sets;

an accumulating unit, configured to accumulate the at least two timestamp sets comprised in each group to obtain P2 first intermediate timestamp sets;

a screening unit, configured to screen each first intermediate timestamp set to obtain P2 second intermediate timestamp sets, wherein the screening comprises:

moving a sliding window with preset width on time length to implement screening, and in response to the number of timestamps covered by the sliding window being less than a number threshold, filtering out the timestamps in the sliding window, or in response to the number of timestamps covered by the sliding window being greater than or equal to the number threshold, retaining the timestamp in the sliding window;

the accumulating unit is further configured to accumulate the P2 second intermediate timestamp sets to obtain coherent timestamp sets; and a third generating unit, configured to obtain the histogram data based on the coherent timestamp sets.

10. A time-of-flight measurement apparatus, comprising a computer processor and a non-transitory computer readable medium containing computer instructions stored therein for causing the computer processor to perform a time-of-flight measurement method, the time-of-flight measurement method comprising:

obtaining histogram data of a target object, wherein the histogram data is generated based on N laser pulses emitted by an emitter, wherein the histogram data comprises m counts, N laser pulses correspond to N echo signals, each echo signal corresponds to the m counts in the histogram data, m is an integer greater than 1, and each of the m counts is associated with a time;

performing digital filtering on the m counts to obtain m filtered values respectively corresponding to the m counts; and determining a time of flight of the target object based on a time corresponding to a peak value in the m filtered values, wherein before obtaining histogram data of a target object, the method comprising:

obtaining N timestamp sets, wherein N is an integer greater than 1, each timestamp set represents a photon event corresponding to an integration period, each timestamp set comprises multiple timestamps, and integration periods corresponding to the timestamp sets are equal; and generating the histogram data based on the N timestamp sets, wherein an abscissa of the histogram comprises multiple timestamps, and an ordinate of the histogram comprises counts corresponding to the timestamps, wherein generating the histogram data based on the N timestamp sets comprises:

selecting K3 timestamp sets from the N timestamp sets, wherein $K3<N$ and K3 is an integer greater than 2; and accumulating the selected K3 timestamp sets to obtain a histogram; or wherein generating the histogram data based on the N timestamp sets comprises:

obtaining P2 groups based on the N timestamp sets, wherein $P2<N$, P2 is a positive integer, and each group comprises at least two timestamp sets; accumulating the at least two timestamp sets comprised in each group to obtain P2 first intermediate timestamp sets; and screening each first intermediate timestamp set to obtain P2 second intermediate timestamp sets, wherein the screening comprises:

moving a sliding window with preset width on time length to implement screening, and in response to the number of timestamps covered by the sliding window being less than a number threshold, filtering out the timestamps in the sliding window, or in response to the number of timestamps covered by the sliding window being greater than or equal to the number threshold, retaining the timestamps in the sliding window; accumulating the P2 second intermediate timestamp sets to obtain coherent timestamp sets; and obtaining the histogram data based on the coherent timestamp sets.

* * * * *